United States Patent
Kashiba et al.

(10) Patent No.: US 9,260,596 B2
(45) Date of Patent: Feb. 16, 2016

(54) OXYGEN-ABSORBING RESIN COMPOSITION

(75) Inventors: Takashi Kashiba, Kanagawa (JP); Satoshi Okada, Kanagawa (JP); Shinpei Iwamoto, Kanagawa (JP); Akihiro Masuda, Chiba (JP); Kiyonori Michiba, Chiba (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 1043 days.

(21) Appl. No.: 13/378,419

(22) PCT Filed: Jun. 15, 2010

(86) PCT No.: PCT/JP2010/060073
§ 371 (c)(1),
(2), (4) Date: Feb. 6, 2012

(87) PCT Pub. No.: WO2010/147097
PCT Pub. Date: Dec. 23, 2010

(65) Prior Publication Data
US 2012/0128532 A1 May 24, 2012

(30) Foreign Application Priority Data

| Jun. 15, 2009 | (JP) | 2009-141894 |
| Jul. 3, 2009 | (JP) | 2009-158685 |
| Jul. 28, 2009 | (JP) | 2009-174971 |
| Sep. 10, 2009 | (JP) | 2009-209326 |
| Oct. 7, 2009 | (JP) | 2009-233550 |
| Nov. 11, 2009 | (JP) | 2009-257827 |
| Nov. 17, 2009 | (JP) | 2009-262021 |
| Nov. 17, 2009 | (JP) | 2009-262022 |
| Nov. 25, 2009 | (JP) | 2009-267589 |
| Nov. 26, 2009 | (JP) | 2009-268840 |
| Nov. 30, 2009 | (JP) | 2009-272161 |
| Nov. 30, 2009 | (JP) | 2009-272163 |
| Dec. 1, 2009 | (JP) | 2009-273462 |
| Dec. 4, 2009 | (JP) | 2009-276434 |
| May 7, 2010 | (JP) | 2010-107212 |

(51) Int. Cl.
*C08L 77/06* (2006.01)
*C08L 23/02* (2006.01)
*B32B 27/34* (2006.01)
*B32B 27/08* (2006.01)
*B32B 27/18* (2006.01)
*B32B 27/32* (2006.01)
*B32B 27/36* (2006.01)
*B65D 65/40* (2006.01)
*C08K 5/098* (2006.01)

(52) U.S. Cl.
CPC ............... *C08L 23/02* (2013.01); *B32B 27/08* (2013.01); *B32B 27/18* (2013.01); *B32B 27/32* (2013.01); *B32B 27/34* (2013.01); *B32B 27/36* (2013.01); *B65D 65/40* (2013.01); *C08L 77/06* (2013.01); *C08K 5/098* (2013.01); *C08K 2201/012* (2013.01); *Y10T 428/1303* (2015.01); *Y10T 428/1379* (2015.01); *Y10T 428/31725* (2015.04); *Y10T 428/31938* (2015.04)

(58) Field of Classification Search
CPC ....................................................... C08L 77/06
USPC ....................................................... 252/184
See application file for complete search history.

(56) References Cited

U.S. PATENT DOCUMENTS

| 5,013,789 A | 5/1991 | Sakuma et al. |
| 2003/0168631 A1 | 9/2003 | Otaki et al. |
| 2010/0055482 A1 | 3/2010 | Furukawa et al. |

FOREIGN PATENT DOCUMENTS

| JP | 62-241938 | 10/1987 |
| JP | 63-170460 | 7/1988 |
| JP | 03-115460 | 5/1991 |
| JP | 04-045152 | 2/1992 |
| JP | 04-45152 | 2/1992 |
| JP | 5-33632 | 2/1993 |
| JP | 5-140555 | 6/1993 |
| JP | 05-209097 | 8/1993 |
| JP | 06-287298 | 10/1994 |
| JP | 9-234832 | 9/1997 |
| JP | 2001-10675 | 1/2000 |
| JP | 2000-319507 | 11/2000 |
| JP | 2000-319508 | 11/2000 |
| JP | 2000-345053 | 12/2000 |
| JP | 2001-011308 | 1/2001 |
| JP | 2001-179090 | 7/2001 |
| JP | 2001-252560 | 9/2001 |

(Continued)

OTHER PUBLICATIONS

English machine translation of Tomomichi et al., JP 2005-306419A (2005).*
Search report from International Patent Application No. PCT/JP2010/060073, mail date is Sep. 21, 2010.

(Continued)

*Primary Examiner* — Peter F Godenschwager
(74) *Attorney, Agent, or Firm* — Greenblum & Bernstein, P.L.C.

(57) ABSTRACT

Provided is a resin composition which is excellent in an oxygen-absorbing performance, a resin strength and a resin processability.
The oxygen-absorbing resin composition is characterized by containing a polyolefin resin, a transition metal catalyst and a polyamide resin obtained by polycondensation of aromatic diamine and dicarboxylic acid, wherein an end amino group concentration of the above polyamide resin is 30 μeq/g or less, and a total content of the transition metal catalyst and the polyamide resin is 15 to 60% by weight based on a whole amount of the oxygen-absorbing resin composition.

9 Claims, No Drawings

(56) References Cited

FOREIGN PATENT DOCUMENTS

| | | |
|---|---|---|
| JP | 2001-261957 | 9/2001 |
| JP | 2002-137347 | 5/2002 |
| JP | 2002-241610 | 8/2002 |
| JP | 2002-309046 | 10/2002 |
| JP | 2003-012023 | 1/2003 |
| JP | 2003-253131 | 9/2003 |
| JP | 2003-341747 | 12/2003 |
| JP | 2004-237570 | 8/2004 |
| JP | 2004-307756 | 11/2004 |
| JP | 2005-119693 | 5/2005 |
| JP | 2005-306419 | 11/2005 |
| JP | 2006-124669 | 5/2006 |
| JP | 2007-283564 | 11/2007 |
| JP | 2008-081529 | 4/2008 |
| JP | 2008-188975 | 8/2008 |
| JP | 2010-013638 | 1/2010 |
| JP | 2010-042666 | 2/2010 |
| JP | 2010-242256 | 10/2010 |
| JP | 2002-256208 | 9/2011 |

OTHER PUBLICATIONS

Japan Office Action in JP2010-150,927, mail date is Dec. 3, 2013.

Japan (JP Appl. No. 2010-107212) Office action, mail date is May 20, 2014.

Japan (JP Appl. No. 2010-248779) Office action, mail date is Jul. 1, 2014.

Japan (JP Appl. No. 2010-245320) Office action, mail date is Jul. 1, 2014.

Office Action in Japanese application No. 2010-134256 mailed Oct. 2, 2013.

European search report issued for application No. 10789472, mail date is Jul. 22, 2015.

* cited by examiner

OXYGEN-ABSORBING RESIN COMPOSITION

TECHNICAL FIELD

The present invention relates to an oxygen-absorbing resin composition which shows an excellent oxygen-absorbing performance and which does not cause a reduction in a strength of the resin due to oxidative degradation and does not generate odor, a production process for an oxygen-absorbing resin composition, an oxygen-absorbing multilayer film and an oxygen-absorbing multilayer container prepared by thermoforming the above multilayer film.

BACKGROUND ART

Containers such as metal cans, glass bottles, various plastic packages and the like have so far been known as packaging containers, and quality deterioration caused by oxygen contained in packaging containers has been a problem. Accordingly, it is tried in recent years as one of deoxidation packaging technologies to constitute containers from a multilayer material provided with an oxygen-absorbing layer comprising an oxygen-absorbing resin composition prepared by blending a thermoplastic resin with an iron base deoxidizer and the like to try to enhance a gas barriering property of the containers and develop packaging containers in which the containers themselves are provided with an oxygen-absorbing performance. For example, an oxygen-absorbing multilayer film is used as a film prepared by providing a conventional gas barriering multilayer film prepared by laminating a heat sealing layer and a gas-barriering layer with an oxygen-absorbing layer which is a thermoplastic resin layer dispersed therein with an oxygen absorbent via an intermediate layer comprising a thermoplastic resin in a certain case to endow the film with a performance of absorbing oxygen contained in a container as well as a performance of preventing oxygen from permeating from an outside, and it is produced by making use of production processes which have so far been publicly known, such as extrusion lamination, coextrusion lamination, dry lamination and the like (refer to a patent document 1).

On the other hand, resin compositions comprising polyamide, particularly xylylene group-containing polyamide as an oxidizable organic component and transition metal are known as compositions comprising polymers and having an oxygen-scavenging characteristic, and shown are the examples of resin compositions having an oxygen-scavenging performance and oxygen absorbents, packaging materials and multilayer laminated films for packaging which are obtained by molding the above resin compositions (refer to patent documents 2 to 8). Further, known as well are technologies in which the above oxygen-absorbing multilayer films are used for a cover material of a barriering container to tightly seal the barriering container to thereby prevent oxidative deterioration of a content thereof.

However, problems such as detection by a metal detector used for detecting foreign matters in foods and the like, deficiency of an inside visibility due to a problem of opacity and incapability of use thereof for beverages such as alcohols and the like which are damaged in a flavor by mixing of iron powder have been involved in compositions in which an oxygen absorbent such as iron powder and the like is used. Further, oxidation reaction of iron powder is used, and therefore an effect of absorbing oxygen can be exerted only on stored films having a high moisture.

On the other hand, in resin compositions which contain a transition metal catalyst and in which a polyamide resin is oxidized to exert an oxygen-absorbing performance, a xylylene group-containing polyamide resin is oxidized, and therefore involved therein is the problem that the resin is reduced in a strength due to oxidative deterioration to allow the packaging container itself to be reduced in a strength.

MXD6 which is polyamide obtained by polycondensation of metaxylylenediamine and adipic acid is shown as an example in which oxidation reaction is exerted by a polyamide resin and a transition metal catalyst. However, in a system in which MXD6 is mixed with transition metal, an oxygen-absorbing ability is so low in a certain case as to use it as an oxygen-absorbing resin composition to store well a stored film. Also, the viscosity is reduced due to oxidative decomposition of MXD6 in mixing with the transition metal, and a problem of a reduction in the processability has been involved therein. Further, in a system in which MXD6 is mixed with transition metal, a blend with a polyester resin such as polyethylene terephthalate (hereinafter shown as PET) and the like and a resin having a relatively high melting point such as nylon 6 and the like has so far been usually used.

Also, a fluid infusion container in which a liquid chemical is a content is used by connecting it directly with a tube and the like, and therefore it is handled in a state in which it is put in an exterior packing material comprising a synthetic resin film in order to prevent the container from being contaminated before actually used. A fluid infusion container is constituted from a resin which permeates oxygen in terms of a sanitation and the like, and therefore the exterior packing material has to have a gas barriering property in order to prevent a content fluid thereof from being changed in a quality by oxygen. However, oxygen is present more or less in an exterior packing material after tightly sealed, and the fluid content has to be prevented from being changed in a quality by oxygen which permeates as time passes even if a gas-barriering exterior packing material is used. Accordingly, a content fluid of a fluid infusion container has so far been prevented from being changed in a quality not only by charging an exterior packing material with the fluid infusion container at a low oxygen concentration but also by putting an oxygen absorbent together with the fluid infusion container in the exterior packing material to absorb remaining oxygen and permeating oxygen by the above oxygen absorbent to thereby maintain an amount of oxygen in the exterior packing material at a low level (refer to the patent document 1).

However, in resin compositions which contain a transition metal catalyst and in which a polyamide resin and the like are oxidized to exert an oxygen-absorbing performance, a xylylene group-containing polyamide resin is oxidized, and therefore involved therein is the problem that the resin is reduced in a strength due to oxidative deterioration to allow the packaging container itself to be reduced in a strength.

CITATION LIST

Patent Document

Patent document 1: Japanese Patent Application Laid-Open No. 234832/1997
Patent document 2: Japanese Patent Application Laid-Open No. 140555/1993
Patent document 3: Japanese Patent Application Laid-Open No. 252560/2001
Patent document 4: Japanese Patent Application Laid-Open No. 341747/2003

Patent document 5: Japanese Patent Application Laid-Open No. 119693/2005
Patent document 6: Japanese Patent Application Laid-Open No. 179090/2001
Patent document 7: Japanese Patent Application Laid-Open No. 256208/2002
Patent document 8: Japanese Patent Publication No. 33632/1993

SUMMARY OF INVENTION

Problem to be Solved by the Invention

An object of the present invention is to provide a resin composition which is excellent in an oxygen-absorbing performance, a resin strength and a resin processability and a production process for the above oxygen-absorbing resin composition.

An object of the present invention is to provide an oxygen-absorbing multilayer film which is excellent in an oxygen-absorbing performance, a resin strength, a resin processability and an appearance and in which a content is visible and an oxygen-absorbing multilayer container.

An object of the present invention is to provide an oxygen-absorbing multilayer film which is excellent in an oxygen-absorbing performance, a resin strength, an interlayer strength between an oxygen-absorbing layer and a gas-barriering layer and a resin processability and an oxygen-absorbing multilayer container.

An object of the present invention is to provide a method for preserving a content of a fluid infusion container by using an oxygen-absorbing multilayer film in which a content of a fluid infusion container can be preserved for a long time without deteriorating the content and which has a transparency

Means for Solving the Problem

The present inventors have found that an oxygen-absorbing resin composition which is excellent in an oxygen-absorbing performance and maintains a resin strength after stored and which is excellent in a resin processability, a production process for the same, an oxygen-absorbing multilayer film prepared by using the above oxygen-absorbing resin composition and an oxygen-absorbing multilayer container are obtained by blending specific polyamide and transition metal with a polyolefin resin in a specific proportion.

That is, the present invention relates to:

[1] an oxygen-absorbing resin composition containing a polyolefin resin, a transition metal catalyst and a polyamide resin obtained by polycondensation of aromatic diamine and dicarboxylic acid, wherein an end amino group concentration of the above polyamide resin is 30 µeq/g or less, and a total content of the transition metal catalyst and the polyamide resin is 15 to 60% by weight based on a whole amount of the oxygen-absorbing resin composition,

[2] an oxygen-absorbing multilayer film comprising at least three layers of a sealant layer comprising a thermoplastic resin, an oxygen-absorbing resin layer containing a polyolefin resin, a transition metal catalyst and a polyamide resin and a gas-barriering layer comprising a gas-barriering film, wherein the above polyamide resin is a polyamide resin which is obtained by polycondensation of aromatic diamine and dicarboxylic acid and in which an end amino group concentration is 30 µeq/g or less, and a total content of the transition metal catalyst and the polyamide resin in the oxygen-absorbing resin layer is 15 to 60% by weight,

[3] a production process for the oxygen-absorbing resin composition according to the above item [1] in which a content of the transition metal is 200 to 5000 ppm based on the polyolefin resin, wherein a master batch containing the polyolefin resin and the transition metal catalyst is molten and kneaded with the polyamide resin,

[4] an oxygen-absorbing multilayer container prepared by thermoforming the oxygen-absorbing multilayer film according to the above item [2],

[5] an oxygen-absorbing multilayer container prepared by subjecting a laminated material prepared by laminating at least a paper substrate, a gas-barriering layer, the oxygen-absorbing resin layer according to the above item [2] and a thermoplastic resin inner layer in this order to plate working and

[6] a method for preserving a content of a fluid infusion container in which a content of a fluid infusion container is preserved in an oxygen-absorbing container prepared by using wholly or partially an oxygen-absorbing multilayer film prepared by laminating at least three layers of an oxygen-permeating layer comprising a thermoplastic resin, an oxygen-absorbing resin layer containing at least a polyolefin resin, a transition metal catalyst and a polyamide resin and a gas-barriering layer comprising a gas-barriering film in order from an inside, wherein the above polyamide resin is a polyamide resin which is obtained by polycondensation of at least aromatic diamine and dicarboxylic acid and in which an end amino group concentration is 30 µeq/g or less, and a total content of the transition metal catalyst and the polyamide resin in the oxygen-absorbing resin layer is 15 to 60% by weight.

Advantageous Effects of the Invention

According to the present invention, capable of being provided are an oxygen-absorbing resin composition which has a high oxygen-absorbing performance and which is scarcely observed to be deteriorated in a strength by oxidation of a polyamide resin and a production process for the above oxygen-absorbing resin composition.

According to the present invention, capable of being provided is an oxygen-absorbing resin composition which has a high oxygen-absorbing performance and a high molding processability and which is scarcely observed to be deteriorated in a strength by oxidation of a polyamide resin.

According to the present invention, capable of being provided are an oxygen-absorbing multilayer film which has a high oxygen-absorbing performance, a high molding processability and a transparency and which is scarcely observed to be deteriorated in a strength by oxidation of a polyamide resin and an oxygen-absorbing multilayer container.

According to the present invention, capable of being provided an oxygen-absorbing multilayer container which has a high oxygen-absorbing performance and is scarcely observed to be deteriorated in a strength by oxidation of a polyamide resin and which is excellent in a processability and a storing property of a stored film.

According to the present invention, capable of being provided a method for preserving a content of a fluid infusion container by using an oxygen-absorbing multilayer container which has a high oxygen-absorbing performance and is scarcely observed to be deteriorated in a strength by oxidation of a polyamide resin and which has a visibility of a content. In addition thereto, the above method makes it possible to store a content of a fluid infusion container for a long time without causing deterioration thereof.

EMBODIMENTS FOR CARRYING OUT THE INVENTION

Oxygen-Absorbing Resin Composition:

The oxygen-absorbing resin composition of the present invention is an oxygen-absorbing resin composition containing a polyolefin resin, a transition metal catalyst and a polyamide resin obtained by polycondensation of aromatic diamine and dicarboxylic acid, wherein an end amino group concentration in the above polyamide resin is 30 µeq/g or less, and a total content of the transition metal catalyst and the polyamide resin is 15 to 60% by weight based on a whole amount of the oxygen-absorbing resin composition.

Polyamide Resin A:

An oxygen-absorbing performance of the oxygen-absorbing resin composition is considered to be better in the oxygen-absorbing resin composition containing a larger amount of the polyamide resin to which transition metal having an oxygen-absorbing ability is added, but to be surprised, it has been found that a high oxygen-absorbing ability is shown when the polyamide resin and the transition metal are mixed and blended with the polyolefin resin in a fixed proportion.

The polyamide resin in the present invention is obtained by polycondensation of aromatic diamine and dicarboxylic acid and has an end amino group concentration of 30 µeq/g or less (hereinafter referred to as "the polyamide resin A"). The polycondensation of aromatic diamine and dicarboxylic acid can be allowed to proceed by melt polymerization in which aromatic diamine and dicarboxylic acid are molted and solid phase polymerization in which pellets of a polyamide resin are heated under reduced pressure.

In the present invention, the aromatic diamine used in preparing the polyamide resin A includes orthoxylylenediamine, paraxylylenediamine and metaxylylenediamine, and at least one selected from metaxylylenediamine and paraxylylenediamine is preferably used from the viewpoint of the oxygen-absorbing performance. Metaxylylenediamine is more preferably used. A mixture of metaxylylenediamine and paraxylylenediamine is preferably used as well. Further, various aliphatic diamines and aromatic diamines may be incorporated thereinto as copolymerizing components as long as an influence is not exerted on the performances. A content proportion (mol %) of the respective components in mixing paraxylylenediamine and metaxylylenediamine is preferably paraxylylenediamine:metaxylylenediamine=20 to 60:80 to 40, particularly preferably 25 to 50:75 to 50.

The dicarboxylic acid includes adipic acid, sebacic acid, dodecanoic diacid, isophthalic acid, malonic acid and the like. Among them, at least one selected from adipic acid, sebacic acid and isophthalic acid is preferred from the viewpoint of the oxygen-absorbing performance. Further, various aliphatic dicarboxylic acids and aromatic dicarboxylic acids may be incorporated thereinto as copolymerizing components as long as an influence is not exerted on the performances. A polycondensation product of paraxylylenediamine, metaxylylenediamine or a mixture thereof with a mixture of adipic acid and sebacic acid or with a mixture of adipic acid and isophthalic acid is more preferably used for the polyamide resin A.

In the present invention, the dicarboxylic acid described above contains preferably adipic acid and sebacic acid in a proportion of preferably 3/7 to 7/3, more preferably 4/6 to 6/4 in terms of a mole ratio (adipic acid/sebacic acid) from the viewpoint of the oxygen-absorbing performance, and the aromatic diamine contains preferably metaxylylenediamine in a proportion of preferably 0.985 to 0.997, more preferably 0.990 to 0.995 based on 1 mole of the dicarboxylic acid. From the same viewpoint, a mole ratio in carrying out the polycondensation of the diamine described above with adipic acid and sebacic acid is diamine:sebacic acid:adipic acid=preferably 0.985 to 0.997:0.3 to 0.7:0.7 to 0.3, particularly preferably 0.988 to 0.995:0.4 to 0.6:0.6 to 0.4. Also, a mole ratio in carrying out the polycondensation of the diamine such as metaxylylenediamine with adipic acid and isophthalic acid is diamine:adipic acid:isophthalic acid=preferably 0.985 to 0.997:0.70 to 0.97:0.30 to 0.03, more preferably 0.988 to 0.995:0.80 to 0.95:0.20 to 0.05.

The polyamide resin A in the present invention is a polyamide resin which is obtained by polycondensation of aromatic diamine and dicarboxylic acid and which has an end amino group concentration of 30 µeq/g or less. If the end amino group concentration is 25 µeq/g or less, the oxygen-absorbing performance is enhanced, and therefore it is preferred. If it is 20 µeq/g or less, the oxygen-absorbing performance is further enhanced, and therefore it is more preferred. As shown above, the oxygen-absorbing performance tends to be enhanced as the end amino group concentration is reduced, and the above concentration is preferably reduced as much as possible. However, considering the economical rationality, a lower limit value thereof is preferably 5 µeq/g or more. If the end amino group concentration is higher than 30 µeq/g, the good oxygen-absorbing performance can not be obtained.

In order to control an end amino group concentration of the polyamide resin to 30 µeq/g or less, preferably carried out are methods such as:

1) a method in which a mole ratio of aromatic diamine to dicarboxylic acid is controlled to carry out polycondensation,
2) a method in which the polyamide resin is reacted with carboxylic acid to mask an end amino group and
3) a method in which the polyamide resin is subjected to solid phase polymerization.

The above methods can be carried out alone or in combination. In particular, if the methods 1) and 3) and the methods 2) and 3) are carried out in combination, the polyamide resin which is more excellent in an oxygen-absorbing performance and a moldability in preparing the film is obtained, and therefore it is preferred. The above methods shall be explained below.

In 1) the method in which a mole ratio of aromatic diamine to dicarboxylic acid is controlled to carry out polycondensation, the dicarboxylic acid is used excessively to the aromatic diamine, and to be specific, a mole ratio (aromatic diamine/dicarboxylic acid) of the aromatic diamine to the dicarboxylic acid is preferably 0.985 to 0.997, particularly preferably 0.988 to 0.995. If the above mole ratio is less than 0.985, a polymerization degree of the polyamide resin is less liable to be elevated in a certain case, and therefore it is not preferred.

In 2) the method in which the polyamide resin is reacted with carboxylic acid to mask an end amino group, an end amino group of the polyamide resin is reacted with carboxylic acid to control an end amino group concentration. That is, in the present invention, the polyamide resin is preferably masked at an end by carboxylic acid to control an end amino group concentration to 30 µeq/g or less. Compounds having at least one carboxyl group and in addition thereto, anhydrides thereof are included in the carboxylic acid used in the present invention, and they are used as end masking agents for an end amino group of the polyamide resin.

In the present invention, end masking means that an end amino group concentration is reduced by reacting an end amino group of the polyamide resin with carboxylic acid to form an amide bond. The carboxylic acid used shall not specifically be restricted, and carboxylic anhydride is preferred in terms of a high reactivity thereof. To be specific, capable of being shown as the examples thereof are phthalic anhydride, maleic anhydride, succinic anhydride, hexahydrophthalic anhydride, benzoic anhydride, propionic anhydride, caproic anhydride, glutaric anhydride, itaconic anhydride, citraconic anhydride, acetic anhydride, butyric anhydride, isobutyric anhydride, trimellitic anhydride, pyromellitic anhydride and the like. Further, the polyamide resin can be reacted with the carboxylic acid, for example, by a method in which they are added in melt polymerization and a method in which the carboxylic acid is added to the polyamide resin obtained by melt polymerization and in which they are then molten and kneaded. Among them, melting and kneading is preferred because of the reason that a polymerization degree of the polyamide resin can be elevated.

An addition amount of the carboxylic acid described above is, to be theoretical, suitably an amount equal to an end amino group concentration in the polyamide resin. In general, it is varied according to a volatility and a reactivity of the carboxylic acid, and added is preferably 0.2 to 5.0 equivalent thereof, more preferably 0.5 to 3.5 equivalent thereof based on an end amino group concentration present in the polyamide resin. In the above case, an end amino group concentration of the polyamide resin A can be reduced as compared with a case in which the addition amount deviates from the range described above, and a deterioration in the resin processability due to a reduction in the viscosity and a reduction in the oxygen-absorbing performance can be prevented.

In 3) the method in which the polyamide resin is subjected to solid phase polymerization, the polyamide resin obtained by melt polymerization is further subjected to solid phase polymerization reaction to thereby control an end amino group concentration. The solid phase polymerization is allowed to proceed by heating the pellets of the polyamide resin under reduced pressure. A pressure in the solid phase polymerization is preferably 100 torr (13.33 kPa) or less, more preferably 30 torr (4.00 kPa) or less. A temperature in the solid phase polymerization is required to be 130° C. or higher, preferably 150° C. or higher, and it is preferably lower by 10° C. or higher, more preferably lower by 15° C. or higher than a melting point of the polyamide resin. The solid phase polymerization time is preferably 3 hours or longer. Carrying out the solid phase polymerization makes it possible to reduce an end amino group concentration of the polyamide resin and in addition thereto, elevate a molecular weight thereof and control a viscosity thereof.

A polyamide resin having a low crystallinity is preferably used for the polyamide resin A of the present invention. To be specific, preferred is a polyamide resin which has such a low crystallinity that a semi-crystallization time is 150 seconds or longer and in which a peak of a melting point is not observed in measuring the melting point by DSC. If a semi-crystallization time of the polyamide resin A is 150 seconds or longer, the higher oxygen-absorbing performance is obtained.

Considering a processability with the polyolefin resin and an oxygen-absorbing performance, a polyamide resin having a low melting point and a low glass transition temperature (hereinafter shown as Tg) is preferably used for the polyamide resin A. The polyamide resin A has a melting point of preferably 200° C. or lower, more preferably 190° C. or lower or has particularly preferably no melting point. Tg is preferably 90° C. or lower, particularly preferably 80° C. or lower.

An oxygen permeability coefficient of the polyamide resin A is preferably 0.2 to 1.5 cc·mm/(m$^2$·day·atm) (23° C., 60% RH), more preferably 0.3 to 1.0 cc·mm/(m$^2$·day·atm) (23° C., 60% RH). If the oxygen permeability coefficient is 0.2 to 1.5 cc·mm/(m$^2$·day·atm) (23° C., 60% RH), the higher oxygen-absorbing performance is obtained when the polyamide resin A is blended with the polyolefin resin.

Considering a processability in mixing the polyamide resin A with the polyolefin resin, the polyamide resin A in which a melt flow rate (hereinafter shown as MFR) is 3 to 20 g/10 minutes at 200° C. and 4 to 25 g/10 minutes at 240° C. is preferably used. In the above case, if the resin is processed at temperature at which a difference between MFR of the polyolefin resin and MFR of the polyamide resin A shows ±20 g/10 minutes, preferably ±10 g/10 minutes, the kneading state is improved, and when it is processed into a film and a sheet, the processed products having no problems on an appearance can be obtained. MFR of the polyamide resin A can be controlled, for example, by controlling a molecular weight. A method in which a phosphorus base compound is added as a polymerization promoting agent and a method in which the polyamide resin A is subjected to solid phase polymerization after melt polymerization can be shown as the examples of a suitable method for controlling the molecular weight. MFR referred to in the present specification is, unless otherwise described, MFR of the above resin measured at a specific temperature on the condition of a load 2160 g by means of an equipment according to JIS K7210, and it is shown by a unit of "g/10 minutes" together with a measuring temperature.

The polyamide resin A can be synthesized by melt polymerization in which aromatic diamine and dicarboxylic acid are polymerized in a melt state and solid phase polymerization in which the pellets of the polyamide resin are heated under reduced pressure. In particular, the polyamide resin A is synthesized preferably by a method passing through two stages of solid phase polymerization after melt polymerization. A number average molecular weight of the polyamide resin A is preferably 18000 or more, more preferably 19000 or more and further preferably 20000 or more, and it is preferably 27000 or less, more preferably 26000 or less, more preferably 25000 or less and further preferably 24000 or less. That is, a number average molecular weight of the polyamide resin A is preferably 18000 to 27000, more preferably 19000 to 26000 and further preferably 20000 to 26000.

Polyolefin Resin:

Various polyethylenes such as high density polyethylene, medium density polyethylene, low density polyethylene, linear low density polyethylene, ultra low density polyethylene, polyethylene produced by a metallocene catalyst and the like, polystyrene, polymethylpentene, polypropylenes such as propylene homopolymers, propylene-ethylene block copolymers, propylene-ethylene random copolymers and the like can be used alone or in combination for the polyolefin resin contained in the oxygen-absorbing resin composition of the present invention. Among the above polyolefin resins, the resins having an oxygen permeability coefficient of 80 to 200 cc·mm/(m$^2$·day·atm) (23° C., 60% RH) are preferred from the viewpoint of an oxygen-absorbing performance, and when the polyolefin resins having an oxygen permeability coefficient falling in the above range are used, the good oxygen-absorbing performance is obtained. Various polyethylenes such as high density polyethylene, medium density polyethylene, low density polyethylene, linear low density polyethylene, polyethylene produced by a metallocene catalyst and the like and various polypropylenes such as propylene-ethylene block copolymers, propylene-ethylene random copolymers and the like are more preferably used as the polyolefin resin in terms of an oxygen-absorbing performance and a film processability. An ethylene-vinyl acetate copolymer, an ethylene-methyl acrylate copolymer, an ethylene-ethyl acrylate copolymer, an ethylene-acrylic acid copolymer, an ethylene-methacrylic acid copolymer, an ethylene-methyl methacrylate copolymer and a thermoplastic elastomer may be added, if necessary, to the above polyolefin resins.

Considering a mixing property of the polyamide resin A, a maleic anhydride-modified polyolefin resin is preferably added. An addition amount of the maleic anhydride-modified polyolefin resin is preferably 1 to 30 wt %, particularly preferably 3 to 15 wt % based on the polyolefin resin.

Also, color pigments such as titanium oxide and the like, additives such as antioxidants, slipping agents, antistatic agents, stabilizers and the like, fillers such as calcium carbonate, clay, mica, silica and the like, deodorants and the like may be added to the polyolefin resin. In particular, an antioxidant is preferably added in order to recycle scraps generated during the production and reprocess them.

Transition Metal Catalyst:

The transition metal catalyst used in the present invention includes compounds of first transition elements, for example, Fe, Mn, Co and Cu. One example of the transition metal catalyst includes as well organic acid salts, chlorides, phosphates, phosphites, hypophosphites and nitrates of transition metals and mixtures thereof. The organic acid includes, for example, salts of aliphatic alkyl acids of C2 to C22 such as acetic acid, propionic acid, octanoic acid, lauric acid, stearic acid and the like, salts of dibasic acids such as malonic acid, succinic acid, adipic acid, sebacic acid, hexahydrophthalic acid and the like, salts of butanetetracarboxylic acid, salts of aromatic acids such as benzoic acid, toluic acid, o-phthalic acid, isophthalic acid, terephthalic acid, trimesic acid and the like and mixtures thereof. Among the transition metal catalysts, organic acid salts of Co are preferred from the viewpoint of the oxygen-absorbing property, and Co stearate is particularly preferred from the viewpoint of the safety and the processability.

Oxygen-Absorbing Resin Composition:

A concentration of all transition elements in the above catalyst based on the polyamide resin A in the oxygen-absorbing resin composition is 10 to 5000 ppm, preferably 50 to 3000 ppm. In the above case, an oxygen-absorbing performance of the polyamide resin A can be enhanced as compared with a case in which the addition amount deviates from the ranges described above, and a deterioration in the resin processability due to a reduction in the viscosity can be prevented.

A content of the polyamide resin A containing the transition metal catalyst in the oxygen-absorbing resin composition is 15 to 60% by weight, preferably 17 to 60% by weight, more preferably 20 to 60% by weight and particularly preferably 25 to 50% by weight. When a content of the polyamide resin A containing the transition metal catalyst in the oxygen-absorbing resin composition is less than 15 by weight or exceeds 60% by weight, the oxygen-absorbing performance is reduced. Further, if it exceeds 60% by weight, the polyamide resin A is deteriorated by oxidation, and the problem of a reduction in the strength is brought about.

A stabilizer and the like may suitably be added to the polyamide resin A in the present invention. In particular, a phosphorus compound is preferably used as a stabilizer, and to be specific, hypophosphites are preferred. The phosphorus compound stabilizes the polyamide resin A and exerts an influence on the oxygen-absorbing performance, and therefore an addition amount thereof is preferably 200 ppm or less, particularly preferably 100 ppm or less.

The oxygen-absorbing resin composition of the present invention can be used as a material for an oxygen absorbent in the form of a resin composition. That is, the pellet-like or sheet-like oxygen-absorbing resin composition is filled into an air-permeable packaging material, and it may be used as a small bag-like oxygen absorbent. When it is turned into a pellet form, it is preferably crushed and turned into a powder form in order to maintain contact with oxygen. When it is turned into a sheet form, it is preferably stretched to provide a space between sea island-like layers of the polyamide resin and the polyolefin resin. High density polyethylene is preferably used as the polyolefin resin in stretching.

Production Process for Oxygen-Absorbing Resin Composition:

In producing the oxygen-absorbing resin composition of the present invention, the transition metal catalyst is preferably added to the polyamide resin A and then mixed with the polyolefin resin.

In adding the transition metal catalyst to the polyamide resin, it is added to the polyamide resin obtained by polycondensation of aromatic amine and dicarboxylic acid preferably by a method such as, for example, 1) adding the transition metal catalyst after masking an end by carboxylic acid, 2) masking an end by carboxylic acid after adding the transition metal catalyst and 3) adding the transition metal catalyst and carboxylic acid at the same time, and the good oxygen-absorbing performance is obtained by any of the above methods.

A production process for an oxygen-absorbing resin composition in which a master batch containing a polyolefin resin and a transition metal catalyst is molten and kneaded with a polyamide resin is preferably listed as another process for producing the oxygen-absorbing resin composition.

The transition metal catalyst is kneaded with the polyolefin resin to produce a master batch, and then the master batch is molten and mixed with the polyamide resin A to prepare the oxygen-absorbing resin composition. The transition metal catalyst is added so that a concentration of all transition metals in the above catalyst based on the polyolefin resin is preferably 200 to 5000 ppm, more preferably 300 to 3000 ppm. In the above case, an oxygen-absorbing performance of the polyamide resin A can be enhanced as compared with a case in which the addition amount deviates from the ranges described above. Also, when the concentration exceeds 5000 ppm, it is difficult in a certain case to produce the master batch, or the master batch having an even quality can not be produced in a certain case. If the transition metal catalyst is added to the polyamide resin A, the resin processability is deteriorated by a reduction in a viscosity of the polyamide resin A.

A content of the polyamide resin A in the oxygen-absorbing resin composition is preferably 15 to 60% by weight, more preferably 17 to 60% by weight and particularly preferably 20 to 50% by weight. If a content of the polyamide resin A in the oxygen-absorbing resin composition falls in the ranges described above, the oxygen-absorbing ability is enhanced. Further, the resin is inhibited from being deteriorated by oxidation of the polyamide resin A, and the problems of a reduction in the strength and the like are not brought about.

The master batch used in the present invention may be used and molten and kneaded with the polyolefin resin together with the polyamide resin A to control the polyamide resin A and the transition metal catalyst to the desired contents.

Oxygen-Absorbing Multilayer Film:

The oxygen-absorbing resin composition of the present invention is used preferably as an oxygen-absorbing multilayer film comprising at least a sealant layer or an oxygen permeating layer containing a polyolefin resin, an oxygen-absorbing layer containing an oxygen-absorbing resin composition and a gas-barriering layer containing a gas-barriering film in the form of a film or a sheet.

The present invention relates to an oxygen-absorbing multilayer film comprising at least three layers of a sealant layer or an oxygen permeating layer comprising a thermoplastic resin, an oxygen-absorbing resin layer containing a polyolefin resin, a transit metal catalyst and a polyamide resin and a gas-barriering layer comprising a gas-barriering film, wherein the above polyamide resin is a polyamide resin which is obtained by polycondensation of aromatic diamine and dicarboxylic acid and in which a concentration of an end amino group is 30 µeq/g or less, and a total content of the transition metal catalyst and the polyamide resin in the oxygen-absorbing resin layer is 15 to 60% by weight.

That is, the oxygen-absorbing multilayer film of the present invention is an oxygen-absorbing multilayer film prepared by laminating at least three layers of a sealant layer or an oxygen permeating layer comprising a thermoplastic resin, an oxygen-absorbing resin layer and a gas-barriering layer in this order, wherein the oxygen-absorbing resin composition of the present invention described above is contained in the oxygen-absorbing resin layer. Further, the oxygen-absorbing multilayer film of the present invention can be used as well for application in which main bodies and caps of containers and packaging materials are constituted wholly or partially from the multilayer film with the sealant layer or the oxygen permeating layer turned to an inside. The respective layers and the respective compositions of the oxygen-absorbing multilayer film shall be explained below in detail.

Sealant Layer or Oxygen Permeating Layer:

Polyolefin resins including various polyethylenes such as high density polyethylene, medium density polyethylene, low density polyethylene, linear low density polyethylene, ultra low density polyethylene, polyethylene produced by a metallocene catalyst and the like, polystyrene, polymethylpentene, polypropylenes such as propylene homopolymers, propylene-ethylene block copolymers, propylene-ethylene random copolymers and the like can be used alone or in combination as the thermoplastic resin used for the sealant layer or the oxygen permeating layer. An ethylene-vinyl acetate copolymer, an ethylene-methyl acrylate copolymer, an ethylene-ethyl acrylate copolymer, an ethylene-acrylic acid copolymer, an ethylene-methacrylic acid copolymer, an ethylene-methyl methacrylate copolymer and a thermoplastic elastomer may be added, if necessary, to the above polyolefin resins. Considering a processability of the multilayer film, the thermoplastic resin in which a melt flow rate (hereinafter shown as MFR) is 1 to 35 g/10 minutes at 200° C. and 2 to 45 g/10 minutes at 240° C. is preferably used. MFR referred to in the present specification is, unless otherwise described, MFR of the above resin measured at a specific temperature on the condition of a load 2160 g by means of an equipment according to JIS K7210, and it is shown by a unit of "g/10 minutes" together with a measuring temperature.

Also, color pigments such as titanium oxide and the like, additives such as antioxidants, slipping agents, antistatic agents, stabilizers, lubricants and the like, fillers such as calcium carbonate, clay, mica, silica and the like, deodorants and the like may be added to the thermoplastic resin such as the polyolefin resin used for the sealant layer or the oxygen permeating layer. In particular, an antioxidant is preferably added in order to recycle scraps generated during the production and reprocess them.

A thickness of the sealant layer or the oxygen-permeating layer is preferably smaller since the above layer is an isolation layer for the oxygen-absorbing resin layer, and it is preferably 2 to 50 µm, particularly preferably 5 to 30 µm. In the above case, a rate at which the oxygen-absorbing resin composition absorbs oxygen can be enhanced more as compared with a case in which the thickness deviates from the ranges described above, and the processability can be prevented from being damaged.

Oxygen-Absorbing Resin Layer:

In the present invention, the oxygen-absorbing resin layer comprises the oxygen-absorbing resin composition described above, and the polyolefin resin, the polyamide resin A, the transition metal catalyst and the like have been described in the explanations of the oxygen-absorbing resin composition. Considering a processability of the resin and an adhesive property thereof with the oxygen-permeating layer, the same resin as the polyolefin resin in the sealant layer or the oxygen-permeating layer is preferably used for the polyolefin resin in the oxygen-absorbing resin layer. From the viewpoint of the oxygen-absorbing performance, the oxygen permeability coefficient is preferably 80 to 200 cc·mm/(m²·day·atm) (23° C., 60% RH), and if the polyolefin resin having an oxygen permeability coefficient falling in the above range is used, the good oxygen-absorbing performance is obtained.

A thickness of the oxygen-absorbing resin layer shall not specifically be restricted and is preferably 5 to 200 µm, particularly preferably 10 to 100 µm. In the above case, a performance in which the oxygen-absorbing resin layer absorbs oxygen can be enhanced more as compared with a case in which the thickness deviates from the ranges described above, and the processability and the economical efficiency can be prevented from being damaged. A thickness of the oxygen-permeating layer is preferably smaller since the above layer is an isolation layer for the oxygen-absorbing resin layer, and it is preferably 5 to 200 µm, particularly preferably 10 to 80 µm. In the above case, a rate at which the oxygen-absorbing resin layer absorbs oxygen can be enhanced more as compared with a case in which the thickness deviates from the ranges described above, and the processability can be prevented from being damaged.

Considering a processability of the deoxidizing multilayer film, a thickness ratio of the sealant layer or the oxygen-permeating layer to the oxygen-absorbing resin layer is preferably 1:0.5 to 1:3, particularly preferably 1:1.5 to 1:2.5. Further, considering the processability, an intermediate layer comprising a polyolefin resin is present preferably between the gas-barriering layer and the oxygen-absorbing resin layer. A thickness of the above intermediate layer is preferably almost the same as that of the oxygen permeating layer in terms of the processability. In the above case, considering data spread attributable to processing, the thickness ratios falling within ±10% shall be regarded as the same.

The oxygen-absorbing resin layer in the oxygen-absorbing multilayer film of the present invention contains preferably at least a polyolefin resin, a modified polyethylene resin, a transition metal catalyst and a polyamide resin, and a content of the modified polyethylene resin in the above oxygen-absorbing resin layer is 2 to 30% by weight.

The modified polyethylene resin described above which is used in the present invention means a polyethylene resin in which at least a part of the polyethylene resin is graft-modified by unsaturated carboxylic acid or an acid anhydride thereof. Polyethylene resins modified by unsaturated carboxylic acids such as acrylic acid, maleic acid, methacrylic acid, maleic anhydride, fumaric acid, itaconic acid and the like can be shown as the examples of the modified polyethylene resin. Considering a mixing property with the polyamide resin A, an adhesive property with an adjacent layer and a mixing property with the polyolefin resin, a maleic anhydride-modified polyethylene resin is particularly preferred.

If the modified polyethylene resin is added to the oxygen-absorbing resin layer, an adhesive property (interlayer strength) with a layer adjacent to the oxygen-absorbing resin layer is enhanced in preparing the oxygen-absorbing multilayer film, and as a result thereof, a sealing strength in processing it into a bag and the like is enhanced as well. A content of the modified polyethylene resin in the oxygen-absorbing resin layer is preferably 2 to 30% by weight, particularly preferably 5 to 20% by weight. If a content of the modified polyethylene resin is 2% by weight or more, an effect of enhancing the interlayer strength is excellent. If it is 30% by weight or less, the oxygen-absorbing performance is excellent, and an adverse effect is not exerted on an odor of the film and recycling of the scraps. Considering a processability of the film, the modified polyethylene resin having MFR of 3 to 25 g/10 minutes at 200° C. and 4 to 35 g/10 minutes at 240° C. is preferably used.

Intermediate Layer:

Considering a processability, the oxygen-absorbing multilayer film of the present invention is prepared preferably by laminating at least four layers of a sealant layer comprising a polyolefin resin, the foregoing oxygen-absorbing resin layer containing at least a polyolefin resin, a transition metal catalyst and a polyamide resin, an intermediate layer comprising a polyolefin resin and a gas-barriering layer comprising a gas-barriering film in this order. A laminate strength of the multilayer film is enhanced by providing the intermediate layer between the oxygen-absorbing resin layer and the gas-barriering layer.

Considering a compatibility, the same resin as the polyolefin resin used for the oxygen-absorbing resin layer is preferably used, as is the case with the sealant layer, for the intermediate layer containing a polyolefin resin between the gas-barriering layer containing a gas-barriering film and the oxygen-absorbing resin layer in the present invention. The above intermediate layer can prevent a reduction in an interlayer strength with the gas-barriering layer which is brought about attributable to the transition metal catalyst released from the oxygen-absorbing resin layer. A thickness of the above intermediate layer is preferably almost the same as a thickness of the sealant layer from the viewpoint of the processability, and it is preferably 2 to 50 µm, particularly preferably 5 to 30 µm. In the above case, considering data spread attributable to processing, a thickness ratio falling within ±10% shall be regarded as the same.

In processing into a film and a sheet, a thickness ratio of the sealant layer, the oxygen-absorbing resin layer and the intermediate layer is, considering the processability, preferably 1:0.5:1 to 1:3:1, particularly preferably 1:1:1 to 1:2.5:1.

Gas-Barriering Layer:

Various deposited films of gas-barriering thermoplastic resins, gas-barriering thermosetting resins, silica, alumina, aluminum and the like and metal foils such as aluminum foil and the like can be used as a gas-barriering film used for the gas-barriering layer of the present invention. Ethylene-vinyl alcohol copolymer, MXD6, polyvinylidene chloride, amine-epoxy hardeners and the like can be shown as the examples of the gas-barriering thermoplastic resins. Also, gas-barriering epoxy resins, for example, "MAXIVE" manufactured by Mitsubishi Gas Chemical Co., Inc. can be shown as the examples of the gas-barriering thermosetting resins.

The present invention relates to an oxygen-absorbing multilayer film prepared by laminating at least the sealant layer described above, the oxygen-absorbing resin layer described above, an epoxy resin-cured film layer and an outer layer in this order, wherein the above epoxy resin-cured film layer comprises an epoxy resin-cured film which is obtained by curing an epoxy resin composition comprising an epoxy resin and an epoxy resin curing agent as principal components and which contains 40% by weight or more of a skeletal structure represented by the following Formula (1):

[Chemical Formula 1]

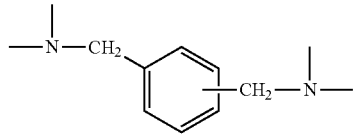

(1)

In the oxygen-absorbing multilayer film of the present invention, the epoxy resin-cured film layer comprises the epoxy resin-cured film obtained by curing the epoxy resin composition comprising the epoxy resin and the epoxy resin curing agent as the principal components, and the skeletal structure represented by Formula (1) described above is contained in the above epoxy resin-cured film in a proportion of 40% by weight or more, preferably 45% by weight or more, more preferably 50% by weight or more. The skeletal structure represented by Formula (1) is contained in the above epoxy resin-cured film in a high level, whereby the high gas-barriering property is exerted. According to the present invention, the epoxy resin-cured film having an oxygen-barriering property of an oxygen permeability coefficient of 1.0 mL·mm/(m²·day·MPa) (23° C., 60% RH) or less can be obtained as well. The epoxy resin and the epoxy resin curing agent which are the principal components of the epoxy resin composition shall be explained below.

The epoxy resin in the present invention may be any of aliphatic compounds, alicyclic compounds, aromatic compounds and heterocyclic compounds. Considering to exert the high gas-barriering property, epoxy resins containing aromatic parts in a molecule are preferred, and epoxy resins containing the skeletal structure represented by Formula (1) described above in a molecule are more preferred. The specific examples thereof include epoxy resins having a glycidylamino group derived from metaxylylenediamine, epoxy resins having a glycidylamino group derived from 1,3-bis(aminomethyl)cyclohexane, epoxy resins having a glycidylamino group derived from diaminodipheylmethane, epoxy resins having a glycidylamino group and/or a glycidyloxy group derived from paraminophenol, epoxy resins having a glycidyloxy group derived from bisphenol A, epoxy resins having a glycidyloxy group derived from bisphenol F, epoxy resins having a glycidyloxy group derived from phenol novolac, epoxy resins having a glycidyloxy group derived from resorcinol and the like. Among them, preferred are the epoxy resins having a glycidylamino group derived from metaxylylenediamine, the epoxy resins having a glycidylamino group derived from 1,3-bis(aminomethyl)cyclohexane, the epoxy resins having a glycidyloxy group derived from bisphenol F and the epoxy resins having a glycidyloxy group derived from resorcinol.

Further, the epoxy resins having a glycidyloxy group derived from bisphenol F and the epoxy resins having a glycidylamino group derived from metaxylylenediamine are more preferably used as the principal components, and the epoxy resins having a glycidylamino group derived from metaxylylenediamine are particularly preferably used as the principal component.

The various epoxy resins described above can be used as well by mixing them in a suited proportion in order to enhance various performances such as the flexibility, the impact resistance, the heat and moisture resistance and the like.

The epoxy resins described above are obtained by reacting alcohols, phenols or amines with epihalohydrin. For example, the epoxy resins having a glycidylamino group derived from metaxylylenediamine are obtained by adding metaxylylenediamine to epichlorohydrin. Metaxylylenediamine has four amino hydrogens, and therefore the mono-, di-, tri- and tetraglycidyl compounds are formed. The number of the glycidyl group can be changed by changing a reaction ratio of epichlorohydrin to metaxylylenediamine. For example, mainly an epoxy resin having 4 glycidyl groups is obtained by subjecting metaxylylenediamine to addition reaction with about 4 times mole of epichlorohydrin.

The epoxy resins described above are synthesized by reacting various alcohols, phenols and amines with excess epihalohydrin under the presence of alkali such as sodium hydroxide and the like on a temperature condition of 20 to 140° C., preferably 50 to 120° C. in a case of the alcohols and the phenols and 20 to 70° C. in a case of the amines and separating alkali halides produced.

A number average molecular weight of the epoxy resin produced is varied according to a mole ratio of epihalohydrin to various alcohols, phenols and amines, and it is about 80 to 4000, preferably about 200 to 1000 and more preferably about 200 to 500.

The epoxy resin curing agent in the present invention may be any of aliphatic compounds, alicyclic compounds, aromatic compounds and heterocyclic compounds, and epoxy resin curing agents which can usually be used such as polyamines, phenols, acid anhydrides or carboxylic acids can be used. The above epoxy resin curing agents can be selected according to use applications of the laminate film and the required performances in applications thereof.

To be specific, the polyamines include aliphatic amines such as ethylenediamine, diethylenetriamine, triethylenetetraamine, tetraethylenepentaamine and the like; aliphatic amines having aromatic rings such as metaxylylenediamine, paraxylylenediamine and the like; alicyclic amines such as 1,3-bis(aminomethyl)cyclohexane, isophoronediamine, norbornanediamine and the like; and aromatic amines such as diaminodiphenylmethane, metaphenylenediamine and the like. Further, capable of being also used as the epoxy resin curing agent are epoxy resins prepared by using the above compounds as raw materials, modifying reaction products of polyamines with monoglycidyl compounds, modifying reaction products of polyamines with epichlorohydrin, modifying reaction products of polyamines with alkylene oxides having 2 to 4 carbon atoms, amidooligomers obtained by reacting polyamines with multifunctional compounds having at least one acyl group and amidooligomers obtained by reacting polyamines with multifunctional compounds having at least one acyl group and monovalent carboxylic acids and/or derivatives thereof.

The phenols include polyhydric phenols such as catechol, resorcinol, hydroquinone and the like and resole type phenol resins.

Also, capable of being used as the acid anhydrides or the carboxylic acids are aliphatic acid anhydrides such as dodecenylsuccinic anhydride, polyadipic anhydride and the like, alicyclic acid anhydrides such as (methyl)tetrahydrophthalic anhydride, (methyl)hexahydrophthalic anhydride and the like, aromatic acid anhydrides such as phthalic anhydride, trimellitic anhydride, pyromellitic anhydride and the like and carboxylic acids thereof.

Considering to exert the high gas-barriering property, the epoxy resin curing agents containing aromatic parts in a molecule are preferred, and the epoxy resin curing agents containing the skeletal structure represented by Formula (1) in a molecule are more preferred.

To be specific, more preferably used are reaction products of metaxylylenediamine or paraxylylenediamine with epoxy resins obtained by using the above compounds as raw materials or monoglycidyl compounds, reaction products thereof with alkylene oxides having 2 to 4 carbon atoms, reaction products thereof with epichlorohydrin, reaction products thereof with multifunctional compounds having at least one acyl group which can form an amide group part by reaction with the above polyamines to form oligomers and reaction products of multifunctional compounds having at least one acyl group which can form an amide group part by reaction with the above polyamines to form oligomers with monovalent carboxylic acids and/or derivatives thereof.

Considering the high gas-barriering property and the good adhesive property, reaction products of (A) and (B) shown below or reaction products of (A), (B) and (C) shown below are particularly preferably used as the epoxy resin curing agents:

(A) metaxylylenediamine or paraxylylenediamine,
(B) multifunctional compounds having at least one acyl group which can form an amide group part by reaction with polyamines to form oligomers and
(C) monovalent carboxylic acids having 1 to 8 carbon atoms and/or derivatives thereof.

The multifunctional compounds (B) having at least one acyl group which can form an amide group part by reaction with polyamines to form oligomers include carboxylic acids such as acrylic acid, methacrylic acid, maleic acid, fumaric acid, succinic acid, malic acid, tartaric acid, adipic acid, isophthalic acid, terephthalic acid, pyromellitic acid, trimellitic acid and the like and derivatives thereof, for examples, esters, amides, acid anhydrides, acid chlorides and the like, and acrylic acid, methacrylic acid and derivatives thereof are particularly preferred.

Further, monovalent carboxylic acids having 1 to 8 carbon atoms such as formic acid, acetic acid, propionic acid, butyric acid, lactic acid, glycolic acid, benzoic acid and the like and derivatives thereof, for examples, esters, amides, acid anhydrides, acid chlorides and the like may be used in combination with the multifunctional compounds described above and reacted with initiating polyamines. The amide group parts derived by the reaction have a high cohesive force, and the amide group parts present in the epoxy resin curing agent in a high proportion provide the higher gas-barriering property and the good adhesive strength.

A reaction mole ratio of (A) and (B) or (A), (B) and (C) described above falls preferably in a range of 0.3 to 0.97 in terms of a ratio of the number of reactive functional groups contained in (B) to the number of amino groups contained in (A) or a ratio of the number of reactive functional groups contained in (B) and (C) to the number of amino groups contained in (A). If the ratio is smaller than 0.3, a sufficiently large amount of the amide groups is not formed in the epoxy resin curing agent, and the gas-barriering property of a high level and the adhesive property of a high level are not exerted. Further, a proportion of volatile molecules remaining in the epoxy resin curing agent is elevated, and it is a cause of odor generated from the cured film obtained. Also, a proportion of hydroxyl groups formed by the reaction of the epoxy groups with the amino groups in the cured reaction product is elevated, and therefore it is a factor of a marked reduction in the oxygen-barriering property under high humidity environment. On the other hand, if it falls in a range of higher than 0.97, an amount of the amino groups reacting with the epoxy groups is reduced, and the excellent impact resistance and the excellent heat resistance are not exerted. Further, the solubility in various organic solvents and water is reduced as well. Particularly considering a high gas-barriering property, a high adhesive property, inhibition of generating odor and a high oxygen-barriering property under high humidity environment in the cured film obtained, a mole ratio of the multifunctional compound to the polyamine component falls more preferably in a range of 0.6 to 0.97. Considering to exert the adhesive property of a higher level, at least 6% by weight of the amide group based on a whole amount of the epoxy resin curing agent is preferably contained in the above curing agent in the present invention.

Considering to exert the adhesive property to the base material, a reaction ratio in the reaction product of metaxylylenediamine or paraxylylenediamine which is the epoxy resin curing agent with the multifunctional compound having at least one acyl group which can form an amide group part by reaction with the above polyamines to form an oligomer falls in a range of 0.6 to 0.97, preferably 0.8 to 0.97 and particularly preferably 0.85 to 0.97 in terms of a mole ratio of the multifunctional compound to the polyamine component, and the epoxy resin curing agent elevating an average molecular weight of the oligomer which is the reaction product is preferably used.

The more preferred epoxy resin curing agent is a reaction product of metaxylylenediamine with acrylic acid, methacrylic acid and/or derivatives thereof. In this regard, a reaction mole ratio of acrylic acid, methacrylic acid and/or the derivatives thereof to metaxylylenediamine falls preferably in a range of 0.8 to 0.97.

In general, a blend proportion of the epoxy resin and the epoxy resin curing agent which are the principal components of the epoxy resin-curd film in the present invention may be a standard blend range in preparing an epoxy resin-curd film by reaction of an epoxy resin with an epoxy resin curing agent. To be specific, a ratio of the number of active hydrogens in the epoxy resin curing agent to the number of epoxy groups in the epoxy resin falls in a range of 0.5 to 5.0. If it falls in a range of smaller than 0.5, the remaining unreacted epoxy groups are a cause of reducing a gas-barriering property of the cured film obtained, and if it falls in a range of larger than 5.0, the remaining unreacted amino groups are a cause of reducing a heat and humidity resistance of the cured film obtained. Particularly considering a gas-barriering property and a heat and humidity resistance of the cured film obtained, the ratio falls in a range of more preferably 0.8 to 3.0, particularly preferably 0.8 to 2.0.

Also, considering to exert a high oxygen-barriering property of the cured film obtained under high humidity environment, a ratio of the number of active hydrogens in the epoxy resin curing agent to the number of epoxy groups in the epoxy resin falls preferably in a range of 0.8 to 1.4.

On the other hand, when carrying out thermoforming as is the case with thermoformed containers, the ratio falls in a range of preferably 1.6 to 5.0, more preferably 2.0 to 4.5.

A thermosetting resin composition such as a polyurethane base resin composition, a polyacryl base resin composition, a polyurea base resin composition and the like may be mixed, if necessary, with the epoxy resin composition in the present invention as long as the effects of the present invention are not damaged.

A wetting agent such as silicone or acryl base compounds may be added, if necessary, to the epoxy resin composition in the present invention in order to aid wetting of a surface in coating it on various materials. The suited wetting agent includes BYK331, BYK333, BYK347, BYK348, BYK354, BYK380, BYK381 and the like which are available from BYK Chemie AG. When adding them, a proportion thereof falls preferably in a range of 0.01 to 2.0% by weight based on a whole weight of the epoxy resin composition.

Also, in order to enhance various performances such as a gas-barriering property, an impact resistance, a heat resistance and the like of the epoxy resin-cured matter layer in the present invention, an inorganic filler such as silica, alumina, mica, talc, aluminum flakes, glass flakes and the like may be added to the epoxy resin composition.

Considering a transparency of the film, the above inorganic filler is preferably tabular. When adding them, a proportion thereof falls preferably in a range of 0.01 to 10.0% by weight based on a whole weight of the epoxy resin composition.

Further, in order to enhance an adhesive property of the epoxy resin-cured matter layer to the base material, a coupling agent such as a silane coupling agent, a titan coupling agent and the like may be added to the epoxy resin composition. Commercially available coupling agents can be used as the coupling agent, and among them, preferred are compounds having organic functional groups which can react with the gas-barriering resin composition of the present invention including amino base silane coupling agents such as N-(2-aminoethyl)-3-aminopropylmethyldimethoxysilane, N-(2-aminoethyl)-3-aminopropylmethyltrimethoxysilane, 3-aminopropyltriethoxysilane, 3-aminopropyltrimethoxysilane, N,N'-bis[[3-trimethoxysilyl]propyl]ethylenediamine and the like, epoxy base silane coupling agents such as 3-glycidoxypropyltrimethoxysilane, 3-glycidoxypropylmethyldimethoxysilane, 2-(3,4-epoxycyclohexyl)ethyltrimethoxysilane, 3-glycidoxypropyltriethoxysilane and the like, methacryloxy base silane coupling agents such as 3-methacryloxypropyl-trimethoxysilane and the like, mercapto base silane coupling agents such as 3-mercaptopropyltrimethoxysilane and the like, isocyanate base silane coupling agents such as 3-isocyanatepropyltriethoxysilane and the like which are available from Chisso Corporation, Dow Corning Toray Co., Ltd., Shin-Etsu Chemical Co., Ltd. and the like. When adding the above compounds, a proportion thereof falls preferably in a range of 0.01 to 5.0% by weight based on a whole weight of the epoxy resin composition. When the base material is a film on which various inorganic compounds such as silica, alumina and the like are deposited, the silane coupling agent is more preferred.

The outer layer in the present invention includes, for example, polyester base films of polyethylene terephthalate, polybutylene terephthalate and the like; polyamide base films of nylon 6, nylon 6,6, metaxyleneadipamide (N-MXD6) and the like; polyolefin base films of low density polyethylene, high density polyethylene, linear low density polyethylene, polypropylene and the like; polyacrylonitrile base films; poly(meth)acryl base films; polystyrene base films; polycarbonate base films; ethylene-vinyl alcohol copolymer (EVOH) base films; polyvinyl alcohol base films; papers such as carton and the like; and metal foils of aluminum, copper and the like. Also, capable of being used are films obtained by coating various polymers such as polyvinylidene chloride (PVDC) resins, polyvinyl alcohol resins, ethylene-vinyl acetate copolymer-saponified base resins, acryl base resins and the like on various materials used as the above base materials; films on which various inorganic compounds or metals such as silica, alumina, aluminum and the like are deposited; films in which inorganic fillers and the like are dispersed; and films provided with an oxygen-scavenging function.

The epoxy resin-cured film in the present invention is characterized by having a high gas-barriering property in addition to an adhesive performance to the suited base materials, and it shows a high gas-barriering property in a wide range extending from a low humidity condition to a high humidity condition. This allows gas-barriering films prepared by using the epoxy resin-cured film in the present invention to exert a gas-barriering property of a very high level without using gas-barriering materials usually used such as inorganic film-deposited films on which deposited are a PVCD coating layer, a polyvinyl alcohol (PVA) coating layer, an ethylene-vinyl alcohol copolymer (EVOH) film layer, a metaxylyleneadipamide film layer, alumina, silica and the like. When an inorganic film-deposited film is used as an outer layer, use of the epoxy resin-cured film makes it possible to notably reduce a degree of deterioration of a gas-barriering property caused by sudden bending.

Gas-barriering films such as ethylene-vinyl alcohol copolymer (EVOH) base films, polyvinyl alcohol base films, polyvinyl alcohol coating films, polyvinyl alcohol coating films in which inorganic fillers are dispersed, metaxylyleneadipamide (N-MXD6) films and the like have the defect that a gas-barriering property thereof is reduced under a high humidity condition, but the above defect can be solved by using the epoxy resin-cured film in the present invention to prepare the film using the above gas-barriering films for an outer layer.

Further, the epoxy resin-cured film in the present invention is excellent in a toughness and a heat and humidity resistance, and therefore gas-barriering films excellent in an impact resistance, a boiling treatment resistance, a retort treatment resistance and the like are obtained.

In order to inhibit foaming of a coating liquid of the epoxy resin composition in the present invention in preparing the coating liquid, a defoaming agent such as silicone, acryl base compounds and the like may be added to the coating liquid. The suited defoaming agent includes BYK019, BYK052, BYK065, BYK066N, BYK067N, BYK070, BYK080 and the like which are available from BYK Chemie AG., and BYK065 is particularly preferred. When the above defoaming agents are added, a proportion thereof falls in a range of preferably 0.01 to 3.0% by weight, more preferably 0.02 to 2.0% by weight based on a whole weight of the epoxy resin composition.

A thickness of the gas-barriering layer in using the thermoplastic resin as the gas-barriering resin in the present invention for the gas-barriering layer is preferably 5 to 200 μm, particularly preferably 10 to 100 μm. Also, when a thermosetting resin such as the epoxy resin-cured film described above is used for the gas-barriering adhesive layer, a thickness thereof is preferably 0.1 to 100 μm, more preferably 0.1 to 30 μm, further preferably 0.2 to 20 μm and particularly preferably 0.2 to 10 μm. When the thickness falls in the ranges described above, the gas-barriering property and the adhesive property can be enhanced more as compared with a case in which the thickness deviates from the ranges described above, and the processability and the economical efficiency such as the drying property and formation of the gas-barriering layer having an even thickness can be prevented from being damaged.

Other Layer:

In the present invention, a protective layer comprising a thermoplastic resin is preferably provided on an inside or an outside of the gas-barriering layer in order to prevent breakage and pin holes of the gas-barriering layer. The resin used for the protective layer includes the resins constituting the outer layer of the epoxy resin-cured film described above, and in addition thereto, it includes, for example, polyethylenes such as high density polyethylene and the like, polypropylenes such as propylene homopolymers, propylene-ethylene random copolymers, propylene-ethylene block copolymers and the like, polyamides such as nylon 6, nylon 6,6 and the like, polyesters such as PET and the like and combinations thereof.

Oxygen-Absorbing Multilayer Film:

The oxygen-absorbing multilayer film of the present invention comprises at least three layers of the sealant layer or the oxygen permeating layer, the oxygen-absorbing resin layer and the gas-barriering layer each described above and has preferably an intermediate layer between the oxygen-absorbing resin layer and the gas-barriering layer, and it has, if necessary, the other layer described above. A production method for the oxygen-absorbing multilayer film can make use of publicly known methods such as a coextrusion method, various laminating methods, various coating methods and the like according to the properties of the various materials, the processing purpose, the processing steps and the like. For example, molding of the film and the sheet includes a method in which they are produced by extruding the molten resin composition from an adjunct extruding equipment through a T die, a circular die and the like and a method in which they are produced by coating an adhesive on an oxygen-absorbing film or sheet and sticking it on other films or sheets. Also, a multilayer container having a prescribed form can be molded at one blow by co-injecting or successively injecting the molten resin composition into an injection metal die through a multilayer multiple dice by means of an injection equipment.

Oxygen-Absorbing Multilayer Container:

The oxygen-absorbing multilayer container of the present invention is prepared by thermoforming the oxygen-absorbing multilayer film described above.

The oxygen-absorbing multilayer film obtained can be prepared in the form of a film and used by processing into a bag and a cover material. Also, it can be prepared in the form of a sheet and thermoformed into the oxygen-absorbing multilayer container having a prescribed form such as trays, cups, bottles, tubes, PTP (press•through•pack) and the like by a molding method such as vacuum molding, compression molding, plug assist molding and the like. Further, the oxygen-absorbing multilayer container can be subjected to boiling treatment at 80 to 100° C. and semi-retort, retort and high retort treatments at 100 to 135° C. Also, it can be used preferably for a pouch provided with an easy-vapor-passing port which meets cooking by an electronic oven, wherein the bag-like container provided with an opened port is filled with a content such as food and the like, and vapor is released from the above opened port in heating and cooking the content by the electronic oven.

The oxygen-absorbing multilayer film and the oxygen-absorbing multilayer container of the present invention are used for a part or a whole part of a packaging container for tight sealing with the sealant layer or the oxygen permeating layer turned•to an inside, whereby oxygen in the container as well as a small amount of oxygen coming in from an outside of the container can be absorbed to prevent a content in the container from changing in quality due to oxygen.

The oxygen-absorbing multilayer film described above can be used as an oxygen-absorbing paper container by laminating a paper substrate on the outer layer of the gas-barriering layer.

The present invention relates to the oxygen-absorbing multilayer container prepared by subjecting a laminated material prepared by laminating at least a paper substrate, a gas-barriering layer, the oxygen-absorbing resin layer of the present invention and a thermoplastic resin inner layer in this order to container manufacturing.

A thermoplastic resin outer layer may be provided, if necessary, on an outer layer of the paper substrate. It can be thermally fused with the thermoplastic resin inner layer described above to tightly seal the container.

In respect to a processability of the paper container prepared by laminating the paper substrate, a thickness of an inside part of the gas-barriering layer is preferably 60 μm or less, particularly preferably 50 μm or less. If a thickness of the inside part is larger than that of the gas-barriering layer, a problem is brought about on a processability into the container in laminating the paper substrate and molding it into a container form.

The paper substrate is a substrate constituting the paper container and provides it with a formability, a flexibility, a rigidity, a toughness, a strength and the like, and for example, strong sizing, bleached or non-bleached paper substrates, white roll papers, craft papers, board papers, processed papers and the like can be used therefor. Papers having a basis weight of 80 to 600 g/m$^2$, preferably papers having a basis weight of 100 to 450 g/m$^2$ are preferred as the paper substrate. The paper substrate may be provided with printings such as characters, figures, marks, pictures, patterns and the like.

The oxygen-absorbing paper container can be various paper containers of a gable top type, a brick type, a flat top type and the like.

The oxygen-absorbing paper container can suitably be used, for example, for milk, milk products, juice, coffee, alcoholic beverages, carbonated beverages, liquid seasonings such as soy sauce, noodle soup, stock and the like, chemicals, drugs, detergents and the like.

The present invention relates to an oxygen-absorbing sealed container which comprises a cover material comprising the oxygen-absorbing multilayer film of the present invention and a gas-barriering molded container prepared by laminating at least three layers of a thermoplastic resin inner layer, a gas-barriering layer and a thermoplastic resin outer layer in this order and which is prepared by bonding the above sealant layer to the thermoplastic resin inner layer by heat sealing.

The oxygen-absorbing multilayer film constituting the cover material in the oxygen-absorbing sealed container of the present invention is the oxygen-absorbing multilayer film of the present invention and is prepared by laminating at least three layers of a sealant layer or an oxygen permeating layer, an oxygen-absorbing resin layer and a gas-barriering layer in this order, and the oxygen-absorbing resin layer contains a polyamide resin A which is obtained by polycondensation of aromatic diamine and dicarboxylic acid and in which an end amino group concentration is 30 μeq/g or less, a transition metal catalyst and a polyolefin resin.

The gas-barriering molded container constituting the oxygen-absorbing sealed container of the present invention is a gas-barriering molded container prepared by laminating at least three layers of a thermoplastic resin outer layer, a gas-barriering layer and a thermoplastic resin inner layer from an outside of the container.

A thermoplastic resin is used for the thermoplastic resin outer layer and the thermoplastic resin inner layer constituting the gas-barriering molded container. Various polyethylenes such as high density polyethylene, medium density polyethylene, low density polyethylene, linear low density polyethylene, ultra low density polyethylene, polyethylene produced by a metallocene catalyst and the like, polystyrene, ethylene-vinyl acetate copolymers, ionomers, ethylene-methyl acrylate copolymers, ethylene-ethyl acrylate copolymers, ethylene-acrylic acid copolymers, ethylene-methacrylic acid copolymers, ethylene-methyl methacrylate copolymers, polymethylpentene, various polypropylenes such as propylene homopolymers, propylene-ethylene block copolymers, propylene-ethylene random copolymers, polypropylene produced by a metallocene catalyst and the like, thermoplastic elastomers, polyethylene terephthalate, nylons and the like can be used alone or in combination for the thermoplastic resin used.

A gas-barriering film is used for the gas-barriering layer constituting the gas-barriering molded container. An ethylene-vinyl alcohol copolymer, nylon MXD6, polyvinylidene chloride and aluminum are shown as the examples of the gas-barriering film. When carrying out heating treatment of 80° C. or higher such as retort, boiling sterilization and the like, nylon MXD6 is particularly preferably used. A nylon MXD6 resin composition prepared by mixing nylon MXD6 with non-crystalline nylon may be used.

The oxygen-absorbing sealed container of the present invention comprises the cover material comprising the oxygen-absorbing multilayer film and the gas-barriering molded container each described above and is obtained by bonding the sealant layer of the above cover material to the thermoplastic resin inner layer of the above molded container by heat sealing, and it provides the effect that iron powder is not adhered on a flange part.

The oxygen-absorbing multilayer container of the present invention can absorb oxygen regardless of the presence of moisture in the stored film and therefore can suitably be used for dried foods such as powder seasonings, powder coffee, coffee beans, rice, tea, beans, baked rice crackers, rice crackers and the like, drugs, health foods such as vitamin preparations and the like. In addition thereto, the oxygen-absorbing multilayer container obtained in the present invention can suitably be used, unlike conventional oxygen-absorbing resin compositions in which iron powder is used, for alcohol beverages and carbonated beverages, acetic acid-containing foods and the like which can not be stored due to the presence of iron and applications in which hydrogen peroxide sterilization is carried out for sterilizing containers.

In addition thereto, capable of being listed as the stored goods are processed rices such as milled rice, cooked rice, festive red rice, rice cakes and the like, cooked foods such as soup, stew, curry and the like, fruits, sweet stuffs such as sweet jelly of beans, purine, cakes, steamed bean-lam bun and the like, fishery products such as tuna, fishes, shellfishes and the like, milk processed products such as cheese, butter and the like, meat, meat processed products such as salami, sausage, ham and the like, vegetables such as carrot, potato, asparagus, shiitake mushroom and the like and eggs.

Method for Storing a Content of a Fluid Infusion Container:

The present invention relates to a method for preserving a content of a fluid infusion container in which a content of a fluid infusion container is preserved in an oxygen-absorbing container prepared by using wholly or partially an oxygen-absorbing multilayer film prepared by laminating at least three layers of an oxygen-permeating layer comprising a thermoplastic resin, an oxygen-absorbing resin layer containing at least a polyolefin resin, a transition metal catalyst and a polyamide resin and a gas-barriering layer comprising a gas-barriering film in order from an inside, wherein the above polyamide resin is a polyamide resin which is obtained by polycondensation of at least aromatic diamine and dicarboxylic acid and in which an end amino group concentration is 30 μeq/g or less, and a total content of the transition metal catalyst and the polyamide resin in the oxygen-absorbing resin layer is 15 to 60% by weight.

The fluid infusion container is constituted from, for example, polyolefins such as polyethylene, polypropylene and the like from the viewpoint of a moisture resistance, a sanitary property and the like. The above resins are excellent in a moisture resistance and a sanitary property but inferior in a gas-barriering property. The oxygen-absorbing multilayer container of the present invention is excellent in a gas-barriering property and can effectively reduce oxygen remaining in the oxygen-absorbing multilayer film, and therefore even if the fluid infusion container is filled with a content liquid which is likely to be changed in quality by oxygen, the content liquid can be preserved therein without changing in quality.

Shown as the examples of the content liquid which is likely to be changed in quality by oxygen are transfusion materials containing amino acid components such as L-isoleucine, L-leucine, L-lysine, L-methionine, L-phenylalanine, L-threonine, L-valine, L-tyrosine, L-tryptophan, L-arginine, L-histidine, L-alanine, L-asparagine, aminoacetic acid, L-proline, L-serine and the like and in addition thereto, transfusion materials containing sugar contents, fats and vitamins as well as cardiovascular agents such as dobutamine hydrochloride, dopamine hydrochloride and the like and preparations containing them.

The content of the fluid infusion container is tightly sealed in an oxygen-absorbing container prepared by using wholly or partially an oxygen-absorbing multilayer film prepared by laminating at least three layers of an oxygen-permeating layer comprising a thermoplastic resin, an oxygen-absorbing resin layer containing a polyamide resin A, a transition metal catalyst and a polyolefin resin and a gas-barriering layer comprising a gas-barriering film in order from an inside, and it is stored. This makes it possible to absorb oxygen in the container as well as a small amount of oxygen coming in from an outside of the container to prevent the content in the fluid infusion container from changing in quality due to oxygen. Further, use of the member having a transparency makes it possible to confirm a content without opening the packaging container, and therefore the packaging container having a good handling property is obtained. Further, the oxygen-absorbing container prepared by using wholly or partially the oxygen-absorbing multilayer film of the present invention can be used as well for the fluid infusion container to preserve a content of the fluid infusion container.

EXAMPLES

The present invention shall be explained below in further details with reference to examples and comparative examples, but the present invention shall not be restricted by them. In the following examples and comparative examples, various physical property values were measured by the following measuring methods and measuring equipments.

Measuring Method of Tg:

Tg was measured according to JIS K7122. "DSC-60" manufactured by Shimadzu Corporation was used for a measuring equipment.

Measuring Method of Melting Point:

A DSC melting peak temperature was measured for the melting point according to ISO 11357. "DSC-60" manufactured by Shimadzu Corporation was used for a measuring equipment.

Measuring Method of Number Average Molecular Weight:

The number average molecular weight was measured by GPC-LALLS. "Shodex GPC-2001" manufactured by Showa Denko K.K. was used for a measuring equipment.

Measuring Method of MFR:

MFR of the respective resins was measured at a specific temperature on the condition of a load 2160 g by means of an equipment according to JIS K7120 ("Melt Indexer" manufactured by Toyo Seiki Seisaku-sho, Ltd.), and a value thereof was shown together with the temperature (unit: "g/10 minutes"). When MFR was measured according to JIS K7120, it was specifically described accordingly.

Measuring Method of Oxygen Permeability Coefficient:

The oxygen permeability coefficient was measured on the conditions of 23° C.·60% RH and a cell area of 50 cm$^2$ by means of "OX-TRAN-2/21" manufactured by MOCON, Inc.

Measuring Method of End Amino Group Concentration:

The sample 0.5 g was dissolved in 30 mL of phenol/ethanol=4/1 (volume ratio), and 5 mL of methanol was added thereto. Hydrochloric acid of 0.01 normal was used as a titrating liquid to titrate the solution by means of an automatic titrating equipment ("COM-2000" manufactured by Hiranuma Seisakusho Co., Ltd.). The same operation carried out without adding the sample was set to a blank, and the end amino group concentration was calculated from an equation shown below:

$$\text{end amino group concentration}(\mu eq/g)=(A-B)\times f\times 10/C$$

(A: titration amount (mL), B: blank titration amount (mL), f: factor of the titrating liquid, C: sample amount (g)).

Measuring Method of End Carboxyl Group Concentration:

The sample 0.5 g was dissolved in 30 mL of benzyl alcohol, and 10 mL of methanol was added thereto. A sodium hydroxide solution of 0.01 normal was used as a titrating liquid to titrate the solution by means of the automatic titrating equipment ("COM-2000" manufactured by Hiranuma Seisakusho Co., Ltd.). The same operation carried out without adding the sample was set to a blank, and the end carboxyl group concentration was calculated from an equation shown below:

$$\text{end carboxyl group concentration}(\mu eq/g)=(A-B)\times f\times 10/C$$

(A: titration amount (mL), B: blank titration amount (mL), f: factor of the titrating liquid, C: sample amount (g)).

Measuring Method of Semi-Crystallization Time:

When the pellets are molten at the respective temperatures to crystallize the resin at the respective temperatures, time required for crystallization of a whole part is called crystallization time, and time required for 50% of crystallization is called semi-crystallization time. The semi-crystallization time was measured by a depolarized light intensity method. That is, the molten sample pellet was irradiated with light, and a permeation amount of light was decreased as the sample pellet was crystallized; a point in which it was stabilized was set to crystallization, and time required for it was set to crystallization time; and time at which a permeation amount of light reached 50% of crystallization was set to semi-crystallization time. The crystallization time and the semi-crystallization time were varied according to the measuring temperatures, and in the following descriptions, the shortest semi-crystallization time out of the semi-crystallization times at the respective temperatures was described as the "semi-crystallization time". The crystallization time and the semi-crystallization time were measured by means of a "polymer crystallization rate measuring equipment model MK-701" manufactured by Kotaki Co., Ltd.

Synthetic Conditions of Polyamide Resin in Melt Polymerization:

After dicarboxylic acid was heated at 170° C. and molten in a reaction container, aromatic diamine was gradually and continuously dropwise added thereto while stirring the content so that a mole ratio thereof to the dicarboxylic acid was about 1:1, and the temperature was elevated up to 240° C. After finishing dropwise adding, the temperature was elevated up to 260° C. to continue the reaction. After finishing the reaction, the reaction container was slightly pressurized by nitrogen, and the strand was extruded from the die head having a hole and pelletized by means of a pelletizer.

Synthetic Conditions of Polyamide Resin in Solid Phase Polymerization:

A rotary tumbler equipped with a heating device was charged with the pellets obtained by carrying out the melt polymerization by the method described above, and operation in which the tumbler was reduced in pressure down to 1 torr while rotating the tumbler and then returned to atmospheric pressure by nitrogen was carried out three times. Then, the equipment was heated while maintaining an inside of the equipment at 30 torr by rotating the tumbler to control an inside of the equipment to 150° C., and the reaction was continued at the temperature for prescribed time. Then, the equipment was cooled down to 60° C. to obtain a polyamide resin.

Measuring Method of Sealing Strength:

Measured according to JIS Z1526 by means of a tensile test equipment.

Measuring Method of Heat Fusion Strength:

Measured according to JIS Z1526 by means of a tensile test equipment.

Oxygen-Absorbing Resin Composition

Example 1A

Metaxylylenediamine:sebacic acid:adipic acid were used in a mole ratio of 0.992:0.4:0.6 and subjected to melt polymerization and solid phase polymerization on the synthetic conditions described above to synthesize a polyamide resin (hereinafter, the above polyamide resin is referred to as the polyamide 1A). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1A had Tg of 73° C., a melting point of 184° C., a semi-crystallization time of 2000 seconds or longer, an end amino group concentration of 17.5 µeq/g, an end carboxyl group concentration of 91.6 µeq/g, a number average molecular weight of 23500 and MFR of 11.0 g/10 minutes at 240° C. A non-stretched film was prepared from the resulting polyamide 1A alone, and an oxygen permeability coefficient thereof was determined to find that it was 0.34 cc·mm/(m$^2$·day·atm) (23° C., 60% RH).

Cobalt stearate was added as a transition metal catalyst to the molten polyamide 1A through a side feed by means of a biaxial extruding equipment so that a cobalt concentration was 400 ppm. Further, the resulting mixture (hereinafter referred to as the cobalt stearate-containing polyamide 1A) of the polyamide and cobalt stearate was molten and kneaded at 240° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) in a weight ratio of the cobalt stearate-containing polyamide 1A:LLDPE=35:65 to obtain an oxygen-absorbing resin composition. Then, the above oxygen-absorbing resin composition was used to obtain a film having a thickness of 50 µm and comprising a single layer of the oxygen-absorbing resin composition, and an appearance of the film was observed to find that an appearance of the film was good. The above film was cut into two films of 10×10 mm, and each two sheets of the above film were put in gas-barriering bags which comprised an aluminum foil-laminated layer film and in which moisture contents in the bags were 30% and 100% together with 300 ml of air, followed by tightly sealing the bags. They were stored at 23° C. to measure a whole amount of oxygen absorbed for 7 days after tightly sealed. On the other hand, an elongation rate of the film after stored at 40° C. and a humidity of 100% for one month was measured. The results thereof are shown in Table 2A.

Example 2A

A film was produced in the same manner as in Example 1A to measure an oxygen absorption amount and an elongation rate of the above film and observe an appearance thereof, except that a weight ratio in melting and kneading was changed to the cobalt stearate-containing polyamide 1A:LLDPE=55:45. The results thereof are shown in Table 2A.

Example 3A

A film was produced in the same manner as in Example 1A to measure an oxygen absorption amount and an elongation rate of the above film and observe an appearance thereof, except that a weight ratio in melting and kneading was changed to the cobalt stearate-containing polyamide 1A:LLDPE=25:75. The results thereof are shown in Table 2A.

Example 4A

Metaxylylenediamine and adipic acid were used in a mole ratio of 0.991:1 and subjected to melt polymerization and solid phase polymerization on the synthetic conditions described above to synthesize a polyamide resin (hereinafter, the above polyamide resin is referred to as the polyamide 2A). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 2A had Tg of 84° C., a melting point of 237° C., a semi-crystallization time of 25 seconds, an end amino group concentration of 19.8 µeq/g, an end carboxyl group concentration of 68.6 µeq/g and a number average molecular weight of 23000. MFR could not be measured at 240° C. since it was close to the melting point, and MFR at 250° C. was measured to find that MFR at 250° C. was 14.4 g/10 minutes. A non-stretched film was prepared from the resulting polyamide 2A alone, and an oxygen permeability coefficient thereof was determined to find that it was 0.09 cc·mm/(m$^2$·day·atm) (23° C., 60% RH).

Then, cobalt stearate was added to the polyamide 2A, and the mixture was molten and kneaded with LLDPE to produce a film comprising a single layer of the oxygen-absorbing resin composition in the same manners as in Example 1A, except that the temperature in melting and kneading was changed to 250° C. Further, an oxygen absorption amount and an elongation rate of the above film were measured, and an appearance thereof was observed in the same manners as in Example 1A. The results thereof are shown in Table 2A.

Example 5A

Metaxylylenediamine and paraxylylenediamine were mixed in 7:3, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 285° C. by means of a biaxial extruding equipment to mask an end amino group (hereinafter, the above polyamide resin is referred to as the polyamide 3A). Controlled were the dropwise adding time to 2 hours, the polymerization temperature after finishing dropwise adding metaxylylenediamine in the melt polymerization to 277° C. and the reaction time to 30 minutes. The above polyamide 3A had Tg of 87° C., a melting point of 255° C., a semi-crystallization time of 18 seconds, an end amino group concentration of 25.8 µeq/g, an end carboxyl group concentration of 65.6 µeq/g and a number average molecular weight of 18500. MFR could not be measured at 250° C. since it was close to the melting point, and MFR at 260° C. was measured to find that MFR at 260° C. was 29.8 g/10 minutes. A non-stretched film was prepared from the resulting polyamide 3A alone, and an oxygen permeability coefficient thereof was determined to find that it was 0.13 cc·mm/(m$^2$·day·atm) (23° C., 60% RH).

Then, cobalt stearate was added to the polyamide 3A, and the mixture was molten and kneaded with LLDPE to produce a film comprising a single layer of the oxygen-absorbing resin composition in the same manners as in Example 1A, except that the temperature in melting and kneading was changed to 265° C. Further, an oxygen absorption amount and an elongation rate of the above film were measured, and an appearance thereof was observed in the same manners as in Example 1A. The above film was a little inferior in an appearance, and line-like unevenness was observed thereon. The results thereof are shown in Table 2A.

Example 6A

Metaxylylenediamine:adipic acid:isophthalic acid were used in a mole ratio of 0.991:0.8:0.2 and subjected to melt polymerization and solid phase polymerization on the synthetic conditions described above to synthesize a polyamide resin (hereinafter, the above polyamide resin is referred to as the polyamide 4A). Controlled were the dropwise adding time to 2 hours, the reaction time in the melt polymerization to 1 hour, the pressure in an inside of the equipment in the solid phase polymerization to 1 torr or less, the polymerization temperature to 215° C. and the polymerization time to 4 hours. The above polyamide 4A had Tg of 92° C., a melting point of 230° C., a semi-crystallization time of 250 seconds, an end amino group concentration of 14.8 µeq/g, an end carboxyl group concentration of 67.2 µeq/g and a number average molecular weight of 23000. MFR could not be measured at 240° C. since it was close to the melting point, and MFR at 250° C. was measured to find that MFR at 250° C. was 17.4 g/10 minutes. A non-stretched film was prepared from the resulting polyamide 4A alone, and an oxygen permeability coefficient thereof was determined to find that it was 0.07 cc·mm/(m$^2$·day·atm) (23° C., 60% RH).

Then, cobalt stearate was added to the polyamide 4A, and the mixture was molten and kneaded with LLDPE to produce a film comprising a single layer of the oxygen-absorbing resin composition in the same manners as in Example 1A, except that the temperature in melting and kneading was changed to 250° C. Further, an oxygen absorption amount and an elongation rate of the above film were measured, and an appearance thereof was observed in the same manners as in Example 1A. The results thereof are shown in Table 2A.

Example 7A

Metaxylylenediamine and sebacic acid were used in a mole ratio of 0.994:1 and subjected only to melt polymerization on the synthetic conditions described above to synthesize a polyamide resin (hereinafter, the above polyamide resin is referred to as the polyamide 5A). The dropwise adding time was controlled to 2 hours, and the reaction time in the melt polymerization was controlled to 1 hour. The above polyamide 5A had Tg of 61° C., a melting point of 190° C., a semi-crystallization time of 150 seconds, an end amino group concentration of 24.8 µeq/g, an end carboxyl group concentration of 57.2 µeq/g, a number average molecular weight of 17200 and MFR of 65.4 g/10 minutes at 240° C. A non-stretched film was prepared from the resulting polyamide 5A alone, and an oxygen permeability coefficient thereof was determined to find that it was 1.58 cc·mm/(m$^2$·day·atm) (23° C., 60% RH).

Then, cobalt stearate was added to the polyamide 5A, and the mixture was molten and kneaded with LLDPE in the same manners as in Example 1A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Example 8A

Metaxylylenediamine:adipic acid:isophthalic acid were used in a mole ratio of 0.998:0.95:0.05 and subjected to melt polymerization and solid phase polymerization on the synthetic conditions described above to synthesize a polyamide resin (hereinafter, the above polyamide resin is referred to as the polyamide 6A). Controlled were the dropwise adding time to 2 hours, the reaction time in the melt polymerization to 1 hour, the pressure in an inside of the equipment in the solid phase polymerization to 1 torr or less, the polymerization temperature to 215° C. and the polymerization time to 20 hours. The above polyamide 6A had Tg of 92° C., a melting point of 230° C., a semi-crystallization time of 250 seconds, an end amino group concentration of 28.8 µeq/g, an end carboxyl group concentration of 61.8 µeq/g, a number average molecular weight of 24200 and MFR of 10.1 g/10 minutes at 240° C. A non-stretched film was prepared from the resulting polyamide 6A alone, and an oxygen permeability coefficient thereof was determined to find that it was 0.08 cc·mm/(m$^2$·day·atm) (23° C., 60% RH).

Then, cobalt stearate was added to the polyamide 6A, and the mixture was molten and kneaded with LLDPE in the same manners as in Example 1A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Example 9A

Metaxylylenediamine:sebacic acid:adipic acid were used in a mole ratio of 0.998:0.6:0.4 and subjected to melt polymerization and solid phase polymerization on the synthetic conditions described above to synthesize a polyamide resin. Controlled were the dropwise adding time to 2 hours, the reaction time in the melt polymerization to 1 hour, the pressure in an inside of the equipment in the solid phase polymerization to 1 torr or less, the polymerization temperature to 150° C. and the polymerization time to 8 hours. Then, phthalic anhydride 0.2 wt % was added thereto, and the mixture was molten and kneaded at 250° C. by means of a biaxial extruding equipment to mask an end amino group (hereinafter, the above polyamide resin is referred to as the polyamide 7A). The above polyamide 7A had Tg of 70° C., a melting point of 157° C., a semi-crystallization time of 18 seconds, an end amino group concentration of 15.8 µeq/g, an end carboxyl group concentration of 51.6 µeq/g, a number average molecular weight of 23000 and MFR of 11.4 g/10 minutes at 240° C. A non-stretched film was prepared from the resulting polyamide 7A alone, and an oxygen permeability coefficient thereof was determined to find that it was 0.74 cc·mm/(m²·day·atm) (23° C., 60% RH).

Then, cobalt stearate was added to the polyamide 7A, and the mixture was molten and kneaded with LLDPE in the same manners as in Example 1A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Example 10A

Metaxylylenediamine:sebacic acid:adipic acid were used in a mole ratio of 0.992:0.3:0.7 and subjected to melt polymerization and solid phase polymerization on the synthetic conditions described above to synthesize a polyamide resin (hereinafter, the above polyamide resin is referred to as the polyamide 8A). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 8A had Tg of 78° C., a melting point of 194° C., a semi-crystallization time of 2000 seconds or longer, an end amino group concentration of 19.5 µeq/g, an end carboxyl group concentration of 81.2 µeq/g, a number average molecular weight of 24500 and MFR of 10.5 g/10 minutes at 240° C. A non-stretched film was prepared from the resulting polyamide 8A alone, and an oxygen permeability coefficient thereof was determined to find that it was 0.21 cc·mm/(m²·day·atm) (23° C., 60% RH).

Then, cobalt stearate was added to the polyamide 8A, and the mixture was molten and kneaded with LLDPE in the same manners as in Example 1A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Example 11A

Metaxylylenediamine:sebacic acid:adipic acid were used in a mole ratio of 0.992:0.7:0.3 and subjected to melt polymerization and solid phase polymerization on the synthetic conditions described above to synthesize a polyamide resin (hereinafter, the above polyamide resin is referred to as the polyamide 9A). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 9A had Tg of 65° C., a melting point of 170° C., a semi-crystallization time of 2000 seconds or longer, an end amino group concentration of 19.2 µeq/g, an end carboxyl group concentration of 80.0 µeq/g, a number average molecular weight of 25200 and MFR of 10.1 g/10 minutes at 240° C. A non-stretched film was prepared from the resulting polyamide 9A alone, and an oxygen permeability coefficient thereof was determined to find that it was 0.68 cc·mm/(m²·day·atm) (23° C., 60% RH).

Then, cobalt stearate was added to the polyamide 9A, and the mixture was molten and kneaded with LLDPE in the same manners as in Example 1A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Example 12A

A film was produced in the same manner as in Example 1A to measure an oxygen absorption amount and an elongation rate of the above film and observe an appearance thereof, except that a weight ratio in melting and kneading was changed to the cobalt stearate-containing polyamide 1:LLDPE=17:83. The results thereof are shown in Table 2A.

Comparative Example 1A

A film was produced in the same manner as in Example 1A to measure an oxygen absorption amount and an elongation rate of the above film and observe an appearance thereof, except that a weight ratio in melting and kneading was changed to the cobalt stearate-containing polyamide 1A:LLDPE=80:20. The results thereof are shown in Table 2A.

Comparative Example 2A

A film was produced in the same manner as in Example 1A to measure an oxygen absorption amount and an elongation rate of the above film and observe an appearance thereof, except that the mixture was not molten and not kneaded with LLDPE and that the film was prepared only from the cobalt stearate-containing polyamide 1A. The results thereof are shown in Table 2A.

Comparative Example 3A

A film was produced in the same manner as in Example 1A to measure an oxygen absorption amount and an elongation rate of the above film and observe an appearance thereof, except that a weight ratio in melting and kneading was changed to the cobalt stearate-containing polyamide 1A:LLDPE=10:90. The results thereof are shown in Table 2A.

Comparative Example 4A

A polyamide resin (hereinafter, the above polyamide resin is referred to as the polyamide 10A) was synthesized in the same manner as in Example 4A, except that metaxylylenediamine and adipic acid were used in a mole ratio of 0.998:1 and not subjected to solid phase polymerization. The above polyamide 10A had Tg of 78° C., a melting point of 237° C., a semi-crystallization time of 27 seconds, an end amino group concentration of 39.1 µeq/g, an end carboxyl group concentration of 70.2 µeq/g and a number average molecular weight of 17800. MFR could not be measured at 240° C. since it was close to the melting point, and MFR at 250° C. was measured to find that MFR at 250° C. was 51.0 g/10 minutes. A non-stretched film was prepared from the resulting polyamide 10A alone, and an oxygen permeability coefficient thereof was determined to find that it was 0.09 cc·mm/(m²·day·atm) (23° C., 60% RH).

Then, cobalt stearate was added to the polyamide 10A, and the mixture was kneaded with LLDPE in the same manners as in Example 4A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

Comparative Example 5A

A polyamide resin (hereinafter, the above polyamide resin is referred to as the polyamide 11A) was synthesized in the same manner as in Example 4A, except that metaxylylenediamine and adipic acid were used in a mole ratio of 0.991:1 and that a polymerization time in the solid phase polymerization was changed to 2 hours. The above polyamide 11A had Tg of 78° C., a melting point of 237° C., a semi-crystallization time of 25 seconds, an end amino group concentration of 34.8 μeq/g, an end carboxyl group concentration of 58.6 μeq/g and a number average molecular weight of 21800. MFR could not be measured at 240° C. since it was close to the melting point, and MFR at 250° C. was measured to find that MFR at 250° C. was 18.9 g/10 minutes. A non-stretched film was prepared from the resulting polyamide 11A alone, and an oxygen permeability coefficient thereof was determined to find that it was 0.09 cc·mm/(m²·day·atm) (23° C., 60% RH).

Then, cobalt stearate was added to the polyamide 11A, and the mixture was kneaded with LLDPE in the same manner as in Example 4A to produce a film comprising a single layer of the oxygen-absorbing resin composition. Further, an oxygen absorption amount and an elongation rate of the above film were measured, and an appearance thereof was observed in the same manners as in Example 1A. The results thereof are shown in Table 2A.

The respective details of the polyamides 1A to 11A obtained above are shown in Table 1A, and the results of the respective examples and comparative examples are shown in Table 2A.

TABLE 1A

|  | End amino group concentration (μeq/g) | Diamine[1] | Dicarboxylic acid[1] | Solid phase polymerization[2] | End Masking[3] | MFR (g/10 minutes) | Oxygen permeability coefficient (cc·mm/(m²·day·atm)) |
|---|---|---|---|---|---|---|---|
| Polyamide 1A | 17.5 | MXDA (0.992) | Sebacic acid (0.4) Adipic acid (0.6) | ○ (4 hours) | x | 11.0 (240° C.) | 0.34 |
| Polyamide 2A | 19.8 | MXDA (0.991) | Adipic acid (1.0) | ○ (4 hours) | x | 14.4 (250° C.) | 0.09 |
| Polyamide 3A | 25.8 | MXDA (0.7) PXDA (0.3) | Adipic acid (1.0) | x | ○ | 29.8 (260° C.) | 0.13 |
| Polyamide 4A | 14.8 | MXDA (0.991) | Adipic acid (0.8) Isophthalic acid (0.2) | ○ (4 hours) | x | 17.4 (250° C.) | 0.07 |
| Polyamide 5A | 24.8 | MXDA (0.994) | Sebacic acid (1.0) | x | x | 65.4 (240° C.) | 1.58 |
| Polyamide 6A | 28.8 | MXDA (0.998) | Adipic acid (0.95) Isophthalic acid (0.05) | ○ (20 hours) | x | 10.1 (240° C.) | 0.08 |
| Polyamide 7A | 15.8 | MXDA (0.998) | Sebacic acid (0.6) Adipic acid (0.4) | ○ (8 hours) | ○ | 11.4 (240° C.) | 0.74 |
| Polyamide 8A | 19.5 | MXDA (0.992) | Sebacic acid (0.3) Adipic acid (0.7) | ○ (4 hours) | x | 10.5 (240° C.) | 0.21 |
| Polyamide 9A | 19.2 | MXDA (0.992) | Sebacic acid (0.7) Adipic acid (0.3) | ○ (4 hours) | x | 10.1 (240° C.) | 0.68 |
| Polyamide 10A | 39.1 | MXDA (0.998) | Adipic acid (1.0) | x | x | 51.0 (250° C.) | 0.09 |
| Polyamide 11A | 34.8 | MXDA (0.999) | Adipic acid (1.0) | ○ (2 hours) | x | 18.9 (250° C.) | 0.09 |

MXDA: metaxylylenediamine,
PXDA: paraxylylenediamine
[1]Numerical value in parentheses shows a mole ratio of each component.
[2]○: the solid phase polymerization was carried out. The polymerization time is shown in parentheses. x: the solid phase polymerization was not carried out.
[3]○: the end amino group was masked. x: the end amino group was not masked.
4) A non-stretched film was prepared from the polyamide alone, and an oxygen permeability coefficient thereof was measured at 23° C. and 60% RH.

TABLE 2A

| | Composition | | | Film | | |
|---|---|---|---|---|---|---|
| | Polyamide (end amino group concentration) | Melting kneading ratio[1] | Appearance | Oxygen absorption amount[2] | | Elongation rate[3] |
| | | | | Humidity 100% | Humidity 30% | |
| Example 1A | Polyamide 1A (17.5 μeq/g) | 35:65 | Good | 27 cc | 7.8 cc | 80% |
| Example 2A | Polyamide 1A (17.5 μeq/g) | 55:45 | Good | 25 cc | 6.6 cc | 40% |

TABLE 2A-continued

|  | Composition | | Film | | | |
|---|---|---|---|---|---|---|
|  | Polyamide (end amino group concentration) | Melting kneading ratio[1] | Appearance | Oxygen absorption amount[2] | | Elongation rate[3] |
|  |  |  |  | Humidity 100% | Humidity 30% |  |
| Example 3A | Polyamide 1A (17.5 μeq/g) | 25:75 | Good | 24 cc | 7.0 cc | 82% |
| Example 4A | Polyamide 2A (19.8 μeq/g) | 35:65 | Good | 11 cc | 1.0 cc | 74% |
| Example 5A | Polyamide 3A (25.8 μeq/g) | 35:65 | Slightly inferior | 13 cc | 0.2 cc | 75% |
| Example 6A | Polyamide 4A (14.8 μeq/g) | 35:65 | Good | 17 cc | 1.5 cc | 77% |
| Example 7A | Polyamide 5A (24.8 μeq/g) | 35:65 | Slightly inferior | 6 cc | 1.4 cc | 62% |
| Example 8A | Polyamide 6A (28.8 μeq/g) | 35:65 | Good | 14 cc | 1.1 cc | 74% |
| Example 9A | Polyamide 7A (15.8 μeq/g) | 35:65 | Good | 28 cc | 8.0 cc | 79% |
| Example 10A | Polyamide 8A (19.5 μeq/g) | 35:65 | Good | 21 cc | 6.1 cc | 78% |
| Example 11A | Polyamide 9A (19.2 μeq/g) | 35:65 | Good | 20 cc | 5.8 cc | 78% |
| Example 12A | Polyamide 1 (17.5 μeq/g) | 17:83 | Good | 18 cc | 3.8 cc | 88% |
| Comparative Example 1A | Polyamide 1A (17.5 μeq/g) | 80:20 | Good | 6 cc | 0.8 cc | 15% |
| Comparative Example 2A | Polyamide 1A (17.5 μeq/g) | 100:0 | Good | 4 cc | 0.3 cc | Film broken |
| Comparative Example 3A | Polyamide 1A (17.5 μeq/g) | 10:90 | Good | 3 cc | 0.2 cc | 84% |
| Comparative Example 4A | Polyamide 10A (39.1 μeq/g) | 35:65 | Inferior | 4 cc | 0.1 cc | 63% |
| Comparative Example 5A | Polyamide 11A (34.8 μeq/g) | 35:65 | Good | 4 cc | 0.1 cc | 61% |

[1](total weight of transition metal catalyst and polyamide resin):weight of polyolefin resin
[2]whole amount of oxygen absorbed for 7 days since starting the test
[3]measured after stored at 40° C. and humidity 100% for 1 month As apparent from Examples 1A to 11A, the oxygen-absorbing resin compositions of the present invention were resin compositions which showed an excellent oxygen-absorbing performance at any of high humidity and low humidity and which maintained a film elasticity after absorbing oxygen.

In contrast with this, the film elasticity was notably deteriorated in Comparative Examples 1A and 2A in which a content of the polyamide A in the resin composition exceeded 60% by weight. Further, the oxygen-absorbing performances were unsatisfactory in Comparative Example 2A in which the polyolefin resin was not added and Comparative Example 3A in which a content of the polyamide A in the resin composition was less than 15% by weight. In particular, as apparent from comparison of Comparative Examples 1A to 3A with Examples 1A to 3A and 12A, the good oxygen-absorbing performances were not necessarily obtained when a content of the polyamide A in the resin composition was large.

On the other hand, in Comparative Example 4A in which a mole ratio of metaxylylenediamine to adipic acid was increased as compared with Example 4A and in which the solid phase polymerization was not carried out and Comparative Example 5A in which a mole ratio of metaxylylenediamine to adipic acid was increased and in which the solid phase polymerization time was shortened, an end amino group concentration of the polyamide resins obtained exceeded 30 μeq/g, and the good oxygen-absorbing performances were not obtained. Further, an appearance of the film was deteriorated as well in Comparative Example 4A.

Example 12A

A two kind, three layer film (thickness: 10 μm/20 μm/10 μm) in which the oxygen-absorbing resin composition obtained in Example 1A was used for a core layer and in which LLDPE was used for a skin layer was prepared by subjecting one surface thereof to corona discharge treatment in a width of 800 mm at 120 m/minute. An appearance of the film thus obtained was good, and a HAZE thereof was 74%. A urethane base adhesive for dry laminate (product name: "TM251/CAT-RT88" manufactured by Toyo-Morton, Ltd.) was used for a corona discharge-treated surface to obtain an oxygen-absorbing multilayer film of PET (product name: "E5100" manufactured by Toyobo Co., Ltd., 12)/adhesive (3)/aluminum foil (9)/adhesive (3)/nylon (product name: "N1202" manufactured by Toyobo Co., Ltd., 15)/adhesive (3)/LLDPE (10)/oxygen-absorbing resin composition (20)/LLDPE (10). Numbers in parentheses mean the thicknesses (unit: μm) of the respective layers. The same shall be shown in the following examples unless otherwise described.

The above oxygen-absorbing multilayer film was used to prepare a three side-sealed bag of 3×3 cm, and the bag was charged with 10 g of vitamin C powder having a water activity of 0.35 and tightly sealed. Then, it was stored at 23° C. An oxygen concentration in the bag and an appearance thereof were inspected after stored for one month to find that an oxygen concentration in the bag was 0.1% or less and that an appearance of the vitamin C tablet was maintained well.

Example 13A

A two kind, three layer film was prepared in the same manner as in Example 12A, and this was used to obtain an oxygen-absorbing multilayer paper base material of bleached craft paper (basis weight: 340 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/ oxygen-absorbing resin composition (20)/LLDPE (10) by extrusion lamination using low density polyethylene (product name: "Milason 18SP" manufactured by Mitsui Chemicals, Inc.). The above base material was molded into a paper container of a gable top type for 1 liter. A moldability of the container was good. The above paper container was charged with rice wine and tightly sealed, and then it was stored at 23° C. An oxygen concentration in the paper container was 0.1% or less after one month, and a flavor of the rice wine was maintained well.

Example 14A

An oxygen-absorbing resin composition was obtained in the same manner as in Example 1A, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDP. Then, a two kind, three layer film (thickness: 15 μm/30 μm/15 μm) was prepared in the same manner as in Example 12A, except that the above oxygen-absorbing resin composition was used for a core layer and that PP was used for a skin layer in place of LLDPE. A HAZE of the film thus obtained was 64%. The urethane base adhesive for dry laminate (product name: "TM251/CAT-RT88" manufactured by Toyo-Morton, Ltd.) was used for a corona discharge-treated surface to obtain an oxygen-absorbing multilayer film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/PP (15)/oxygen-absorbing resin composition (30)/PP (15). The above oxygen-absorbing multilayer film was used to prepare a three side-sealed bag of 10×20 cm. A circular vapor-passing port having a diameter of 2 mm was provided on a part thereof, and a circumference of the vapor-passing port was tentatively adhered by a label seal. The bag was charged with cream stew containing carrot and meat and tightly sealed, and then after subjected to retort cooking and thermal sterilization at 124° C. for 30 minutes, it was stored at 23° C. The stew in an inside of the bag could be visually confirmed. After one month, the bag was heated as it was for about 4 minutes in an electric oven, and the bag was swollen after about 3 minutes to confirm that the tentatively adhered label seal part was peeled off and that vapor was discharged from the vapor-passing port. After finishing cooking, a flavor of the cream stew and a color tone of the carrot were inspected to find that an appearance of the carrot was maintained well and that a flavor of the cream stew was good.

Comparative Example 6A

Iron powder having an average particle diameter of 20 μm was mixed with calcium chloride in a proportion of 100:1, and the mixture was kneaded with LLDPE in a weight ratio of 30:70 to obtain an iron powder base oxygen-absorbing resin composition AA. A two kind, three layer film was tried to be prepared in the same manner as in Example 12A by using the iron powder base oxygen-absorbing resin composition AA for a core layer, but irregularities of the iron powder were generated on the film surface, and the film was not obtained. Accordingly, the iron powder base oxygen-absorbing resin composition AA was extruded and laminated as an oxygen-absorbing layer in a thickness of 20 μm on LLDPE having a thickness of 40 μm to obtain a laminated film which was subjected on an oxygen-absorbing layer surface to corona discharge treatment. The above laminated film was laminated on a bleached craft paper in the same manner as in Example 13A to try to prepare a paper container of a gable top type comprising an oxygen-absorbing multilayer paper base material of bleached craft paper (basis weight: 340 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AA (20)/LLDPE (40), but the thickness was large, and it was difficult to prepare a corner of the paper container. A preparing speed of the container was reduced to cut off the rejected products, and the container was obtained at last. Then, a storing test of rice wine was carried out in the same manner as in Example 13A, but aldehyde odor was generated in opening the container, and a flavor thereof was notably reduced.

Comparative Example 7A

An iron powder base oxygen-absorbing resin composition BA was obtained in the same manner as in Comparative Example 6A, except that PP was used in place of LLDPE. Further, a laminated film of the iron powder base oxygen-absorbing resin composition BA (20)/PP (40) was prepared in the same manner as in Comparative Example 6A, except that PP was used in place of LLDPE, and then the oxygen-absorbing layer surface was subjected to corona discharge treatment. Then, an oxygen-absorbing multilayer film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/iron powder base oxygen-absorbing resin composition BA (20)/PP (40) was obtained in the same manner as in Example 14A. The oxygen-absorbing multilayer film thus obtained was used to carry out the same test as in Example 14A to result in finding that the flavor was maintained well but the content could not be visually confirmed and that air bubble-like unevenness was generated on the surface in heating in an electric oven.

As apparent from Examples 12A to 14A, the oxygen-absorbing resin compositions of the present invention were excellent in a processability into the paper containers and provided storing containers which were good in storing alcoholic beverages and heating and cooking in an electric oven even if a vapor-passing port was mounted. Further, they had an inside visibility, and a color tone of the content could be confirmed.

In the present invention, the specific polyamide resin and the transition metal catalyst were blended with the polyolefin resin in a specific proportion, whereby provided were the oxygen-absorbing resin compositions which were excellent in an oxygen-absorbing performance at any of a high humidity and a low humidity and maintained the resin strength after stored and which were excellent in a processability and could be applied to various containers and uses.

Example 1B

Metaxylylenediamine:adipic acid:isophthalic acid were used in a mole ratio of 0.992:0.93:0.07 and subjected to melt polymerization and solid phase polymerization on the synthetic conditions described above to synthesize a polyamide resin (hereinafter, the above polyamide resin is referred to as the polyamide 1B). Controlled were the dropwise adding time to 2 hours, the reaction time in the melt polymerization to 1 hour, the pressure in an inside of the equipment in the solid phase polymerization to 1 torr or less, the polymerization temperature to 195° C. and the polymerization time to 4 hours. The polyamide 1B had Tg of 92° C., a melting point of 228° C., a semi-crystallization time of 160 seconds, an end amino group concentration of 12.1 µeq/g, an end carboxyl group concentration of 66.6 µeq/g, a number average molecular weight of 26200 and MFR of 18 g/10 minutes at 240° C. A non-stretched film was prepared from the resulting polyamide 1B alone, and an oxygen permeability coefficient thereof was determined to find that it was 0.07 cc·mm/(m$^2$·day·atm) (23° C., 60% RH).

Cobalt stearate was added as a transition metal catalyst to the molten polyamide 1B through a side feed by means of a biaxial extruding equipment so that a cobalt concentration was 400 ppm. Further, the resulting mixture (hereinafter referred to as the cobalt stearate-containing polyamide 1B) of the polyamide and cobalt stearate was molten and kneaded at 240° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) as the polyolefin resin in a weight ratio of the cobalt stearate-containing polyamide 1B:LLDPE=35:65 to obtain an oxygen-absorbing resin composition. Then, the above oxygen-absorbing resin composition was used to obtain a film having a thickness of 50 µm and comprising a single layer of the oxygen-absorbing resin composition, and an appearance of the film was observed to find that an appearance of the film was good. The film was cut into two films of 10×10 mm, and each two sheets of the above film were put in a gas-barriering bag which comprised an aluminum foil-laminated film and in which a humidity was controlled to 100% together with 300 ml of air. The bag was tightly sealed and stored at 23° C. and a humidity of 100% to measure an amount of oxygen absorbed for 7 days since starting storage. Further, an elongation rate of the film after one month passed since starting storage was measured. The results thereof are shown in Table 1B.

Example 2B

A film was produced in the same manner as in Example 1B to measure an oxygen absorption amount and an elongation rate of the above film and observe an appearance thereof, except that a weight ratio in melting and kneading was changed to the cobalt stearate-containing polyamide 1B:LLDPE=55:45. The results thereof are shown in Table 1B.

Example 3B

A film was produced in the same manner as in Example 1B to measure an oxygen absorption amount and an elongation rate of the above film and observe an appearance thereof, except that a weight ratio in melting and kneading was changed to the cobalt stearate-containing polyamide 1B:LLDPE=25:75. The results thereof are shown in Table 1B.

Comparative Example 1B

A polyamide resin (hereinafter, the above polyamide resin is referred to as the polyamide 2B) was synthesized in the same manner as in Example 1B, except that the solid phase polymerization was not carried out. The above polyamide 2B had Tg of 90° C., a melting point of 229° C., a semi-crystallization time of 148 seconds, an end amino group concentration of 43.5 µeq/g, an end carboxyl group concentration of 66.6 µeq/g and a number average molecular weight of 17992. MFR at 240° C. was measured to find that it was 24.4 g/10 minutes. A non-stretched film was prepared from the resulting polyamide 2B alone, and an oxygen permeability coefficient thereof was determined to find that it was 0.07 cc·mm/(m$^2$·day·atm) (23° C., 60% RH).

Then, cobalt stearate was added to the polyamide 2B, and the mixture was molten and kneaded with LLDPE in the same manners as in Example 1B to produce a film comprising a single layer of the oxygen-absorbing resin composition. Further, an oxygen absorption amount and an elongation rate of the above film were measured, and an appearance thereof was observed in the same manners as in Example 1B. The results thereof are shown in Table 1B.

Comparative Example 2B

A film was produced in the same manner as in Example 1B to measure an oxygen absorption amount and an elongation rate of the above film and observe an appearance thereof, except that a weight ratio in melting and kneading was changed to the cobalt stearate-containing polyamide 1B:LLDPE=80:20. The results thereof are shown in Table 1B.

Comparative Example 3B

A film was produced in the same manner as in Example 1B to measure an oxygen absorption amount and an elongation rate of the above film and observe an appearance thereof, except that the mixture was not molten and not kneaded with LLDPE and that the film was prepared only from the cobalt stearate-containing polyamide 1B. The results thereof are shown in Table 1B.

TABLE 1B

|  | Polyamide | Composition | Film | |
| --- | --- | --- | --- | --- |
|  | End amino group concentration (µeq/g) | Melting kneading ratio[1] | Oxygen absorption aamount[2] | Elongation rate[3] |
| Example 1B | 12.1 | 35:65 | 18 cc | 80% |
| Example 2B | 12.1 | 55:45 | 19 cc | 40% |
| Example 3B | 12.1 | 25:75 | 16 cc | 60% |
| Comparative Example 1B | 43.5 | 35:65 | 3 cc | 80% |
| Comparative Example 2B | 12.1 | 80:20 | 12 cc | 15% |
| Comparative Example 3B | 12.1 | 100:0 | 10 cc | Film broken |

[1] (total weight of transition metal catalyst and polyamide resin):weight of polyolefin resin
[2] whole amount of oxygen absorbed for 7 days since starting the test
[3] measured after stored at 40° C. and a humidity 100% for 1 month As apparent from Examples 1B to 3B, the oxygen-absorbing resin compositions of the present invention were oxygen-absorbing resin compositions which showed a good oxygen-absorbing performance and which provided the films with an elasticity maintained after absorbing oxygen. On the other hand, the oxygen-absorbing performance was inferior in Comparative Example 1B in which an amino group concentration of the polyamide resin exceeded 30 μeq/g, and the film elasticity was deteriorated in Comparative Examples 2B and 3B in which the polyamide resin was excessively blended in the resin composition.

Example 4B

A two kind, three layer film 1 (thickness: 10 μm/20 μm/10 μm) in which the oxygen-absorbing resin composition obtained in Example 1B was used for a core layer and in which LLDPE was used for a skin layer was prepared by subjecting one surface thereof to corona discharge treatment in a width of 800 mm at 120 m/minute. An appearance of the film thus obtained was good, and a HAZE thereof was 74%. The two kind, three layer film obtained was used to obtain an oxygen-absorbing multilayer paper base material of bleached craft paper (basis weight: 340 $g/m^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/ oxygen-absorbing resin composition (20)/LLDPE (10) by extrusion lamination using low density polyethylene (product name: "Milason 18SP" manufactured by Mitsui Chemicals, Inc.). The above base material was molded into a paper container of a gable top type for 1 liter. A moldability of the container was good. The above paper container was charged with rice wine and tightly sealed, and then it was stored at 23° C. An oxygen concentration in the paper container was 0.1% or less after one month, and a flavor of the rice wine was maintained well.

Example 5B

An oxygen-absorbing resin composition was obtained in the same manner as in Example 4B, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDPE. Then, a two kind, three layer film 2 (thickness: 15 μm/30 μm/15 μm) was prepared in the same manner as in Example 4B, except that the above oxygen-absorbing resin composition was used for a core layer and that PP was used for a skin layer in place of LLDPE. A HAZE of the film thus obtained was 64%. The urethane base adhesive for dry laminate (product name: "TM251/CAT-RT88" manufactured by Toyo-Morton, Ltd.) was used for the corona discharge-treated surface to obtain an oxygen-absorbing multilayer film of aluminum-deposited PET (product name: "GL-AEH" manufactured by Toppan Printing Co., Ltd., 12)/adhesive (3)/ nylon (product name: "N1202" manufactured by Toyobo Co., Ltd., 15)/adhesive (3)/PP (15)/oxygen-absorbing resin composition (30)/PP (15). The above oxygen-absorbing multilayer film was used to prepare a three side-sealed bag of 10×20 cm. A circular vapor-passing port having a diameter of 2 mm was provided on a part thereof, and a circumference of the vapor-passing port was tentatively adhered by a label seal. The bag was charged with pasta sauce containing carrot and meat and tightly sealed, and then after subjected to retort cooking and thermal sterilization at 124° C. for 30 minutes, it was stored at 23° C. The stew in an inside of the bag could be visually confirmed. After one month, the bag was heated as it was for about 4 minutes in an electric oven, and the bag was swollen after about 3 minutes to confirm that the tentatively adhered label seal part was peeled off and that vapor was discharged from the vapor-passing port. After finishing cooking, a flavor of the pasta sauce and a color tone of the carrot were inspected to find that an appearance of the carrot was maintained well.

Comparative Example 4B

Iron powder having an average particle diameter of 20 μm was mixed with calcium chloride in a proportion of 100:1, and the mixture was kneaded with LLDPE in a weight ratio of 35:65 to obtain an iron powder base oxygen-absorbing resin composition AB. A two kind, three layer film was tried to be prepared in the same manner as in Example 4B by using the iron powder base oxygen-absorbing resin composition AB for a core layer, but irregularities of the iron powder were generated on the film surface, and the film was not obtained. Accordingly, the iron powder base oxygen-absorbing resin composition AB was extruded and laminated as an oxygen-absorbing layer in a thickness of 20 μm on LLDPE having a thickness of 40 μm to obtain a laminated film which was subjected on an oxygen-absorbing layer surface to corona discharge treatment. The above laminated film was laminated on a bleached craft paper in the same manner as in Example 5B to try to prepare a paper container of a gable top type comprising an oxygen-absorbing multilayer paper base material of bleached craft paper (basis weight: 340 $g/m^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AB (20)/LLDPE (40), but the thickness was large, and it was difficult to prepare a corner of the paper container. A preparing speed of the container was reduced to cut off the rejected products, and the container was obtained at last. Then, a storing test of rice wine was carried out in the same manner as in Example 4B, but aldehyde odor was generated in opening the container, and a flavor thereof was notably reduced.

Comparative Example 5B

An iron powder base oxygen-absorbing resin composition BB was obtained in the same manner as in Comparative Example 4B, except that PP was used in place of LLDPE. Further, a laminated film of the iron powder base oxygen-absorbing resin composition BB (20)/PP (40) was prepared in the same manner as in Comparative Example 4B, except that PP was used in place of LLDPE, and then the oxygen-absorbing layer surface was subjected to corona discharge treatment. An oxygen-absorbing multilayer film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/iron powder base oxygen-absorbing resin composition BB (20)/PP (40) was obtained in the same manner as in Example 6B. The oxygen-absorbing multilayer film thus obtained was used to carry out the same test as in Example 5B to result in finding that the flavor was maintained well but the content could not be visually confirmed and that air bubble-like unevenness was generated on the surface in heating in an electric oven.

As apparent from Examples 4B to 5B, the oxygen-absorbing resin compositions of the present invention were excellent in a processability into the paper containers and provided storing containers which were favorable in storing alcoholic beverages and heating and cooking by an electric oven even if a vapor-passing port was mounted. Further, they had an inside visibility, and a color tone of the content could be confirmed.

In the present invention, the specific polyamide resin and the transition metal catalyst were blended with the polyolefin resin in a specific proportion, whereby provided were the oxygen-absorbing resin compositions which were excellent in an oxygen-absorbing performance at a low humidity and a high humidity and maintained a resin strength after stored and which were excellent in a processability and could be applied to various containers and uses.

Example 1C

Metaxylylenediamine and paraxylylenediamine were mixed in 7:3, and the above diamines and adipic acid were used in a mole proportion of 0.993:1 and subjected to the melt polymerization and the solid phase polymerization each described above to synthesize a polyamide resin (hereinafter, the above polyamide resin is referred to as the polyamide 1C). Controlled were the dropwise adding time to 2 hours, the polymerization temperature after finishing dropwise adding metaxylylenediamine in the melt polymerization to 277° C. and the reaction time to 30 minutes. The above polyamide 1C had Tg of 87° C., a melting point of 259° C., a semi-crystallization time of 18 seconds, an end amino group concentration of 15.8 µeq/g, an end carboxyl group concentration of 66.8 µeq/g and a number average molecular weight of 21500. Further, MFR at 280° C. was measured to find that MFR at 280° C. was 12.8 g/10 minutes. A non-stretched film was prepared from the resulting polyamide 1C alone, and an oxygen permeability coefficient thereof was determined to find that it was 0.13 cc·mm/(m$^2$·day·atm) (23° C., 60% RH).

Cobalt stearate was added as a transition metal catalyst to the molten polyamide 1C through a side feed by means of a biaxial extruding equipment so that a cobalt concentration was 400 ppm. Further, the resulting mixture (hereinafter referred to as the cobalt stearate-containing polyamide 1C) of the polyamide and cobalt stearate was molten and kneaded at 280° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) as the polyolefin resin in a weight ratio of the cobalt stearate-containing polyamide 1C:LLDPE=35:65 to obtain an oxygen-absorbing resin composition. Then, the above oxygen-absorbing resin composition was used to obtain a film having a thickness of 50 µm and comprising a single layer of the oxygen-absorbing resin composition, and an appearance of the film was observed to find that an appearance of the film was good. The film was cut into two films of 10×10 mm, and each two sheets of the above film were put in a gas-barriering bag which comprised an aluminum foil-laminated film and in which a humidity was controlled to 100% together with 300 ml of air. The bag was tightly sealed and stored at 23° C. to measure a whole amount of oxygen absorbed for 7 days after tightly sealed. On the other hand, an elongation rate of the film after stored at 40° C. and a humidity of 100% for one month was measured. The results thereof are shown in Table 1C.

Example 2C

A film was produced in the same manner as in Example 1C to measure an oxygen absorption amount and an elongation rate of the above film and observe an appearance thereof, except that a weight ratio in melting and kneading was changed to the cobalt stearate-containing polyamide 1C:LLDPE=55:45. The results thereof are shown in Table 1C.

Example 3C

A film was produced in the same manner as in Example 1C to measure an oxygen absorption amount and an elongation rate of the above film and observe an appearance thereof, except that a weight ratio in melting and kneading was changed to the cobalt stearate-containing polyamide 1C:LLDPE=25:75. The results thereof are shown in Table 1C.

Comparative Example 1C

A film was produced in the same manner as in Example 1C to measure an oxygen absorption amount and an elongation rate of the above film and observe an appearance thereof, except that a weight ratio in melting and kneading was changed to the cobalt stearate-containing polyamide 1C:LLDPE=80:20. The results thereof are shown in Table 1C.

Comparative Example 2C

A film was produced in the same manner as in Example 1C to measure an oxygen absorption amount and an elongation rate of the above film and observe an appearance thereof, except that the mixture was not molten and not kneaded with LLDPE and that the film was prepared only from the cobalt stearate-containing polyamide 1C. The results thereof are shown in Table 1C.

Comparative Example 3C

A film was produced in the same manner as in Example 1C to measure an oxygen absorption amount and an elongation rate of the above film and observe an appearance thereof, except that a weight ratio in melting and kneading was changed to the cobalt stearate-containing polyamide 1C:LLDPE=10:90. The results thereof are shown in Table 1C.

Comparative Example 4C

Metaxylylenediamine and paraxylylenediamine were mixed in 7:3, and the above diamines and adipic acid were used in a mole proportion of 0.999:1 and not subjected to solid phase polymerization to synthesize a polyamide resin (hereinafter, the above polyamide resin is referred to as the polyamide 2C). The above polyamide 2C had Tg of 78° C., a melting point of 237° C., a semi-crystallization time of 27 seconds, an end amino group concentration of 39.1 µeq/g, an end carboxyl group concentration of 70.2 µeq/g and a number average molecular weight of 17800. MFR at 250° C. was 51 g/10 minutes.

Then, cobalt stearate was added to the polyamide 2C, and the mixture was molten and kneaded with LLDPE in the same manners as in Example 1C to produce a film comprising a single layer of the oxygen-absorbing resin composition, except that the temperature in melting and kneading was changed to 250° C. Further, an oxygen absorption amount and an elongation rate of the above film were measured, and an appearance thereof was observed in the same manners as in Example 1C. The results thereof are shown in Table 1C.

TABLE 1C

| | Polyamide End amino group concentration (μeq/g) | Com- position Melting kneading ratio[1] | Film Appear- ance | Oxygen absorption amount[2] | Elon- gation rate[3] |
|---|---|---|---|---|---|
| Example 1C | 15.8 | 35:65 | Good | 25 cc | 80% |
| Example 2C | 15.8 | 55:45 | Good | 16 cc | 40% |
| Example 3C | 15.8 | 25:75 | Good | 19 cc | 82% |
| Comparative Example 1C | 15.8 | 80:20 | Good | 6 cc | 15% |
| Comparative Example 2C | 15.8 | 100:0 | Good | 4 cc | Film broken |
| Comparative Example 3C | 15.8 | 10:90 | Good | 3 cc | 84% |
| Comparative Example 4C | 39.1 | 35:65 | Inferior | 4 cc | 61% |

[1](total weight of transition metal catalyst and polyamide resin):weight of polyolefin resin
[2]whole amount of oxygen absorbed for 7 days since starting the test
[3]measured after stored at 40° C. and a humidity 100% for 1 month As apparent from Examples 1C to 3C, the oxygen-absorbing resin compositions of the present invention were resin compositions which showed an excellent oxygen-absorbing performance and which maintained a film elasticity after absorbing oxygen.

In contrast with this, the oxygen-absorbing performance was unsatisfactory in Comparative Examples 1C and 2C in which a content of the polyolefin resin in the resin composition exceeded 60% by weight and Comparative Example 3C in which the above content was less than 15% by weight. In particular, as apparent from comparison of Comparative Examples 1C and 2C with Examples 1C to 3C, the good oxygen-absorbing performances were not necessarily obtained when a content of the polyamide A in the resin composition was large.

On the other hand, in Comparative Example 4C in which the solid phase polymerization was not carried out, the end amino group concentration exceeded 30 μeq/g, and the good oxygen-absorbing performance was not obtained in comparison with Example 1C. Further, an appearance of the film was deteriorated as well in Comparative Example 4C.

Example 4C

A four kind, six layer multilayer sheet-molding apparatus comprising first to fourth extruding equipments, a feed block, a T die, a cooling roll and a sheet receiving equipment was used to extrude the components from the respective extruding equipments, wherein extruded were polypropylene 1 from the first extruding equipment, the oxygen-absorbing resin prepared in Examples 1C from the second extruding equipment, MXD6 (product name: S7007 manufactured by Mitsubishi Gas Chemical Company, Inc., hereinafter referred to as MXD6) from the third extruding equipment and a polypropylene base adhesive resin (product name: Modec P604V manufactured by Mitsubishi Chemical Corporation) from the fourth extruding equipment, whereby an oxygen-absorbing multilayer sheet was obtained. The constitution of the above multilayer sheet was polypropylene 1 (100)/oxygen-absorbing resin layer (100)/adhesive layer (15)/MDX6 layer (30)/adhesive layer (15)/polypropylene 1 (250) from the inner layer. The multilayer sheet prepared by co-extrusion was a multilayer sheet which was free from thickness unevenness and the like and had a good appearance.

Next, the multilayer sheet thus obtained was subjected to thermoforming processing into a cup-like container (inner volume: 70 cc, surface area: 120 cm$^2$) with the inner layer turned to an inside by means of a vacuum molding machine. The oxygen-absorbing multilayer container obtained was free from thickness unevenness and had a good appearance. The above container was charged with 60 g of tuna and tightly sealed by using as a top film, a gas-barriering film (PET film (12)/adhesive (3)/aluminum foil (7)/adhesive (3)/non-stretched polypropylene film (60)) prepared by dry-laminating a PET film (product name: E5102 manufactured by Toyobo Co., Ltd.), an aluminum foil and a non-stretched polypropylene film (product name: Aroma-UT21 manufactured by Okamoto Industries, Incorporated) by a urethane base adhesive (product name: "TM251" manufactured by Toyo-Morton, Ltd.). The packaged container was subjected to retort treatment at 125° C. for 25 minutes and stored under the conditions of 25° C. and 60% RH, and it was opened after measuring an oxygen concentration in an inside of the container in the third month to confirm a flavor and a color tone of the tuna. An oxygen concentration in an inside of the container was maintained at 0.1% or less, and both of a flavor and a color tone of the tuna were good.

In the present invention, the specific polyamide resin and the transition metal catalyst were blended with the polyolefin resin in a specific proportion, whereby provided were the oxygen-absorbing resin compositions which were excellent in an oxygen-absorbing performance at any of a high humidity and a low humidity and maintained a resin strength after stored and which were excellent in a processability and could be applied to various containers and uses.

Example 1D

Metaxylylenediamine:adipic acid were used in a mole ratio of 0.994:1.000 and subjected to melt polymerization and solid phase polymerization on the synthetic conditions described above to synthesize a polyamide resin (hereinafter, the above polyamide resin is referred to as the polyamide 1D). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 1D had Tg of 84° C., a melting point of 237° C., a semi-crystallization time of 25 seconds, an end amino group concentration of 14.8 μeq/g, an end carboxyl group concentration of 58.6 μeq/g and a number average molecular weight of 23500. MFR could not be measured at 240° C. since it was close to the melting point, and MFR at 250° C. was measured to find that MFR at 250° C. was 12.4 g/10 minutes. A non-stretched film was prepared from the resulting polyamide 1D alone, and an oxygen permeability coefficient thereof was determined to find that it was 0.09 cc·mm/(m$^2$·day·atm) (23° C., 60% RH).

Cobalt stearate was added as a transition metal catalyst to the molten polyamide 1D through a side feed by means a biaxial extruding equipment so that a cobalt concentration was 400 ppm. Further, the resulting mixture (hereinafter referred to as the cobalt stearate-containing polyamide 1D) of the polyamide and cobalt stearate was molten and kneaded at 240° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) as a polyolefin resin in a weight ratio of the cobalt stearate-containing polyamide 1D:LLDPE=35:65 to obtain an oxygen-absorbing resin composition. Then, the above oxygen-absorbing resin composition was used to obtain a film having a thickness of 50 μm and comprising a single layer of the oxygen-absorbing resin composition, and an appearance of the film was observed to find that an appearance of the film was good. The film was cut into two films of 10×10 mm, and each two sheets of the above film were put in a gas-barriering bag which comprised an aluminum foil-laminated film and in which a humidity was controlled to 100% together with 300 ml of air. The bag was tightly sealed and stored at 23° C. and a humidity of 100% to measure an amount of oxygen absorbed for 7 days since starting storage. Further, an elongation rate of the film after one month passed since starting storage was measured. The results thereof are shown in Table 1D.

Example 2D

A film was produced in the same manner as in Example 1D to measure an oxygen absorption amount and an elongation rate of the above film and observe an appearance thereof, except that a weight ratio in melting and kneading was changed to the cobalt stearate-containing polyamide 1D:LLDPE=55:45. The results thereof are shown in Table 1D.

Example 3D

A film was produced in the same manner as in Example 1D to measure an oxygen absorption amount and an elongation rate of the above film and observe an appearance thereof, except that a weight ratio in melting and kneading was changed to the cobalt stearate-containing polyamide 1D:LLDPE=25:75. The results thereof are shown in Table 1D.

Comparative Example 1D

A polyamide resin (hereinafter, the above polyamide resin is referred to as the polyamide 2D) was synthesized in the same manner as in Example 1D, except that the solid phase polymerization was not carried out. The above polyamide 2D had an end amino group concentration of 43.5 μeq/g, an end carboxyl group concentration of 66.6 μeq/g and a number average molecular weight of 17200. MFR at 250° C. was measured to find that it was 32.4 g/10 minutes. A non-stretched film was prepared from the resulting polyamide 2D alone, and an oxygen permeability coefficient thereof was determined to find that it was 0.09 cc·mm/(m²·day·atm) (23° C., 60% RH).

Then, cobalt stearate was added to the polyamide 2D, and the mixture was molten and kneaded with LLDPE in the same manner as in Example 1D to produce a film comprising a single layer of the oxygen-absorbing resin composition, except that the temperature in melting and kneading was changed to 250° C. Further, an oxygen absorption amount and an elongation rate of the above film were measured, and an appearance thereof was observed in the same manners as in Example 1D. The results thereof are shown in Table 1D.

Comparative Example 2D

A film was produced in the same manner as in Example 1D to measure an oxygen absorption amount and an elongation rate of the above film and observe an appearance thereof, except that a weight ratio in melting and kneading was changed to the cobalt stearate-containing polyamide 1D:LLDPE=80:20. The results thereof are shown in Table 1D.

Comparative Example 3D

A film was produced in the same manner as in Example 1D to measure an oxygen absorption amount and an elongation rate of the above film and observe an appearance thereof, except that the mixture was not molten and not kneaded with LLDPE and that the film was prepared only from the cobalt stearate-containing polyamide 1D. The results thereof are shown in Table 1D.

Example 4D

A film was produced in the same manner as in Example 1D to measure an oxygen absorption amount and an elongation rate of the above film and observe an appearance thereof, except that a weight ratio in melting and kneading was changed to the cobalt stearate-containing polyamide 1D:LLDPE=15:85. The results thereof are shown in Table 1D.

TABLE 1D

| | Polyamide resin End amino group concentration (μeq/g) | Composition Melting kneading ratio[1] | Film Appearance | Oxygen absorption amount[2] | Elongation rate[3] |
|---|---|---|---|---|---|
| Example 1D | 14.8 | 35:65 | Good | 15 cc | 80% |
| Example 2D | 14.8 | 55:45 | Good | 10 cc | 40% |
| Example 3D | 14.8 | 25:75 | Good | 12 cc | 82% |
| Example 4D | 14.8 | 15:85 | Good | 9 cc | 81% |
| Comparative Example 1D | 43.5 | 35:65 | Inferior | 5 cc | 78% |
| Comparative Example 2D | 14.8 | 80:20 | Good | 4 cc | 5% |
| Comparative Example 3D | 14.8 | 100:0 | Good | 3 cc | Film broken |

[1](total weight of transition metal catalyst and polyamide resin):weight of polyolefin resin
[2]whole amount of oxygen absorbed for 7 days since starting the test
[3]measured after stored at 40° C. and a humidity 100% for 1 month As apparent from Examples 1D to 4D, the oxygen-absorbing resin compositions of the present invention were oxygen-absorbing resin compositions which showed a good oxygen-absorbing performance and which maintained a films elasticity after absorbing oxygen. On the other hand, the oxygen-absorbing performance was inferior in Comparative Example 1D in which an amino group concentration of the polyamide resin exceeded 30 μeq/g. In Comparative Examples 2D and 3D in which the polyamide resin was excessively blended in the resin composition, the oxygen absorption amount was low, and in addition thereto, the film elasticity was deteriorated.

Example 5D

A two kind, three layer film 1 (thickness: 10 μm/20 μm/10 μm) in which the oxygen-absorbing resin composition obtained in Example 1D was used for a core layer and in which LLDPE was used for a skin layer was prepared by subjecting one surface thereof to corona discharge treatment in a width of 800 mm at 120 m/minute. An appearance of the film thus obtained was good, and a HAZE thereof was 24%. The two kind, three layer film obtained was used to obtain an oxygen-absorbing multilayer paper base material of bleached craft paper (basis weight: 340 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/oxygen-absorbing resin composition (20)/LLDPE (10) by extrusion lamination using low density polyethylene (product name: "Milason 18SP" manufactured by Mitsui Chemicals, Inc.). The above base material was molded into a paper container of a gable top type for 1 liter. A moldability of the container was good. The above paper container was charged with distilled spirit and tightly sealed, and then it was stored at 23° C. An oxygen concentration in the paper container was 0.1% or less after one month, and a flavor of the distilled spirit was maintained well.

Example 6D

An oxygen-absorbing resin composition was obtained in the same manner as in Example 1D, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDP. Then, a two kind, three layer film 2 (thickness: 15 µm/30 µm/15 µm) was prepared in the same manner as in Example 5D, except that the above oxygen-absorbing resin composition was used for a core layer and that PP was used for a skin layer in place of LLDPE. A HAZE of the film thus obtained was 34%. The adhesive for urethane base dry laminate (trade name: "TM251/CAT-RT88" manufactured by Toyo-Morton, Ltd.) was used for the corona discharge-treated surface to obtain an oxygen-absorbing multilayer film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/PP (15)/oxygen-absorbing resin composition (30)/PP (15). The above oxygen-absorbing multilayer film was used to prepare a three side-sealed bag of 10×20 cm. A circular vapor-passing port having a diameter of 2 mm was provided on a part thereof, and a circumference of the vapor-passing port was tentatively adhered by a label seal. The bag was charged with pasta sauce containing carrot and meat and tightly sealed, and after subjected to retort cooking and thermal sterilization at 124° C. for 30 minutes, it was stored at 23° C. The pasta sauce in an inside of the bag could be visually confirmed. After one month, the bag was heated as it was for about 4 minutes in an electric oven, and the bag was swollen after about 3 minutes to confirm that the tentatively adhered label seal was peeled off and that vapor was discharged from the vapor-passing port. After finishing cooking, a flavor of the pasta sauce and a color tone of the carrot were inspected to find that an appearance of the carrot was maintained well.

Comparative Example 4D

Iron powder having an average particle diameter of 20 µm was mixed with calcium chloride in a proportion of 100:1, and the mixture was kneaded with LLDPE in a weight ratio of 35:65 to obtain an iron powder base oxygen-absorbing resin composition AD. A two kind, three layer film was tried to be prepared in the same manner as in Example 5D by using the iron powder base oxygen-absorbing resin composition AD for a core layer, but irregularities of the iron powder were generated on a film surface, and the film was not obtained. Accordingly, the iron powder base oxygen-absorbing resin composition AD was extruded and laminated as an oxygen-absorbing layer in a thickness of 20 µm on LLDPE having a thickness of 40 µm to obtain a laminated film which was subjected on an oxygen-absorbing layer surface to corona discharge treatment. The above laminated film was laminated on a bleached craft paper in the same manner as in Example 5D to try to prepare a paper container of a gable top type comprising an oxygen-absorbing multilayer paper base material of bleached craft paper (basis weight: 340 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AD (20)/LLDPE (40), but the thickness was large, and it was difficult to prepare a corner of the paper container. A preparing speed of the container was reduced to cut off the rejected products, and the container was obtained at last. A storing test of distilled spirit was carried out in the same manner as in Example 5D, but aldehyde odor was generated in opening the container, and a flavor thereof was notably reduced.

Comparative Example 5D

An iron powder base oxygen-absorbing resin composition BD was obtained in the same manner as in Comparative Example 4D, except that PP was used in place of LLDPE. Further, a laminated film of the iron powder base oxygen-absorbing resin composition BD (20)/PP (40) was prepared in the same manner as in Comparative Example 4D, except that PP was used in place of LLDPE, and then the oxygen-absorbing layer surface was subjected to corona discharge treatment. An oxygen-absorbing multilayer film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/iron powder base oxygen-absorbing resin composition BD (20)/PP (40) was obtained in the same manner as in Example 6D. The oxygen-absorbing multilayer film thus obtained was used to carry out the same test as in Example 6D to result in finding that the flavor was maintained well but the content could not be visually confirmed and that air bubble-like unevenness was generated on the surface in heating in an electric oven.

As apparent from Examples 5D to 6D, the oxygen-absorbing resin compositions of the present invention were excellent in a processability into the paper containers and provided the storing containers which were good in storing alcoholic beverages and heating and cooking in an electric oven even if a vapor-passing port was mounted. Further, they had an inside visibility, and a color tone of the content could be confirmed.

In the present invention, the specific polyamide resin and the transition metal catalyst were blended with the polyolefin resin in a specific proportion, whereby provided were the oxygen-absorbing resin compositions which were excellent in an oxygen-absorbing performance at a low humidity and a high humidity and maintained a resin strength after stored and which were excellent in a processability and could be applied to various containers and uses.

Example 1E

Metaxylylenediamine:sebacic acid:adipic acid were used in a mole ratio of 0.996:0.4:0.6 and subjected to melt polymerization and solid phase polymerization on the synthetic conditions described above to synthesize a polyamide resin, and then an end amino group concentration thereof was measured (the end amino group concentration was 33.6 μeq/g). Next, phthalic anhydride was added thereto as an end masking agent in an amount of 1.5 equivalent based on the above end amino group concentration. Then, the mixture was molten and kneaded at 200° C. by means of a biaxial extruding equipment, and the end amino group was masked to synthesize a polyamide resin (hereinafter, the above polyamide resin is referred to as the polyamide 1E). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1E had Tg of 73° C., a melting point of 184° C., a semi-crystallization time of 2000 seconds or longer, an end amino group concentration of 21.5 μeq/g, an end carboxyl group concentration of 64.0 μeq/g, a number average molecular weight of 22200 and MFR of 15.0 g/10 minutes at 240° C. Further, a non-stretched film was prepared from the resulting polyamide 1E alone, and an oxygen permeability coefficient thereof was determined to find that it was 0.34 cc·mm/(m$^2$·day·atm) (23° C., 60% RH).

Cobalt stearate was added as a transition metal catalyst to the molten polyamide 1E through a side feed by means of a biaxial extruding equipment so that a cobalt concentration was 400 ppm. Further, the resulting mixture (hereinafter referred to as the cobalt stearate-containing polyamide 1E) of the polyamide and cobalt stearate was molten and kneaded at 240° C. with linear low density polyethylene (product name: "Harmolex NC564A" manufactured by Japan Polyethylene Corporation, MFR: 3.5 g/10 minutes (measured according to JIS K7210), MFR: 7.5 g/10 minutes at 240° C., MFR: 8.7 g/10 minutes at 250° C., hereinafter referred to as LLDPE) as a polyolefin resin in a weight ratio of the cobalt stearate-containing polyamide 1E:LLDPE=35:65 to obtain an oxygen-absorbing resin composition. Then, the above oxygen-absorbing resin composition was used to obtain a film having a thickness of 50 μm and comprising a single layer of the oxygen-absorbing resin composition, and an appearance of the film was observed to find that an appearance of the film was good. The film was cut into two films of 10×10 mm, and each two sheets of the above film were put in gas-barrierient bags which comprised an aluminum foil-laminated film and in which moisture contents in the bags were 30% and 100% together with 300 ml of air, and the bags were tightly sealed. They were stored at 23° C. to measure a whole amount of oxygen absorbed for 7 days after tightly sealed. On the other hand, an elongation rate of the film after stored at 40° C. and a humidity of 100% for one month was measured. The results thereof are shown in Table 2E.

Example 2E

A polyamide resin (hereinafter, the above polyamide resin is referred to as the polyamide 2E) was synthesized in the same manner as in Example 1E, except that succinic anhydride was used as the end masking agent in place of phthalic anhydride. The polyamide 1E had Tg of 73° C., a melting point of 184° C., a semi-crystallization time of 2000 seconds or longer, an end amino group concentration of 22.0 μeq/g, an end carboxyl group concentration of 63.8 μeq/g, a number average molecular weight of 21800 and MFR of 16.1 g/10 minutes at 240° C. Further, a non-stretched film was prepared from the resulting polyamide 2E alone, and an oxygen permeability coefficient thereof was determined to find that it was 0.34 cc·mm/(m$^2$·day·atm) (23° C., 60% RH).

Then, cobalt stearate was added to the polyamide 2E, and the mixture was molten and kneaded with LLDPE in the same manners as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 3E

A polyamide resin (hereinafter, the above polyamide resin is referred to as the polyamide 3E) was synthesized in the same manner as in Example 1E, except that trimellitic anhydride was used as the end masking agent in place of phthalic anhydride. The polyamide 3E had Tg of 73° C., a melting point of 184° C., a semi-crystallization time of 2000 seconds or longer, an end amino group concentration of 21.8 μeq/g, an end carboxyl group concentration of 65.0 μeq/g, a number average molecular weight of 22000 and MFR of 15.5 g/10 minutes at 240° C. Further, a non-stretched film was prepared from the resulting polyamide 3E alone, and an oxygen permeability coefficient thereof was determined to find that it was 0.34 cc·mm/(m$^2$·day·atm) (23° C., 60% RH).

Then, cobalt stearate was added to the polyamide 3E, and the mixture was molten and kneaded with LLDPE in the same manners as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 4E

Metaxylylenediamine:sebacic acid:adipic acid were used in a mole ratio of 0.999:0.4:0.6 and subjected to melt polymerization and solid phase polymerization on the synthetic conditions described above to synthesize a polyamide resin, and then an end amino group concentration thereof was measured (the end amino group concentration was 35.8 μeq/g). Next, phthalic anhydride was added thereto as an end masking agent in an amount of 0.2 equivalent based on the above end amino group concentration. Then, the mixture was molten and kneaded at 200° C. by means of a biaxial extruding equipment, and the end amino group was masked to synthesize a polyamide resin (hereinafter, the above polyamide resin is referred to as the polyamide 4E). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 4E had Tg of 73° C., a melting point of 184° C., a semi-crystallization time of 2000 seconds or longer, an end amino group concentration of 29.2 μeq/g, an end carboxyl group concentration of 52.8 μeq/g, a number average molecular weight of 24000 and MFR of 11.2 g/10 minutes at 240° C. Further, a non-stretched film was prepared from the resulting polyamide 4E alone, and an oxygen permeability coefficient thereof was determined to find that it was 0.34 cc·mm/(m$^2$·day·atm) (23° C., 60% RH).

Then, cobalt stearate was added to the polyamide 4E, and the mixture was molten and kneaded with LLDPE in the same manners as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 5E

A polyamide resin (hereinafter, the above polyamide resin is referred to as the polyamide 5E) was synthesized in the same manner as in Example 4E, except that an addition amount of phthalic anhydride was changed to 4.0 equivalent based on the end amino group concentration after the solid phase polymerization. The polyamide 5E had Tg of 73° C., a melting point of 184° C., a semi-crystallization time of 2000 seconds or longer, an end amino group concentration of 13.5 µeq/g, an end carboxyl group concentration of 53.8 µeq/g, a number average molecular weight of 19700 and MFR of 35.0 g/10 minutes at 240° C. Further, a non-stretched film was prepared from the resulting polyamide 5E alone, and an oxygen permeability coefficient thereof was determined to find that it was 0.34 cc·mm/($m^2$·day·atm) (23° C., 60% RH).

Then, cobalt stearate was added to the polyamide 5E, and the mixture was molten and kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 6E

A polyamide resin (hereinafter, the above polyamide resin is referred to as the polyamide 6E) was synthesized in the same manner as in Example 4E, except that an addition amount of phthalic anhydride was changed to 5.0 equivalent based on the end amino group concentration after the solid phase polymerization. The polyamide 6E had Tg of 73° C., a melting point of 184° C., a semi-crystallization time of 2000 seconds or longer, an end amino group concentration of 11.5 µeq/g, an end carboxyl group concentration of 52.8 µeq/g, a number average molecular weight of 18100 and MFR of 50.1 g/10 minutes at 240° C. Further, a non-stretched film was prepared from the resulting polyamide 6E alone, and an oxygen permeability coefficient thereof was determined to find that it was 0.34 cc·mm/($m^2$·day·atm) (23° C., 60% RH).

Then, cobalt stearate was added to the polyamide 6E, and the mixture was molten and kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 7E

Metaxylylenediamine:sebacic acid:adipic acid were used in a mole ratio of 1.0:0.3:0.7 and subjected to melt polymerization and solid phase polymerization on the synthetic conditions described above to synthesize a polyamide resin, and then an end amino group concentration thereof was measured (the end amino group concentration was 37.7 µeq/g). Next, phthalic anhydride was added thereto as an end masking ageant in an amount of 1.5 equivalent based on the above end amino group concentration. Then, the mixture was molten and kneaded at 220° C. by means of a biaxial extruding equipment, and the end amino group was masked to synthesize a polyamide resin (hereinafter, the above polyamide resin is referred to as the polyamide 7E). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 7E had Tg of 78° C., a melting point of 199° C., a semi-crystallization time of 2000 seconds or longer, an end amino group concentration of 19.5 µeq/g, an end carboxyl group concentration of 50.2 µeq/g, a number average molecular weight of 23800 and MFR of 14.1 g/10 minutes at 240° C. Further, a non-stretched film was prepared from the resulting polyamide 7E alone, and an oxygen permeability coefficient thereof was determined to find that it was 0.21 cc·mm/($m^2$·day·atm) (23° C., 60% RH).

Then, cobalt stearate was added to the polyamide 7E, and the mixture was molten and kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 8E

Metaxylylenediamine:sebacic acid:adipic acid were used in a mole ratio of 1.001:0.7:0.3 and subjected to melt polymerization and solid phase polymerization on the synthetic conditions described above to synthesize a polyamide resin, and then an end amino group concentration thereof was measured (the end amino group concentration was 38.3 µeq/g). Next, phthalic anhydride was added thereto as an end masking agent in an amount of 1.5 equivalent based on the above end amino group concentration. Then, the mixture was molten and kneaded at 200° C. by means of a biaxial extruding equipment, and the end amino group was masked to synthesize a polyamide resin (hereinafter, the above polyamide resin is referred to as the polyamide 8E). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 8E had Tg of 66° C., a melting point of 160° C., a semi-crystallization time of 2000 seconds or longer, an end amino group concentration of 20.8 µeq/g, an end carboxyl group concentration of 52.2 µeq/g, a number average molecular weight of 21500 and MFR of 16.5 g/10 minutes at 240° C. Further, a non-stretched film was prepared from the resulting polyamide 8E alone, and an oxygen permeability coefficient thereof was determined to find that it was 0.68 cc·mm/($m^2$·day·atm) (23° C., 60% RH).

Then, cobalt stearate was added to the polyamide 8E, and the mixture was molten and kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Example 9E

A film was produced in the same manner as in Example 1E to measure an oxygen absorption amount and an elongation rate of the above film and observe an appearance thereof, except that a weight ratio in melting and kneading was changed to the cobalt stearate-containing polyamide 1E:LL-DPE=55:45. The results thereof are shown in Table 2E.

Example 10E

A film was produced in the same manner as in Example 1E to measure an oxygen absorption amount and an elongation rate of the above film and observe an appearance thereof, except that a weight ratio in melting and kneading was changed to the cobalt stearate-containing polyamide 1E:LL-DPE=25:75. The results thereof are shown in Table 2E.

Example 11E

Metaxylylenediamine and paraxylylenediamine were mixed in a mole proportion of 7:3, and the above diamines and adipic acid were used in a mole proportion of 1:1 and subjected only to melt polymerization on the synthetic conditions described above to synthesize a polyamide resin. Then, an end amino group concentration thereof was measured (the end amino group concentration was 43.4 µeq/g). Next, phthalic anhydride was added thereto as an end masking agent in an amount of 1.5 equivalent based on the above end amino group concentration. Then, the mixture was molten and kneaded at 285° C. by means of a biaxial extruding equipment, and the end amino group was masked to synthesize a polyamide resin (hereinafter, the above polyamide resin is referred to as the polyamide 9E). Controlled were the dropwise adding time to 2 hours, the polymerization temperature after finishing dropwise adding metaxylylenediamine in the melt polymerization to 277° C. and the reaction time to 30 minutes. The above polyamide 9E had Tg of 87° C., a melting point of 259° C., a semi-crystallization time of 17 seconds, an end amino group concentration of 27.8 µeq/g, an end carboxyl group concentration of 64.3 µeq/g and a number average molecular weight of 18000. MFR could not be measured at 260° C. since it was close to the melting point, and MFR at 270° C. was measured to find that MFR at 270° C. was 30.3 g/10 minutes. A non-stretched film was prepared from the resulting polyamide 9E alone, and an oxygen permeability coefficient thereof was determined to find that it was 0.13 cc·mm/(m$^2$·day·atm) (23° C., 60% RH).

Then, cobalt stearate was added to the polyamide 9E, and the mixture was molten and kneaded with LLDPE in the same manner as in Example 1E to produce a film comprising a single layer of the oxygen-absorbing resin composition, except that the temperature in melting and kneading was changed to 270° C. Further, an oxygen absorption amount and an elongation rate of the above film were measured, and an appearance thereof was observed in the same manners as in Example 1E. The results thereof are shown in Table 2E.

Comparative Example 1E

A polyamide resin (hereinafter, the above polyamide resin is referred to as the polyamide 10E) was synthesized in the same manner as in Example 4E, except that phthalic anhydride was not added and that the end was not masked. The polyamide 10E had Tg of 73° C., a melting point of 184° C., a semi-crystallization time of 2000 seconds or longer, an end amino group concentration of 35.8 µeq/g, an end carboxyl group concentration of 49.7 µeq/g, a number average molecular weight of 243000 and MFR of 10.0 g/10 minutes at 240° C. Further, a non-stretched film was prepared from the resulting polyamide 10E alone, and an oxygen permeability coefficient thereof was determined to find that it was 0.34 cc·mm/(m$^2$·day·atm) (23° C., 60% RH).

Then, cobalt stearate was added to the polyamide 10E, and the mixture was molten and kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Comparative Example 2E

A polyamide resin (hereinafter, the above polyamide resin is referred to as the polyamide 11E) was synthesized in the same manner as in Example 4E, except that an addition amount of phthalic anhydride was changed to 0.1 equivalent based on the end amino group concentration after the solid phase polymerization. The polyamide 11E had Tg of 73° C., a melting point of 184° C., a semi-crystallization time of 2000 seconds or longer, an end amino group concentration of 31.8 µeq/g, an end carboxyl group concentration of 49.7 µeq/g, a number average molecular weight of 24000 and MFR of 10.6 g/10 minutes at 240° C. Further, a non-stretched film was prepared from the resulting polyamide 11E alone, and an oxygen permeability coefficient thereof was determined to find that it was 0.34 cc·mm/(m$^2$·day·atm) (23° C., 60% RH).

Then, cobalt stearate was added to the polyamide 11E, and the mixture was kneaded with LLDPE in the same manner as in Example 1E to produce a film comprising a single layer of the oxygen-absorbing resin composition. Further, an oxygen absorption amount and an elongation rate of the above film were measured, and an appearance thereof was observed in the same manners as in Example 1E. The results thereof are shown in Table 2E.

Comparative Example 3E

A film was produced in the same manner as in Example 1E to measure an oxygen absorption amount and an elongation rate of the above film and observe an appearance thereof, except that a weight ratio in melting and kneading was changed to the cobalt stearate-containing polyamide 1E:LL-DPE=80:20. The results thereof are shown in Table 2E.

Comparative Example 4E

A film was produced in the same manner as in Example 1E to measure an oxygen absorption amount and an elongation rate of the above film and observe an appearance thereof, except that the mixture was not molten and not kneaded with LLDPE and that the film was prepared only from the cobalt stearate-containing polyamide 1E. The results thereof are shown in Table 2E.

Comparative Example 5E

A film was produced in the same manner as in Example 1E to measure an oxygen absorption amount and an elongation rate of the above film and observe an appearance thereof, except that a weight ratio in melting and kneading was changed to the cobalt stearate-containing polyamide 9E:LL-DPE=10:90. The results thereof are shown in Table 2E.

The respective details of the polyamides 1E to 11E obtained above are shown in Table 1E, and the results of the respective examples and comparative examples are shown in Table 2E.

TABLE 1E

|  | End masking agent | End masking agent addition amount (equivalent) | End amino group concentration[1] (μeq/g) | Diamine[2] | Dicarboxylic acid[2] | Solid phase polymerization[3] | MFR (g/10 minutes) |
|---|---|---|---|---|---|---|---|
| Polyamide 1E | Phthalic anhydride | 1.5 | 21.5 | MXDA (0.996) | Sebacic acid (0.4) Adipic acid (0.6) | ○ (4 hours) | 15.0 (240° C.) |
| Polyamide 2E | Phthalic anhydride | 1.5 | 22.0 | MXDA (0.996) | Sebacic acid (0.4) Adipic acid (0.6) | ○ (4 hours) | 16.1 (240° C.) |
| Polyamide 3E | Trimellitic anhydride | 1.5 | 21.8 | MXDA (0.996) | Sebacic acid (0.4) Adipic acid (0.6) | ○ (4 hours) | 15.5 (240° C.) |
| Polyamide 4E | Phthalic anhydride | 0.2 | 29.2 | MXDA (0.999) | Sebacic acid (0.4) Adipic acid (0.6) | ○ (4 hours) | 11.2 (240° C.) |
| Polyamide 5E | Phthalic anhydride | 4.0 | 13.5 | MXDA (0.999) | Sebacic acid (0.4) Adipic acid (0.6) | ○ (4 hours) | 35.0 (240° C.) |
| Polyamide 6E | Phthalic anhydride | 5.0 | 11.5 | MXDA (0.999) | Sebacic acid (0.4) Adipic acid (0.6) | ○ (4 hours) | 50.1 (240° C.) |
| Polyamide 7A | Phthalic anhydride | 1.5 | 19.5 | MXDA (1.0) | Sebacic acid (0.3) Adipic acid (0.7) | ○ (4 hours) | 14.0 (240° C.) |
| Polyamide 8E | Phthalic anhydride | 1.5 | 20.8 | MXDA (1.001) | Sebacic acid (0.7) Adipic acid (0.3) | ○ (4 hours) | 16.5 (240° C.) |
| Polyamide 9E | Phthalic anhydride | 1.5 | 27.8 | MXDA (0.7) PXDA (0.3) | Adipic acid (1.0) | × | 30.3 (270° C.) |
| Polyamide 10E | End was not masked |  | 35.8 | MXDA (0.999) | Sebacic acid (0.4) Adipic acid (0.6) | ○ (4 hours) | 10.0 (240° C.) |
| Polyamide 11E | Phthalic anhydride | 0.1 | 31.8 | MXDA (0.999) | Sebacic acid (0.4) Adipic acid (0.6) | ○ (4 hours) | 10.6 (240° C.) |

MXDA: metaxylylenediamine,
PXDA: paraxylylenediamine
[1] End amino group concentration after masking the end amino group.
[2] Numerical value in parentheses shows a mole ratio of each component.
[3] Polymerization time is shown in parentheses. x: solid phase polymerization was not carried out.

TABLE 2E

|  | Composition | | Film | | | |
|---|---|---|---|---|---|---|
|  | Polyamide (end amino group concentration) | Melting kneading ratio[1] | Appearance | Oxygen absorption amount[2] Humidity 100% | Oxygen absorption amount[2] Humidity 30% | Elongation rate[3] |
| Example 1E | Polyamide 1E (21.5 μeq/g) | 35:65 | Good | 32 cc | 8.5 cc | 81% |
| Example 2E | Polyamide 2E (22.0 μeq/g) | 35:65 | Good | 30 cc | 7.8 cc | 77% |
| Example 3E | Polyamide 3E (21.8 μeq/g) | 35:65 | Good | 28 cc | 7.0 cc | 75% |
| Example 4E | Polyamide 4E (29.2 μeq/g) | 35:65 | Good | 20 cc | 4.0 cc | 77% |
| Example 5E | Polyamide 5E (13.5 μeq/g) | 35:65 | Slightly inferior | 17 cc | 3.1 cc | 70% |
| Example 6E | Polyamide 6E (11.5 μeq/g) | 35:65 | Inferior | 12 cc | 1.0 cc | 68% |
| Example 7E | Polyamide 7E (19.5 μeq/g) | 35:65 | Good | 21 cc | 6.5 cc | 78% |
| Example 8E | Polyamide 8E (20.8 μeq/g) | 35:65 | Good | 20 cc | 5.8 cc | 77% |
| Example 9E | Polyamide 1E (21.5 μeq/g) | 55:45 | Good | 31 cc | 7.1 cc | 60% |
| Example 10E | Polyamide 1E (21.5 μeq/g) | 25:75 | Good | 25 cc | 6.0 cc | 86% |
| Example 11E | Polyamide 9E (27.8 μeq/g) | 35:65 | Slightly inferior | 12 cc | 1.2 cc | 77% |
| Comparative Example 1E | Polyamide 10E (35.8 μeq/g) | 35:65 | Good | 6 cc | 0.1 cc | 80% |
| Comparative Example 2E | Polyamide 11E (31.8 μeq/g) | 35:65 | Good | 9 cc | 0.7 cc | 78% |
| Comparative Example 3E | Polyamide 1E (21.5 μeq/g) | 80:20 | Good | 7 cc | 0.6 cc | 10% |

TABLE 2E-continued

| | Composition | | Film | | | |
|---|---|---|---|---|---|---|
| | Polyamide (end amino group concentration) | Melting kneading ratio[1] | Appearance | Oxygen absorption amount[2] | | Elongation rate[3] |
| | | | | Humidity 100% | Humidity 30% | |
| Comparative Example 4E | Polyamide 1E (21.5 μeq/g) | 100:0 | Good | 8 cc | 0.2 cc | Film broken |
| Comparative Example 5E | Polyamide 9E (27.8 μeq/g) | 10:90 | Slightly inferior | 2 cc | 0.1 cc | 83% |

[1](total weight of transition metal catalyst and polyamide resin):weight of polyolefin resin
[2]whole amount of oxygen absorbed for 7 days since starting the test
[3]measured after stored at 40° C. and humidity 100% for 1 month As apparent from Examples 1E to 11E, the oxygen-absorbing resin compositions of the present invention were resin compositions which showed an excellent oxygen-absorbing performance at any of a high humidity and a low humidity and which maintained a film elasticity after absorbing oxygen.

In contrast with this, in Comparative Examples 1E and 2E in which an addition amount of the end masking agent was less than 0.5 equivalent, an end amino concentration of the polyamide resins obtained exceeded 30 μeq/g, and the good oxygen-absorbing performances were not obtained.

Further, the oxygen-absorbing performances were unsatisfactory in Comparative Examples 3E and 4E in which a content of the polyolefin resin in the resin composition exceeded 60% by weight and Comparative Example 5E in which the content was less than 15% by weight. In particular, as apparent from comparison of Comparative Examples 3E to 5E with Examples 1E, 9E, 10E and 11E, the good oxygen-absorbing performances were not necessarily obtained when a content of the polyamide A in the resin composition was large.

Example 12E

A two kind, three layer film (thickness: 10 μm/20 μm/10 μm) in which the oxygen-absorbing resin composition obtained in Example 1E was used for a core layer and in which LLDPE was used for a skin layer was prepared by subjecting one surface thereof to corona discharge treatment in a width of 1000 mm at 120 m/minute. An appearance of the film thus obtained was good, and a HAZE thereof was 77%. A urethane base adhesive for dry laminate (product name: "AD817/CAT-RT86L-60" manufactured by Toyo-Morton, Ltd.) was used for a corona discharge-treated surface to obtain an oxygen-absorbing multilayer film of PET (product name: "E5100" manufactured by Toyobo Co., Ltd., 12)/adhesive (3)/aluminum foil (9)/adhesive (3)/nylon (product name: "N1202" manufactured by Toyobo Co., Ltd., 15)/adhesive (3)/LLDPE (10)/oxygen-absorbing resin composition (20)/LLDPE (10).

The above oxygen-absorbing multilayer film was used to prepare a three side-sealed bag of 4×4 cm, and the bag was charged with 10 g of vitamin C powder having a water activity of 0.35 and tightly sealed. Then, it was stored at 23° C. After stored for one month, an oxygen concentration in the bag and an appearance thereof were inspected to find that an oxygen concentration in the bag was 0.1% or less and that an appearance of the vitamin C tablets was maintained well.

Example 13E

A two kind, three layer film was prepared in the same manner as in Example 12E, and this was used to obtain an oxygen-absorbing multilayer paper base material of bleached craft paper (basis weight: 340 g/m²)/urethane base adhesive for dry laminate (product name: "AD817/CAT-RT86L-60" manufactured by Toyo-Morton, Ltd., 3)/aluminum-deposited PET film (product name: "GL-ARH-F" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/oxygen-absorbing resin composition (20)/LLDPE (10) by extrusion lamination using low density polyethylene (product name: "Milason 18SP" manufactured by Mitsui Chemicals, Inc.). The above base material was molded into a paper container of a gable top type for 1 liter. A moldability of the container was good. The above paper container was charged with distilled rice spirit and tightly sealed, and then it was stored at 23° C. An oxygen concentration in the paper container was 0.1% or less after one month, and a flavor of the distilled rice spirit was maintained well.

Example 14E

An oxygen-absorbing resin composition was obtained in the same manner as in Example 1E, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDPE. Then, a two kind, three layer film (thickness: 15 μm/30 μm/15 μm) was prepared in the same manner as in Example 12E, except that the above oxygen-absorbing resin composition was used for a core layer and that PP was used for a skin layer in place of LLDPE. A HAZE of the film thus obtained was 64%. The urethane base adhesive for dry laminate (product name: "AD817/CAT-RT86L-60" manufactured by Toyo-Morton, Ltd.) was used for the corona discharge-treated surface to obtain an oxygen-absorbing multilayer film of aluminum-deposited PET (product name: "GL-AEH" manufactured by Toppan Printing Co., Ltd., 12)/adhesive (3)/ nylon (product name: "N1202" manufactured by Toyobo Co., Ltd., 15)/adhesive (3)/PP (15)/oxygen-absorbing resin composition (30)/PP (15). The above oxygen-absorbing multilayer film was used to prepare a three side-sealed bag of 10×20 cm. A circular vapor-passing port having a diameter of 2 mm was provided on a part thereof, and a circumference of the vapor-passing port was tentatively adhered by a label seal. The bag was charged with curry containing carrot and meat and tightly sealed, and after subjected to retort cooking and thermal sterilization at 124° C. for 30 minutes, it was stored at 23° C. The stew in an inside of the bag could be visually confirmed. After one month, the bag was heated as it was for about 4 minutes in an electric oven, and the bag was swollen after about 3 minutes to confirm that the tentatively adhered label seal was peeled off and that vapor was discharged from the vapor-passing port. After finishing cooking, a flavor of the curry and a color tone of the carrot were inspected to find that an appearance of the carrot was maintained well and that a flavor of the curry was good.

Comparative Example 6E

Iron powder having an average particle diameter of 20 μm was mixed with calcium chloride in a proportion of 100:1, and the mixture was kneaded with LLDPE in a weight ratio of 30:70 to obtain an iron powder base oxygen-absorbing resin composition AE. A two kind, three layer film was tried to be prepared in the same manner as in Example 12E by using the iron powder base oxygen-absorbing resin composition AE for a core layer, but irregularities of the iron powder were generated on the film surface, and the film was not obtained. Accordingly, the iron powder base oxygen-absorbing resin composition AE was extruded and laminated as an oxygen-absorbing layer in a thickness of 20 μm on LLDPE having a thickness of 40 μm to obtain a laminated film which was subjected on an oxygen-absorbing layer surface to corona discharge treatment. The above laminated film was laminated on a bleached craft paper in the same manner as in Example 13E to try to prepare a paper container of a gable top type comprising an oxygen-absorbing multilayer paper base material of bleached craft paper (basis weight: 340 g/m$^2$)/urethane base adhesive for dry laminate (product name: "AD817/CAT-RT86L-60" manufactured by Toyo-Morton, Ltd., 3)/aluminum-deposited PET film (product name: "GL-ARH" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AE (20)/LLDPE (40), but the thickness was large, and it was difficult to prepare a corner of the paper container. A preparing speed of the container was reduced to cut off the rejected products, and the container was obtained at last. A storing test of distilled rice spirit was carried out in the same manner as in Example 13E, but aldehyde odor was generated in opening the container, and a flavor thereof was notably reduced.

Comparative Example 7E

An iron powder base oxygen-absorbing resin composition BE was obtained in the same manner as in Comparative Example 6E, except that PP was used in place of LLDPE. Further, a laminated film of the iron powder base oxygen-absorbing resin composition BE (20)/PP (40) was prepared in the same manner as in Comparative Example 6E, except that PP was used in place of LLDPE, and then the oxygen-absorbing layer surface was subjected to corona discharge treatment. An oxygen-absorbing multilayer film of aluminum-deposited PET (product name: "GL-ARH" manufactured by Toppan Printing Co., Ltd., 12)/adhesive (3)/nylon (product name: "N1202" manufactured by Toyobo Co., Ltd., 15)/adhesive (3)/iron powder base oxygen-absorbing resin composition BE (20)/PP (40) was obtained in the same manner as in Example 14E. The oxygen-absorbing multilayer film thus obtained was used to carry out the same test as in Example 14E to result in finding that the flavor was maintained well but the content could not be visually confirmed and that air bubble-like unevenness was generated on the surface in heating in an electric oven.

As apparent from Examples 12E to 14E, the oxygen-absorbing resin compositions of the present invention were excellent in a processability into the paper containers and provided storing containers which were good in storing alcoholic beverages and heating and cooking in an electric oven even if a vapor-passing port was mounted. Further, they had an inside visibility, and a color tone of the content could be confirmed.

In the present invention, the specific polyamide resin and the transition metal catalyst were blended with the polyolefin resin in a specific proportion, whereby provided were the oxygen-absorbing resin compositions which were excellent in an oxygen-absorbing performance at any of a high humidity and a low humidity and maintained a resin with a strength after stored and which were excellent in a processability and could be applied to various containers and uses.

Production Process for the Oxygen-Absorbing Resin Composition

Example 1F

Metaxylylenediamine:sebacic acid:adipic acid were used in a mole ratio of 0.993:0.4:0.6 and subjected to melt polymerization and solid phase polymerization on the synthetic conditions described above to synthesize a polyamide resin (hereinafter, the above polyamide resin is referred to as the polyamide 1F). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 5 hours. The polyamide 1F had Tg of 73° C., a melting point of 184° C., a semi-crystallization time of 2000 seconds or longer, an end amino group concentration of 15.6 μeq/g, an end carboxyl group concentration of 64.3 μeq/g, a number average molecular weight of 25000 and MFR of 10.6 g/10 minutes at 240° C. The results thereof are shown in Table 1F.

Subsequently, cobalt stearate was added as a transition metal catalyst to molten linear low density polyethylene (product name: "Yumerit 4040F" manufactured by Ube Industries, Ltd., MFR: 4.0 g/10 minutes (measured according to JIS K7210), MFR: 7.9 g/10 minutes at 240° C., MFR: 8.7 g/10 minutes at 250° C., hereinafter referred to as LLDPE 1) through a side feed by means of a biaxial extruding equipment so that a cobalt concentration was 1000 ppm, whereby a master batch 1 was obtained. In the above case, LLDPE 1 was not observed to be reduced in a viscosity.

The above master batch 1 and the polyamide 1F were molten and kneaded at 240° C. in a weight ratio of the master batch 1:the polyamide 1F=75:25 to obtain an oxygen-absorbing resin composition. Then, the above oxygen-absorbing resin composition was used to obtain a film having a thickness of 50 μm and comprising a single layer of the oxygen-absorbing resin composition, and an appearance of the film was observed to find that an appearance of the film was good. The above film was cut into two films of 10×10 mm, and the films were put in gas-barriering bags which comprised an aluminum foil-laminated film and in which moisture contents in the bags were 30% and 100% together with 300 ml of air, followed by tightly sealing the bags. They were stored at 23° C. to measure a whole amount of oxygen absorbed for 7 days after tightly sealed. On the other hand, an elongation rate of the film after stored at 40° C. and a humidity of 100% for one month was measured. The results thereof are shown in Table 2F.

Example 2F

A film was produced in the same manner as in Example 1F to measure an oxygen absorption amount and an elongation rate of the above film and observe an appearance thereof, except that a weight ratio in melting and kneading was changed to the master batch 1:the polyamide 1F=85:15. The results thereof are shown in Table 2F.

Example 3F

A film was produced in the same manner as in Example 1F to measure an oxygen absorption amount and an elongation rate of the above film and observe an appearance thereof, except that a weight ratio in melting and kneading was changed to the master batch 1:the polyamide 1F=45:55. The results thereof are shown in Table 2F.

Example 4F

Cobalt stearate was added to LLDPE 1 so that a cobalt concentration was 400 ppm, whereby a master batch 2 was obtained. In the above case, LLDPE 1 was not observed to be reduced in a viscosity. Then, the above master batch 2 and the polyamide 1F were molten and kneaded in a weight ratio of the master batch 2:the polyamide 1F=75:25, and a film was produced in the same manner as in Example 1F to measure an oxygen absorption amount and an elongation rate of the above film and observe an appearance thereof. The results thereof are shown in Table 2F.

Example 5F

Cobalt stearate was added to LLDPE 1 so that a cobalt concentration was 2000 ppm, whereby a master batch 3 was obtained. In the above case, LLDPE 1 was not observed to be reduced in a viscosity. Then, the above master batch 3 and the polyamide 1F were molten and kneaded in a weight ratio of the master batch 3:the polyamide 1F=75:25, and a film was produced in the same manner as in Example 1F to measure an oxygen absorption amount and an elongation rate of the above film and observe an appearance thereof. The results thereof are shown in Table 2F.

Example 6F

Metaxylylenediamine:adipic acid:isophthalic acid were used in a mole ratio of 0.991:0.85:0.15 and subjected to melt polymerization and solid phase polymerization on the synthetic conditions described above to synthesize a polyamide resin (hereinafter, the above polyamide resin is referred to as the polyamide 2F). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 5 hours. The above polyamide 2F had Tg of 94° C., a melting point of 226° C., a semi-crystallization time of 770 seconds, an end amino group concentration of 11.1 μeq/g, an end carboxyl group concentration of 70.1 μeq/g and a number average molecular weight of 24600. MFR could not be measured at 240° C. since it was close to the melting point, and MFR at 250° C. was measured to find that MFR at 250° C. was 14.5 g/10 minutes. The results thereof are shown in Table 1F.

Then, a film was produced in the same manner as in Example 1F to measure an oxygen absorption amount and an elongation rate of the above film and observe an appearance thereof, except that the temperature in melting and kneading was changed to 250° C. The results thereof are shown in Table 2F.

Example 7F

Metaxylylenediamine:adipic acid were used in a mole ratio of 0.993:1 and subjected to melt polymerization and solid phase polymerization on the synthetic conditions described above to synthesize a polyamide resin (hereinafter, the above polyamide resin is referred to as the polyamide 3F). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 5 hours. The above polyamide 3F had Tg of 84° C., a melting point of 237° C., a semi-crystallization time of 25 seconds, an end amino group concentration of 12.2 μeq/g, an end carboxyl group concentration of 68.5 μeq/g and a number average molecular weight of 24800. MFR could not be measured at 240° C. since it was close to the melting point, and MFR at 250° C. was measured to find that MFR at 250° C. was 13.4 g/10 minutes. The results thereof are shown in Table 1F.

Then, a film was produced in the same manner as in Example 1F to measure an oxygen absorption amount and an elongation rate of the above film and observe an appearance thereof, except that the temperature in melting and kneading was changed to 250° C. The results thereof are shown in Table 2F.

Example 8F

Metaxylylenediamine and paraxylylenediamine were mixed in 85:15, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 270° C. by means of a biaxial extruding equipment to mask an end amino group (hereinafter, the above polyamide resin is referred to as the polyamide 4F). Controlled were the dropwise adding time to 2 hours, the polymerization temperature after finishing dropwise adding the diamine mixture in the melt polymerization to 270° C. and the reaction time to 30 minutes. The above polyamide 4F had Tg of 83° C., a melting point of 254° C., a semi-crystallization time of 24 seconds, an end amino group concentration of 22.2 μeq/g, an end carboxyl group concentration of 69.2 μeq/g and a number average molecular weight of 19000. MFR could not be measured at 260° C. since it was close to the melting point, and MFR at 270° C. was measured to find that MFR at 270° C. was 34.6 g/10 minutes. The results thereof are shown in Table 1F.

Then, a film was produced in the same manner as in Example 1F to measure an oxygen absorption amount and an elongation rate of the above film and observe an appearance thereof, except that the temperature in melting and kneading was changed to 270° C. The results thereof are shown in Table 2F.

Comparative Example 1F

A film was produced in the same manner as in Example 1F to measure an oxygen absorption amount and an elongation rate of the above film and observe an appearance thereof, except that a weight ratio in melting and kneading was changed to the master batch 1:the polyamide 1F=90:10. The results thereof are shown in Table 2F.

Comparative Example 2F

A film was produced in the same manner as in Example 1F to measure an oxygen absorption amount and an elongation rate of the above film and observe an appearance thereof, except that a weight ratio in melting and kneading was changed to the master batch 1:the polyamide 1F=10:90. The results thereof are shown in Table 2F.

Comparative Example 3F

A polyamide resin (hereinafter, the above polyamide resin is referred to as the polyamide resin 5F) was synthesized in the same manner as in Example 7F, except that metaxylylenediamine:adipic acid were used in a mole ratio of 1:1. The above polyamide resin 5F had Tg of 84° C., a melting point of 237° C., a semi-crystallization time of 25 seconds, an end amino group concentration of 38.9 µeq/g, an end carboxyl group concentration of 40.8 µeq/g and a number average molecular weight of 25100. MFR could not be measured at 240° C. since it was close to the melting point, and MFR at 250° C. was measured to find that MFR at 250° C. was 12.8 g/10 minutes. The results thereof are shown in Table 1F.

Then, the polyamide resin was molten and kneaded with the master batch 1 in the same manner as in Example 7F, and a film was produced to measure an oxygen absorption amount and an elongation rate of the above film and observe an appearance thereof. The results thereof are shown in Table 2F.

Comparative Example 4F

A polyamide resin (hereinafter, the above polyamide resin is referred to as the polyamide 6F) was synthesized in the same manner as in Example 7F, except that metaxylylenediamine and adipic acid were used in a mole ratio of 0.993:1 and that a polymerization time in the solid phase polymerization was changed to 2 hours. The above polyamide 6F had Tg of 84° C., a melting point of 237° C., a semi-crystallization time of 25 seconds, an end amino group concentration of 31.1 µeq/g, an end carboxyl group concentration of 84.1 µeq/g and a number average molecular weight of 17400. MFR could not be measured at 240° C. since it was close to the melting point, and MFR at 250° C. was measured to find that MFR at 250° C. was 39.2 g/10 minutes. The results thereof are shown in Table 1F.

Then, the polyamide resin was molten and kneaded with the master batch 1 in the same manner as in Example 7F, and a film was produced to measure an oxygen absorption amount and an elongation rate of the above film and observe an appearance thereof. The results thereof are shown in Table 2F.

TABLE 1F

| | End amino group concentration (µeq/g) | Diamine[1] | Dicarboxylic acid[1] | Solid phase polymerization[2] | End masking[3] | MFR (g/10 minutes) |
|---|---|---|---|---|---|---|
| Polyamide 1F | 15.6 | MXDA (0.993) | Sebacic acid (0.4) Adipic acid (0.6) | Present (5 hours) | None | 11.0 (240° C.) |
| Polyamide 2F | 11.1 | MXDA (0.991) | Adipic acid (0.85) Isophthalic acid (0.15) | Present (5 hours) | None | 14.5 (250° C.) |
| Polyamide 3F | 12.2 | MXDA (0.993) | Adipic acid (1.0) | Present (5 hours) | None | 13.4 (250° C.) |
| Polyamide 4F | 22.2 | MXDA (0.85) PXDA (0.15) | Adipic acid (1.0) | None | Present | 34.6 (270° C.) |
| Polyamide 5F | 38.9 | MXDA (1.0) | Adipic acid (1.0) | Present (5 hours) | None | 12.8 (250° C.) |
| Polyamide 6F | 31.1 | MXDA (0.993) | Adipic acid (1.0) | Present (2 hours) | None | 39.2 (250° C.) |

MXDA: metaxylylenediamine,
PXDA: paraxylylenediamine
[1] Numerical value in parentheses shows a mole ratio of each component.
[2] Present: the solid phase polymerization was carried out. The polymerization time is shown in parentheses. None: the solid phase polymerization was not carried out.
[3] Present: the end amino group was masked. None: the end amino group was not masked.

TABLE 2F

| | Master batch | | Polyamide | | | Film | | | |
|---|---|---|---|---|---|---|---|---|---|
| | | Co concentration (ppm) | (end amino group concentration | Melting kneading ratio[1] | Co concentration (ppm) | Appearance | Oxygen absorption amount[2] | | Elongation rate[3] |
| | No. | | | | | | Humidity 100% | Humidity 30% | |
| Example 1F | 1 | 1000 | Polyamide 1F (15.6 µeq/g) | 75:25 | 750 | ◎ | 25 cc | 6.8 cc | 83% |
| Example 2F | 1 | 1000 | Polyamide 1F (15.6 µeq/g) | 85:15 | 850 | ◎ | 22 cc | 6.0 cc | 90% |

TABLE 2F-continued

| | | Master batch | Polyamide | | | Film | | | |
| | | Co concentration (ppm) | (end amino group concentration) | Melting kneading ratio[1] | Co concentration (ppm) | Appearance | Oxygen absorption amount[2] | | Elongation rate[3] |
| | No. | | | | | | Humidity 100% | Humidity 30% | |
|---|---|---|---|---|---|---|---|---|---|
| Example 3F | 1 | 1000 | Polyamide 1F (15.6 µeq/g) | 45:55 | 450 | ◎ | 24 cc | 6.3 cc | 65% |
| Example 4F | 2 | 400 | Polyamide 1F (15.6 µeq/g) | 75:25 | 300 | ◎ | 23 cc | 6.1 cc | 81% |
| Example 5F | 3 | 2000 | Polyamide 1F (15.6 µeq/g) | 75:25 | 1500 | ◎ | 24 cc | 6.2 cc | 79% |
| Example 6F | 1 | 1000 | Polyamide 2F (11.1 µeq/g) | 75:25 | 750 | ◎ | 17 cc | 3.5 cc | 83% |
| Example 7F | 1 | 1000 | Polyamide 3F (12.2 µeq/g) | 75:25 | 750 | ◎ | 15 cc | 3.1 cc | 80% |
| Example 8F | 1 | 1000 | Polyamide 4F (22.2 µeq/g) | 75:25 | 750 | ◎ to ○ | 10 cc | 2.8 cc | 81% |
| Comparative Example 1F | 1 | 1000 | Polyamide 1F (15.6 µeq/g) | 90:10 | 900 | ◎ | 4 cc | 0.5 cc | 98% |
| Comparative Example 2F | 1 | 1000 | Polyamide 1F (15.6 µeq/g) | 10:90 | 100 | ○ | 3 cc | 0.5 cc | 16% |
| Comparative Example 3F | 1 | 1000 | Polyamide 5F (38.9 µeq/g) | 75:25 | 750 | ◎ | 3 cc | 0.3 cc | 80% |
| Comparative Example 4F | 1 | 1000 | Polyamide 6F (31.1 µeq/g) | 75:25 | 750 | Δ | 4 cc | 0.4 cc | 81% |

[1](weight of master batch):(weight of polyamide resin)
[2]amount of oxygen absorbed for 7 days since starting the test
[3]measured after stored at 40° C. and a humidity of 100% for 1 month As apparent from Examples 1F to 8F, the oxygen-absorbing resin compositions obtained by the production process of the present invention were resin compositions which showed a good oxygen-absorbing performance at any of a high humidity and a low humidity and which maintained a film elasticity after absorbing oxygen.

In contrast with this, the oxygen-absorbing performance was unsatisfactory in Comparative Example 1F in which a content of the polyamide A in the resin composition was less than 15% by weight and Comparative Example 2F in which it exceeded 60% by weight. Further, the film elasticity was deteriorated in Comparative Example 2F.

On the other hand, in Comparative Example 3F in which a mole ratio of metaxylylenediamine to adipic acid was increased as compared with Example 7F and Comparative Example 4F in which the solid phase polymerization time was shortened, an end amino group concentration of the polyamide resins obtained exceeded 30 µeq/g, and the good oxygen-absorbing performances were not obtained. Further, an appearance of the film was deteriorated as well in Comparative Example 4F.

Example 9F

A two kind, three layer film (thickness: 15 µm/30 µm/15 µm) in which the oxygen-absorbing resin composition obtained in Example 1F was used for a core layer and in which linear low density polyethylene (product name: "ELITE 5220G" manufactured by The Dow Chemical Company, MFR: 3.5 g/10 minutes (measured according to JIS K7210), MFR: 8.4 g/10 minutes at 240° C., MFR: 9.1 g/10 minutes at 250° C., hereinafter referred to as LLDPE 2) was used for a skin layer was prepared by subjecting one surface thereof to corona discharge treatment in a width of 800 mm at 100 m/minute. Uneven thickness such as humps and the like was not observed on the film roll thus obtained, and it had a good appearance and a HAZE of 20%. The urethane base adhesive for dry laminate (product name: "AD817/CAT-RT86L-60" manufactured by Toyo-Morton, Ltd.) was used for the corona discharge-treated surface to obtain an oxygen-absorbing multilayer film of a silica-deposited PET film (product name: "Tech Barrier T" manufactured by Mitsubishi Plastics, Inc., 12)/adhesive (3)/nylon film (product name: "N1202" manufactured by Toyobo Co., Ltd., 15)/adhesive (3)/LLDPE (15)/oxygen-absorbing resin (30)/LLDPE 2 (15). Numbers in parentheses mean the thicknesses (unit: µm) of the respective layers.

Next, a three side-sealed bag of 3 cm×5 cm was prepared with a LLDPE 2 side turned to an inner face, and the bag was charged with 15 g of vitamin C powder having a water activity of 0.35 and tightly sealed. Then, it was stored at 23° C. After stored for 2 months, an oxygen concentration in the bag and an appearance thereof were inspected from an outside of the bag to find that an oxygen concentration in the bag was 0.1% or less and that an appearance of the vitamin C powder was maintained well.

Example 10F

An oxygen-absorbing resin composition was obtained in the same manner as in Example 1F, except that an ethylene-propylene block copolymer (product name: "Novatec PP BC3HF" manufactured by Japan Polypropylene Corporation, MFR: 8.5 g/10 minutes at 230° C., MFR: 10.8 g/10 minutes at 240° C., MFR: 12.1 g/10 minutes at 250° C., hereinafter referred to as PP) was used in place of LLDP 2. Then, a two kind, three layer film (thickness: 20 µm/30 µm/20 µm) was prepared in the same manner as in Example 9F, except that PP was used for a skin layer in place of LLDPE. An appearance of the film thus obtained was good, and a HAZE thereof was 80%. The urethane base adhesive for dry laminate (product name: "TM251/CAT-RT88" manufactured by Toyo-Morton, Ltd.) was used for the corona discharge-treated surface to obtain an oxygen-absorbing multilayer film of an aluminum-deposited PET film (product name: "GL-ARH-F" manufactured by Toppan Printing Co., Ltd., 12)/adhesive (3)/nylon film (15)/adhesive (3)/PP (20)/oxygen-absorbing resin (30)/PP (20).

Next, a three side-sealed bag of 13 cm×18 cm was prepared with a PP side turned to an inner face, and the bag was charged with curry containing carrot, potato, onion and meat and subjected to retort cooking at 127° C. for 30 minutes. It was stored at 23° C. A color tone of the content after stored for 6 months was inspected from an outside of the bag to find that an appearance thereof was maintained well. The bag was opened, and a flavor of the curry was inspected to find that the flavor was maintained well.

Comparative Example 7F

Iron powder having an average particle diameter of 20 μm was mixed with calcium chloride in a proportion of 100:1, and the mixture was kneaded with PP in a weight ratio of 30:70 to obtain an iron powder base oxygen-absorbing resin composition F. A two kind, three layer film was tried to be prepared in the same manner as in Example 10 by using the above iron powder base oxygen-absorbing resin composition F for a core layer, but irregularities of the iron powder were generated on the film surface, and the good film was not obtained. Accordingly, the iron powder base oxygen-absorbing resin composition F was extruded and laminated as an oxygen-absorbing layer in a thickness of 20 μm on PP having a thickness of 40 μm to obtain a laminated film which was subjected on an oxygen-absorbing layer surface to corona discharge treatment. Then, an oxygen-absorbing multilayer film of aluminum-deposited PET film (12)/adhesive (3)/nylon film (15)/adhesive (3)/iron powder base oxygen-absorbing resin composition F (30)/PP (50) was obtained in the same manner as in Example 10F. The oxygen-absorbing multilayer film thus obtained was used to carry out the same test as in Example 10F to result in finding that the flavor was maintained well but the content could not be confirmed from an outside of the bag.

As apparent from Examples 9F and 10F, the oxygen-absorbing resin compositions of the present invention had a content visibility, and they were excellent in an oxygen-absorbing performance at any of a low humidity and a high humidity.

Oxygen-Absorbing Multilayer Film and
Oxygen-Absorbing Multilayer Container

Example 1G

Metaxylylenediamine:sebacic acid:adipic acid were used in a mole ratio of 0.992:0.4:0.6 and subjected to melt polymerization and solid phase polymerization on the synthetic conditions described above to synthesize a polyamide resin (hereinafter, the above polyamide resin is referred to as the polyamide 1G). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1G had Tg of 73° C., a melting point of 184° C., a semi-crystallization time of 2000 seconds or longer, an end amino group concentration of 17.5 μeq/g, an end carboxyl group concentration of 91.6 μeq/g, a number average molecular weight of 23500 and MFR of 11.0 g/10 minutes at 240° C. Further, a non-stretched film was prepared from the resulting polyamide 1G alone, and an oxygen permeability coefficient thereof was determined to find that it was 0.34 cc·mm/(m$^2$·day·atm) (23° C., 60% RH).

Cobalt stearate was added as a transition metal catalyst to the molten polyamide 1G through a side feed by means of a biaxial extruding equipment so that a cobalt concentration was 200 ppm. Further, the resulting mixture (hereinafter referred to as the cobalt stearate-containing polyamide 1GA) of the polyamide and cobalt stearate was molten and kneaded at 240° C. with linear low density polyethylene (product name: "Yumerit 4040F" manufactured by Ube-Maruzen Polyethylene Co., Ltd., MFR: 4.0 g/10 minutes (measured according to JIS K7210), MFR: 7.9 g/10 minutes at 240° C., MFR: 8.7 g/10 minutes at 250° C., hereinafter referred to as LLDPE 1) as a polyolefin resin in a weight ratio of the cobalt stearate-containing polyamide 1GA:LLDPE 1=40:60 to obtain an oxygen-absorbing resin pellet A.

A two kind, two layer film (thickness: oxygen-absorbing resin layer 20 μm/oxygen-permeating layer 20 μm) in which the oxygen-absorbing resin pellet A obtained was used for an oxygen-absorbing resin layer and in which linear low density polyethylene (product name: "Novatec LL UF641" manufactured by Japan Polyethylene Corporation, MFR: 2.1 g/10 minutes (measured according to JIS K7210), MFR: 4.4 g/10 minutes at 240° C., MFR: 5.2 g/10 minutes at 250° C., hereinafter referred to as LLDPE 2) was used for an oxygen-permeating layer was subjected on an oxygen-absorbing resin layer surface thereof to corona discharge treatment in a width of 800 mm at 100 m/minute to prepare a film roll thereof. Uneven thickness such as humps and the like was not observed on the film roll, and it had a good appearance and a HAZE of 15%. A urethane base adhesive for dry laminate (product name: "TM-319/CAT-19B" manufactured by Toyo-Morton, Ltd.) was used to laminate a nylon film A (product name: "N1202" manufactured by Toyobo Co., Ltd.), an aluminum foil and a PET film (product name: "E5102" manufactured by Toyobo Co., Ltd.) on a corona discharge-treated surface side thereof to obtain an oxygen-absorbing multilayer film comprising an oxygen-absorbing multilayer film of a PET film (12)/adhesive (3)/aluminum foil (9)/adhesive (3)/nylon film (15)/adhesive (3)/oxygen-absorbing resin (20)/LLDPE 2 (10). Next, a three side-sealed bag of 15×20 cm was prepared with a LLDPE 2 layer side turned to an inner face, and the bag was charged with 200 g of a powder seasoning "Dashinomoto" having a water activity of 0.35 and tightly sealed. It was stored at 23° C. An oxygen concentration in the bag and a flavor of the powder seasoning in the seventh day and after stored for one month were inspected. The results thereof are shown in Table 2G.

Example 2G

An oxygen-absorbing multilayer film was obtained in the same manner as in Example 1G, except that a weight ratio in melting and kneading was changed to the cobalt stearate-containing polyamide 1GA:LLDPE 1=55:45. Then, a three side-sealed bag was prepared to carry out the same storing test as in Example 1G. The results thereof are shown in Table 2G.

Example 3G

An oxygen-absorbing multilayer film was obtained in the same manner as in Example 1G, except that a weight ratio in melting and kneading was changed to the cobalt stearate-containing polyamide 1GA:LLDPE 1=25:75. Then, a three side-sealed bag was prepared to carry out the same storing test as in Example 1G. The results thereof are shown in Table 2G.

Example 4G

Metaxylylenediamine:sebacic acid:adipic acid were used in a mole ratio of 0.992:0.7:0.3 and subjected to melt polymerization and solid phase polymerization on the synthetic conditions described above to synthesize a polyamide resin (hereinafter, the above polyamide resin is referred to as the polyamide 2G). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 2G had Tg of 65° C., a melting point of 170° C., a semi-crystallization time of 2000 seconds or longer, an end amino group concentration of 19.2 µeq/g, an end carboxyl group concentration of 80.0 µeq/g, a number average molecular weight of 25200 and MFR of 10.1 g/10 minutes at 240° C. Further, a non-stretched film was prepared from the resulting polyamide 2G alone, and an oxygen permeability coefficient thereof was determined to find that it was 0.68 cc·mm/(m²·day·atm) (23° C., 60% RH).

Then, cobalt stearate was added thereto in the same manner as in Example 1G so that a cobalt concentration was 200 ppm, and the resulting mixture (hereinafter referred to as the cobalt stearate-containing polyamide 2G) of the polyamide 2G and cobalt stearate was molten and kneaded with LLDPE 1 at 240° C. in a weight ratio of the cobalt stearate-containing polyamide 2G:LLDPE 1=40:60 to obtain an oxygen-absorbing resin pellet. Further, an oxygen-absorbing multilayer film was obtained in the same manner as in Example 1G, and then a three side-sealed bag was prepared to carry out the same storing test as in Example 1G. The results thereof are shown in Table 2G.

Example 5G

Metaxylylenediamine:sebacic acid:adipic acid were used in a mole ratio of 0.992:0.3:0.7 and subjected to melt polymerization and solid phase polymerization on the synthetic conditions described above to synthesize a polyamide resin (hereinafter, the above polyamide resin is referred to as the polyamide 3G). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 3G had Tg of 78° C., a melting point of 194° C., a semi-crystallization time of 2000 seconds or longer, an end amino group concentration of 19.5 µeq/g, an end carboxyl group concentration of 81.2 µeq/g, a number average molecular weight of 24500 and MFR of 10.5 g/10 minutes at 240° C. Further, a non-stretched film was prepared from the resulting polyamide 3G alone, and an oxygen permeability coefficient thereof was determined to find that it was 0.21 cc·mm/(m²·day·atm) (23° C., 60% RH).

Then, cobalt stearate was added thereto in the same manner as in Example 1G so that a cobalt concentration was 200 ppm, and the resulting mixture (hereinafter referred to as the cobalt stearate-containing polyamide 3G) of the polyamide 3G and cobalt stearate was molten and kneaded with LLDPE 1 at 240° C. in a weight ratio of the cobalt stearate-containing polyamide 3G:LLDPE 1=40:60 to obtain an oxygen-absorbing resin pellet. Further, an oxygen-absorbing multilayer film was obtained in the same manner as in Example 1G, and then a three side-sealed bag was prepared to carry out the same storing test as in Example 1G. The results thereof are shown in Table 2G.

Example 6G

Metaxylylenediamine:adipic acid were used in a mole ratio of 0.994:1 and subjected to melt polymerization and solid phase polymerization on the synthetic conditions described above to synthesize a polyamide resin (hereinafter, the above polyamide resin is referred to as the polyamide 4G). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 4G had Tg of 84° C., a melting point of 237° C., a semi-crystallization time of 25 seconds, an end amino group concentration of 19.8 µeq/g, an end carboxyl group concentration of 67.0 µeq/g and a number average molecular weight of 23000. MFR could not be measured at 240° C. since it was close to the melting point, and MFR at 250° C. was measured to find that MFR at 250° C. was 14.4 g/10 minutes. A non-stretched film was prepared from the resulting polyamide 4G alone, and an oxygen permeability coefficient thereof was determined to find that it was 0.09 cc·mm/(m²·day·atm) (23° C., 60% RH).

Then, cobalt stearate was added to the polyamide 4G, and the mixture was molten and kneaded with LLDPE 1 in the same manners as in Example 1G, except that the temperature in melting and kneading was changed to 250° C. Further, an oxygen-absorbing multilayer film was obtained in the same manner as in Example 1G, and then a three side-sealed bag was prepared to carry out the same storing test as in Example 1G. The results thereof are shown in Table 2G.

Example 7G

Metaxylylenediamine and paraxylylenediamine were mixed in 8:2, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 270° C. by means of a biaxial extruding equipment to mask an end amino group (hereinafter, the above polyamide resin is referred to as the polyamide 5G). Controlled were the dropwise adding time to 2 hours, the polymerization temperature after finishing dropwise adding metaxylylenediamine in the melt polymerization to 270° C. and the reaction time to 30 minutes. The above polyamide 5G had Tg of 85° C., a melting point of 255° C., a semi-crystallization time of 24 seconds, an end amino group concentration of 23.5 µeq/g, an end carboxyl group concentration of 63.2 µeq/g and a number average molecular weight of 18900. MFR could not be measured at 260° C. since it was close to the melting point, and MFR at 270° C. was measured to find that MFR at 270° C. was 35.7 g/10 minutes. A non-stretched film was prepared from the resulting polyamide 5G alone, and an oxygen permeability coefficient thereof was determined to find that it was 0.13 cc·mm/(m²·day·atm) (23° C., 60% RH).

Then, cobalt stearate was added to the polyamide 5G, and the mixture was molten and kneaded with LLDPE 1 in the same manners as in Example 1G, except that the temperature in melting and kneading was changed to 270° C. Further, an oxygen-absorbing multilayer film was obtained in the same manner as in Example 1G, and then a three side-sealed bag was prepared to carry out the same storing test as in Example 1G. The results thereof are shown in Table 2G.

Example 8G

Metaxylylenediamine:adipic acid:isophthalic acid were used in a mole ratio of 0.991:0.9:0.1 and subjected to melt polymerization and solid phase polymerization on the synthetic conditions described above to synthesize a polyamide resin (hereinafter, the above polyamide resin is referred to as the polyamide 6G). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 6G had Tg of 94° C., a melting point of 228° C., a semi-crystallization time of 300 seconds, an end amino group concentration of 14.8 µeq/g, an end carboxyl group concentration of 67.2 µeq/g and a number average molecular weight of 23000. MFR could not be measured at 240° C. since it was close to the melting point, and MFR at 250° C. was measured to find that MFR at 250° C. was 15.4 g/10 minutes. A non-stretched film was prepared from the resulting polyamide 6G alone, and an oxygen permeability coefficient thereof was determined to find that it was 0.08 cc·mm/(m²·day·atm) (23° C., 60% RH).

Then, cobalt stearate was added to the polyamide 6G, and the mixture was molten and kneaded with LLDPE 1 in the same manners as in Example 1G, except that the temperature in melting and kneading was changed to 250° C. Further, an oxygen-absorbing multilayer film was obtained in the same manner as in Example 1G, and then a three side-sealed bag was prepared to carry out the same storing test as in Example 1G. The results thereof are shown in Table 2G.

Comparative Example 1G

A film was produced in the same manner as in Example 1G, except that a weight ratio in melting and kneading was changed to the cobalt stearate-containing polyamide 1GA: LLDPE 1=70:30. Then, a three side-sealed bag was prepared to carry out the same storing test as in Example 1G. The results thereof are shown in Table 2G.

Comparative Example 2G

A film was produced in the same manner as in Example 1G, except that the mixture was not molten and not kneaded with LLDPE 1 and that the film was prepared only from the cobalt stearate-containing polyamide 1GA. Then, a three side-sealed bag was prepared to carry out the same storing test as in Example 1G. The results thereof are shown in Table 2G.

Comparative Example 3G

A polyamide resin (hereinafter, the above polyamide resin is referred to as the polyamide resin 7G) was synthesized in the same manner as in Example 6G, except that metaxylylenediamine:adipic acid were used in a mole ratio of 1:1. The above polyamide 7G had Tg of 84° C., a melting point of 237° C., a semi-crystallization time of 25 seconds, an end amino group concentration of 42.4 µeq/g, an end carboxyl group concentration of 43.5 µeq/g and a number average molecular weight of 23300. MFR could not be measured at 240° C. since it was close to the melting point, and MFR at 250° C. was measured to find that MFR at 250° C. was 14.1 g/10 minutes. A non-stretched film was prepared from the resulting polyamide 7G alone, and an oxygen permeability coefficient thereof was determined to find that it was 0.09 cc·mm/(m²·day·atm) (23° C., 60% RH).

Then, cobalt stearate was added to the polyamide 7G, and the mixture was molten and kneaded with LLDPE 1 in the same manners as in Example 6G to produce a film in the same manner as in Example 1G. Then, a three side-sealed bag was prepared to carry out the same storing test as in Example 1G. The results thereof are shown in Table 2G.

Comparative Example 4G

A polyamide resin (hereinafter, the above polyamide resin is referred to as the polyamide resin 8G) was synthesized in the same manner as in Example 6G, except that metaxylylenediamine:adipic acid were used in a mole ratio of 0.994:1 and that the polymerization time in the solid phase polymerization was changed to 2 hours. The above polyamide 8G had Tg of 84° C., a melting point of 237° C., a semi-crystallization time of 25 seconds, an end amino group concentration of 31.4 µeq/g, an end carboxyl group concentration of 76.6 µeq/g and a number average molecular weight of 18500. MFR could not be measured at 240° C. since it was close to the melting point, and MFR at 250° C. was measured to find that MFR at 250° C. was 31.2 g/10 minutes. A non-stretched film was prepared from the resulting polyamide 8G alone, and an oxygen permeability coefficient thereof was determined to find that it was 0.09 cc·mm/(m²·day·atm) (23° C., 60% RH).

Then, cobalt stearate was added to the polyamide 8G, and the mixture was molten and kneaded with LLDPE 1 in the same manners as in Example 6G to produce a film in the same manner as in Example 1G. Then, a three side-sealed bag was prepared to carry out the same storing test as in Example 1G. The results thereof are shown in Table 2G.

The respective details of the polyamides 1G to 8G obtained above are shown in Table 1G, and the results of the respective examples and comparative examples are shown in Table 2G.

TABLE 1G

| | End amino group concentration (µeq/g) | Diamine[1] | Dicarboxylic acid[1] | Solid phase polymerization[2] | End masking[3] | MFR (g/10 minutes) | Oxygen permeability Coefficient[4] (cc·mm/(m²·day·atm)) |
|---|---|---|---|---|---|---|---|
| Polyamide 1G | 17.5 | MXDA (0.992) | Sebacic acid (0.4) Adipic acid (0.6) | ○ (4 hours) | x | 11.0 (240° C.) | 0.34 |
| Polyamide 2G | 19.2 | MXDA (0.992) | Sebacic acid (0.7) Adipic acid (0.3) | ○ (4 hours) | x | 10.1 (240° C.) | 0.68 |
| Polyamide 3G | 19.5 | MXDA (0.992) | Sebacic acid (0.3) Adipic acid (0.7) | ○ (4 hours) | x | 10.5 (240° C.) | 0.21 |
| Polyamide 4G | 19.8 | MXDA (0.994) | Adipic acid (1.0) | ○ (4 hours) | x | 14.4 (250° C.) | 0.09 |

TABLE 1G-continued

| | End amino group concentration (μeq/g) | Diamine[1] | Dicarboxylic acid[1] | Solid phase polymerization[2] | End masking[3] | MFR (g/10 minutes) | Oxygen permeability Coefficient[4] (cc · mm/(m² · day · atm)) |
|---|---|---|---|---|---|---|---|
| Polyamide 5G | 23.5 | MXDA (0.8) PXDA (0.2) | Adipic acid (1.0) | x | o | 35.7 (270° C.) | 0.13 |
| Polyamide 6G | 14.8 | MXDA (0.991) | Adipic acid (0.9) Isophthalic acid (0.1) | o (4 hours) | x | 15.4 (250° C.) | 0.08 |
| Polyamide 7G | 42.4 | MXDA (1.0) | Adipic acid (1.0) | o (4 hours) | x | 14.1 (250° C.) | 0.09 |
| Polyamide 8G | 31.4 | MXDA (0.994) | Adipic acid (1.0) | o (2 hours) | x | 31.2 (250° C.) | 0.09 |

MXDA: metaxylylenediamine,
PXDA: paraxylylenediamine
[1]Numerical value in parentheses shows a mole ratio of each component.
[2]o: the solid phase polymerization was carried out. The polymerization time is shown in parentheses. x: the solid phase polymerization was not carried out.
[3]o: the end amino group was masked. x: the end amino group was not masked.
[4]A non-stretched film was prepared from the polyamide alone, and an oxygen permeability coefficient thereof was measured at 23° C. and 60% RH.

TABLE 2G

| | Composition | | | | | |
|---|---|---|---|---|---|---|
| | Polyamide (end amino group concentration) | Melting kneading ratio[1] | Appearance of film roll | Oxygen concentration | | |
| | | | | After 7 days | After 1 month | Flavor after 1 month |
| Example 1G | Polyamide 1G (17.5 μeq/g) | 40:60 | Good | 0.4% | 0.1% or less | Good |
| Example 2G | Polyamide 1G (17.5 μeq/g) | 55:45 | Good | 3.3% | 0.5% | Almost good |
| Example 3G | Polyamide 1G (17.5 μeq/g) | 25:75 | Good | 2.3% | 0.1% or less | Good |
| Example 4G | Polyamide 2G (19.2 μeq/g) | 40:60 | Good | 0.9% | 0.1% or less | Good |
| Example 5G | Polyamide 3G (19.5 μeq/g) | 40:60 | Good | 0.9% | 0.1% or less | Good |
| Example 6G | Polyamide 4G (19.8 μeq/g) | 40:60 | Good | 4.7% | 0.9% | Almost good |
| Example 7G | Polyamide 5G (23.5 μeq/g) | 40:60 | Slightly inferior | 5.2% | 1.0% | Almost good |
| Example 8G | Polyamide 6G (14.8 μeq/g) | 35:65 | Good | 3.1% | 0.3% | Almost good |
| Comparative Example 1G | Polyamide 1G (17.5 μeq/g) | 70:30 | Slightly inferior | 8.9% | 3.5% | lowered |
| Comparative Example 2G | Polyamide 1G (17.5 μeq/g) | 100:0 | Good | 16.0% | 10.3% | lowered |
| Comparative Example 3G | Polyamide 7G (42.4 μeq/g) | 40:60 | Good | 9.5% | 3.8% | lowered |
| Comparative Example 4G | Polyamide 8G (31.4 μeq/g) | 40:60 | Slightly inferior | 8.5% | 3.2% | lowered |

[1](total weight of transition metal catalyst and polyamide resin):weight of polyolefin resin Example 9G A two kind, three layer film (thickness: 10 μm/20 μm/10 μm) in which the oxygen-absorbing resin pellet A was used for a core layer and in which LLDPE 2 was used for a skin layer was subjected on one surface thereof to corona discharge treatment in a width of 800 mm at 110 m/minute to prepare a film roll thereof.

Obtained by extrusion lamination using linear low density polyethylene (product name: "Kernel KC580S" manufactured by Japan Polyethylene Corporation, hereinafter referred to as LLDPE 3) was an oxygen-absorbing multilayer film of an aluminum-deposited PET film (product name: "GL-ARH-F" manufactured by Toppan Printing Co., Ltd., 12)/adhesive for laminate (3)/nylon film A (15)/urethane base anchor coating agent (product name: "A3210/A3075" manufactured by Mitsui Chemicals, Inc., 0.5)/LLDPE 3 (15)/LLDPE 2 (10)/oxygen-absorbing resin (20)/LLDPE 2 (10). The above film was processed into a self-supported bag (130× 175×35 mm) comprising two side face films and one bottom face film with a LLDPE 2 layer side turned to an inner face, and a processability of the bag was good. The bag was charged with cucumbers together with a solution containing acetic acid in a total amount of 200 g by high speed automatic charging at a rate of 40 bags/minute to find that an opening property of the bag was good and that heat sealing thereof was carried out without having any problems. The 100 bags which were charged and tightly sealed were subjected to boiling treatment at 90° C. for 30 minutes and then stored at 23° C. to inspect a flavor of the cucumbers and an appearance of the self-supported bags after one month. The cucumbers could be visually confirmed from an outside of the bags, and a flavor and a color tone of the cucumbers were maintained well. An appearance of the bags was not abnormal.

Comparative Example 5G

An oxygen-absorbing resin pellet was produced in the same manner as in Example 1G, except that a weight ratio in melting and kneading was changed to the cobalt stearate-containing polyamide 1GA:LLDPE 1=80:20. Then, the above pellet was used to prepare an oxygen-absorbing multilayer film in the same manner as in Example 9F, and the film was processed into a self-supported bag. The bags were charged with cucumbers together with a solution containing acetic acid in a total amount of 200 g in the same manner as in Example 9G to find that a sealing strength of the above bag was weak and that in particular, the oxygen-permeating layer was peeled off from the oxygen-absorbing resin layer. The charged bags were subjected to boiling treatment at 90° C. for 30 minutes, and the 62 bags were broken. The remaining bags were subjected to the same storing test as in Example 9G to find that a flavor and a color tone of the cucumbers were lowered. An appearance of the bags was not abnormal.

Comparative Example 6G

Iron powder having an average particle diameter of 20 μm was mixed with calcium chloride in a proportion of 100:1, and the mixture was kneaded with LLDPE in a weight ratio of 30:70 to obtain an iron powder base oxygen-absorbing resin composition AG. A two kind, three layer film was tried to be prepared in the same manner as in Example 9G by using the iron powder base oxygen-absorbing resin composition AG for a core layer, but irregularities of the iron powder were generated on the film surface, and the film was not obtained. Accordingly, the iron powder base oxygen-absorbing resin composition Ag was extruded and laminated as an oxygen-absorbing layer in a thickness of 20 μm on a linear low density polyethylene film (product name: "Tohcello T.U.X HC" manufactured by Mitsui Chemicals Tohcello, Inc., hereinafter referred to as LLDPE 4) having a thickness of 40 μm to obtain a laminated film which was subjected on an oxygen-absorbing layer surface to corona discharge treatment.

The above laminated film was laminated in the same manner as in Example 9G to prepare an iron base oxygen-absorbing multilayer film of an aluminum-deposited PET film (12)/adhesive for laminate (3)/nylon film (15)/urethane base anchor coating agent (0.5)/LLDPE 3 (15)/iron base oxygen-absorbing resin composition AG (20)/LLDPE 4 (40). It was processed into a self-supported bag in the same manner as in Example 9G.

The bags were tried to be charged with cucumbers together with a solution containing acetic acid in a total amount of 200 g in the same manner as in Example 9G, but an opening property of the bags was inferior, and the content was spilled out in several bags and could not be charged therein. Further, the storing test was carried out after the boiling treatment in the same manner as in Example 9G, but the cucumbers could not be visually confirmed from an outside of the bags, so that the bags were opened. A flavor and a color tone of the cucumbers were maintained well, but irregularities were generated on an appearance of the bags, and delamination was brought about on a part thereof.

Example 10G

An oxygen-absorbing resin pellet B was obtained in the same manner as in Example 1G, except that an ethylene-propylene random copolymer (product name: "Novatec PP FW4BT" manufactured by Japan Polypropylene Corporation, MFR: 6.5 g/10 minutes at 230° C., MFR: 8.3 g/10 minutes at 240° C., hereinafter referred to as PP 1) was used in place of LLDPE 1. An oxygen-absorbing resin layer 30 μm comprising the oxygen-absorbing resin pellet B and an oxygen-permeating layer 30 μm comprising an olefin base polymer alloy (product name: "VMX X150F" manufactured by Mitsubishi Chemical Corporation, MFR: 3.5 g/10 minutes at 190° C., MFR: 7.9 g/10 minutes at 240° C.) were laminated to prepare a two kind, two layer film. Subsequently, an ethylene-vinyl alcohol copolymer film (product name: "Eval EF-XL" manufactured by Kuraray Co., Ltd.) 15 μm and a nylon film B (product name: "N1102" manufactured by Toyobo Co., Ltd) 15 μm laminated by using an adhesive for laminate to obtain an oxygen-absorbing multilayer film of a nylon film B (15)/adhesive for laminate (3)/ethylene vinyl alcohol copolymer film (15)/adhesive for laminate (3)/oxygen-absorbing resin (30)/olefin base polymer alloy (30). An appearance of the film was good.

Next, an ethylene-propylene random copolymer (product name: "Novatec PP EG7F" manufactured by Japan Polyethylene Corporation, MFR: 1.3 g/10 minutes (measured according to JIS K7210), MFR: 8.2 g/10 minutes at 240° C., MFR: 9.8 g/10 minutes at 250° C., hereinafter referred to as PP 2) was used to prepare a sheet of PP 2 (400)/maleic anhydride-modified polypropylene (product name: "Admer QF500" manufactured by Mitsui Chemicals, Inc. 15)/ethylene-vinyl alcohol copolymer A (product name: "Eval L104B" manufactured by Kuraray Co., Ltd., 40)/maleic anhydride-modified polypropylene (product name: same as above, 15)/PP2 (40), and this was molded into a cup of 70 cc at a drawing ratio of 2.5. The above cup was fully charged with an orange jelly and tightly sealed by using the prepared oxygen-absorbing multilayer film as a cover material with a nylon film B layer side turned to an outer face. A color tone of the content could be visually confirmed through the cover material. The tightly sealed container was subjected to heating treatment at 85° C. for 30 minutes and then stored at 23° C. for one month. After one month, the container was opened to find that an opening property thereof was good without being turned into a double cap and that a flavor and a color tone of the content were maintained well.

Example 11G

An oxygen-absorbing multilayer film and a cup of 70 cc which were obtained in the same manner as in Example 10G were used and subjected respectively to hydrogen peroxide sterilization treatment by dipping. Abnormality was not brought about on the oxygen-absorbing multilayer film in the sterilization. The cup was charged in a hot state with strawberry jam kept at 80° C. and tightly sealed by using the oxygen-absorbing multilayer film as a cover material with a nylon film B layer side turned to an outside. The tightly sealed container was stored at 23° C. for one month. After one month, the content was visually confirmed through the cover material to find that a color tone thereof was maintained well. The cover material was opened to find that an opening property thereof was good without being turned into a double cap and that a flavor of the content was maintained well.

Comparative Example 7G

An iron base oxygen-absorbing multilayer film having an iron base oxygen-absorbing resin layer obtained in the same manner as in Comparative Example 7G was subjected to hydrogen peroxide sterilization treatment by the same method as in Example 11G to find that air bubbles were generated in hydrogen peroxide and that the sterilization could not be continued.

As apparent from Examples 1G to 11G, the oxygen-absorbing multilayer films of the present invention are turned into storing containers which are excellent in an oxygen-absorbing performance, a processability and a strength and can be subjected to heating treatment and which can be applied to foods incapable of being stored in oxygen-absorbing multilayer films prepared by using an iron base oxygen-absorbing agent and can be subjected to hydrogen peroxide sterilization. Further, they have an inside visibility to make it possible to confirm a color tone and the like in the content and can be applied to a cover material of containers.

The present invention relates to the oxygen-absorbing multilayer films which are excellent in an oxygen-absorbing performance at a low humidity and a high humidity and maintain a resin strength after stored and which are excellent in a processability and can be applied to various containers and uses by preparing the multilayer films having an oxygen-absorbing resin layer prepared by blending the specific polyamide resin and the transition metal catalyst with the polyolefin resin in a specific proportion.

Example 12G

Cobalt stearate was added as a transition metal catalyst to the molten polyamide 1G through a side feed by means of a biaxial extruding equipment so that a cobalt concentration was 400 ppm. Further, the resulting mixture (hereinafter referred to as the cobalt stearate-containing polyamide 1GB) of the polyamide 1G and cobalt stearate was molten and kneaded with PP 2 as the polyolefin resin at 240° C. in a weight ratio of the cobalt stearate-containing polyamide 1GB:PP 2=40:60 by means of the biaxial extruding equipment to obtain an oxygen-absorbing resin pellet C.

Then, a four kind, six layer multilayer sheet-molding apparatus comprising first to fourth extruding equipments, a feed block, a T die, a cooling roll and a sheet receiving equipment was used to extrude components from the respective extruding equipments to obtain an oxygen-absorbing multilayer sheet, wherein extruded were PP2 from the first extruding equipment, the oxygen-absorbing resin pellet C described above from the second extruding equipment, an ethylene-vinyl alcohol copolymer B (product name: "Eval L171B" manufactured by Kuraray Co., Ltd.) from the third extruding equipment and a polypropylene base adhesive resin (product name: Modec AP P604V manufactured by Mitsubishi Chemical Corporation) from the fourth extruding equipment. The constitution of the above multilayer sheet is PP 2 (80)/oxygen-absorbing resin (100)/adhesive layer (15)/ethylene-vinyl alcohol copolymer B (30)/adhesive layer (15)/PP 2 (250) from the inner layer. The multilayer sheet prepared by co-extrusion was a multilayer sheet which was free from thickness unevenness and the like and had a good appearance.

Next, the multilayer sheet thus obtained was subjected to thermoforming processing into a tray-like container (inner volume: 350 cc, surface area: 200 cm$^2$) with the inner layer turned to an inside by means of a vacuum molding machine. The oxygen-absorbing multilayer container obtained was free from thickness unevenness and had a good appearance. The above container was sterilized by a UV ray and charged with 200 g of sterile rice immediately after cooked, and oxygen in an inside of the container was substituted with nitrogen to reduce an oxygen concentration to 0.5%. Then, a gas-barriering film (PET film (12)/adhesive for laminate (3)/MXD6 base multilayer co-extruded nylon film (15)/adhesive for laminate (3)/non-stretched polypropylene film (60)) prepared by dry-laminating a PET film, a MXD6 base multilayer co-extruded nylon film (product name: "Supernyl SP-R" manufactured by Mitsubishi Plastics, Inc.) and a non-stretched polypropylene film (product name: "Aroma UT21" manufactured by Okamoto Industries, Incorporated) by an adhesive for laminate was used as a top film to tightly seal the container described above after sterilized by a UV ray as was the case with the container, and it was stored on the conditions of 23° C. and 50% RH. An oxygen concentration in the container after 3 months since starting storage was measured, and then the container was opened to confirm a flavor of the cooked rice and a strength of the oxygen-absorbing container. The results thereof are shown in Table 3G.

Example 13G

An oxygen-absorbing multilayer sheet was prepared in the same manner as in Example 12G, except that a weight ratio in melting and kneading was changed to the cobalt stearate-containing polyamide 1G:PP 2=60:40. Then, an oxygen-absorbing multilayer container was prepared to carry out the same storing test as in Example 12G. The results thereof are shown in Table 3G.

Example 14G

An oxygen-absorbing multilayer sheet was prepared in the same manner as in Example 12G, except that a weight ratio in melting and kneading was changed to the cobalt stearate-containing polyamide 1GB:PP 2=25:75. Then, an oxygen-absorbing multilayer container was prepared to carry out the same storing test as in Example 12G. The results thereof are shown in Table 3G.

Example 15G

An oxygen-absorbing multilayer sheet was prepared in the same manner as in Example 12G, except that the polyamide 2G was used in place of the polyamide 1G. Then, an oxygen-absorbing multilayer container was prepared to carry out the same storing test as in Example 12G. The results thereof are shown in Table 3G.

Comparative Example 8G

Iron powder having an average particle diameter of 20 µm was mixed with calcium chloride in a proportion of 100:1, and the mixture was kneaded with PP 2 in a weight ratio of 30:70 to obtain an iron base oxygen-absorbing resin composition BG. Subsequently, an oxygen-absorbing multilayer sheet was prepared in the same manner as in Example 12G, except that the iron base oxygen-absorbing resin composition BG was used for an oxygen-absorbing resin layer. The constitution of the above multilayer sheet was PP 2 (80)/oxygen-absorbing resin composition BG (100)/adhesive layer (15)/ethylene-vinyl alcohol copolymer B (30)/adhesive layer (15)/PP 2 (250) from the inner layer. The iron base multilayer sheet obtained was tried to be thermoformed to prepare a tray-like container, but drawdown was brought about, and therefore the processing was difficult. Further, the container prepared was opaque since the iron powder was used, and an appearance thereof was inferior due to irregularities originating in the iron powder. However, the container passing an appearance was obtained, and therefore the same storing test as in Example 12G was carried out. The results thereof are shown in Table 3G.

Comparative Example 9G

An oxygen-absorbing multilayer sheet was prepared in the same manner as in Example 12G, except that the mixture was not molten and kneaded with PP 2 and that an oxygen-absorbing resin pellet comprising only the cobalt stearate-containing polyamide 1G was prepared and used for an oxygen-absorbing resin layer. Then, an oxygen-absorbing multilayer container was prepared to carry out the same storing test as in Example 12G. The results thereof are shown in Table 3G.

TABLE 3G

| | Oxygen-absorbing resin pellet | | | | | | |
|---|---|---|---|---|---|---|---|
| | Polyamide G (end amino group concentration) | Melting kneading ratio[1] | Oxygen-absorbing container | | | Oxygen concentration in container | Flavor of cooked rice |
| | | | Moldability | Transparency | Strength | | |
| Example 12G | Polyamide 1G (17.5 μeq/g) | 40:60 | Good | Good | Good | 0.1% or less | Good |
| Example 13G | Polyamide 1G (17.5 μeq/g) | 60:40 | Slightly inferior | Slightly inferior | Almost good | 0.1% or less | Good |
| Example 14G | Polyamide 1G (17.5 μeq/g) | 25:75 | Good | Good | Good | 0.1% or less | Good |
| Example 15G | Polyamide 2G (19.2 μeq/g) | 40:60 | Good | Good | Good | 0.1% or less | Good |
| Comparative Example 8G | —[2] | | Inferior | None | Good | 0.1% or less | Good |
| Comparative Example 9G | Polyamide 1G (17.5 μeq/g) | 100:0 | Slightly inferior | Good | Reduced | 0.9% | Reduced |

[1](total weight of transition metal catalyst and polyamide resin):weight of polyolefin resin
[2]The iron base oxygen-absorbing resin composition BG was used as the oxygen-absorbing resin composition.

As apparent from Examples 12G to 15G, the oxygen-absorbing multilayer containers of the present invention show a good moldability and a good oxygen-absorbing performance and are transparent, and a strength of the containers can be maintained even after absorbing oxygen.

Example 16G

A two kind, three layer film (thickness: 10 μm/10 μm/10 μm) in which the oxygen-absorbing resin pellet B was used for a core layer and in which PP 1 was used for a skin layer was prepared by subjecting one surface thereof to corona discharge treatment in a width of 800 mm at 100 m/minute. The oxygen-absorbing multilayer container obtained had a good appearance.

The above oxygen-absorbing multilayer container and a polypropylene sheet of 200 μm (product name: "NS3451" manufactured by Sumitomo Bakelite Co., Ltd.) were dry-laminated by using a gas-barriering adhesive (product name: "Maxive" manufactured by Mitsubishi Gas Chemical Company, Inc.) to prepare an oxygen-absorbing multilayer sheet of PP 1 (10)/oxygen-absorbing resin (10)/PP 1 (10)/gas-barriering adhesive (3)/polypropylene sheet (200) from an inner layer. Then, the above oxygen-absorbing multilayer sheet was vacuum-molded with an inner layer turned to an inside to mold a pocket (diameter: 12 mm, depth: 5 mm) of press•through•pack. Further, a urethane base anchor coating agent (product name: "A3210" manufactured by Mitsui Chemicals Polyurethane, Inc.) was coated on an aluminum foil of 25 μm, and polypropylene (product name: "F329RA" manufactured by Prime Polymer Co., Ltd.) was extrusion-coated thereon as a heat sealing material in a thickness of 25 μm to obtain an aluminum foil-coated film of an aluminum foil (25)/anchor coating agent (1)/polypropylene (25). The pocket was charged with 2 g of vitamin C tablets having a water activity of 0.35 and tightly sealed by heat-sealing it with the aluminum foil-coated film, and then it was stored at 23° C. After stored for one month, an oxygen concentration in the bag and an appearance thereof were inspected to find that an oxygen concentration in the pocket was 0.1% or less and that an appearance of the vitamin C tablets was maintained well.

Example 17G

An oxygen-absorbing multilayer sheet was prepared in the same manner as in Example 12G. The constitution of the above multilayer sheet was PP 2 (90)/oxygen-absorbing resin (80)/adhesive layer (15)/ethylene-vinyl alcohol copolymer B (30)/adhesive layer (15)/PP 2 (250) from the inner layer. Then, the above multilayer sheet was thermoformed into a cup-like container (inner volume: 100 cc, surface area: 96 cm²) with an inner layer turned to an inside by means of a vacuum molding machine. Misty hydrogen peroxide was sprayed onto the above container, and then it was dried by hot air and sterilized. Then, the container was charged with orange jam and tightly sealed by using for a top film, a gas-barriering film obtained in the same manner as in Example 12G and sterilized similarly by hydrogen peroxide, and then it was stored at 23° C. After stored for one month, an oxygen concentration in the container was 0.1% or less, and a flavor of the orange jam was maintained.

Comparative Example 10G

An iron base oxygen-absorbing multilayer sheet was prepared in the same manner as in Comparative Example 8G. The constitution of the above multilayer sheet was PP 2 (90)/iron base oxygen-absorbing resin composition BG (80)/adhesive layer (15)/ethylene-vinyl alcohol copolymer B (30)/adhesive layer (15)/PP 2 (250) from the inner layer. Then, the above multilayer sheet was tried to be thermoformed to prepare the same cup-like container as in Example 17G, but drawdown was brought about, and the processing was difficult. However, the container passing an appearance was obtained, and therefore misty hydrogen peroxide was sprayed onto the container to find that the iron powder exposed at an end face of the container was reacted with hydrogen peroxide to make sterilization difficult. After dried by hot air, the iron powder at the end face rusted.

The present invention relates to the oxygen-absorbing multilayer container prepared by thermoforming the oxygen-absorbing multilayer film which is excellent in an oxygen-absorbing performance at a low humidity and a high humidity and maintains a resin strength after stored and which is excellent in a processability and can be applied to various containers and uses by blending the specific polyamide resin and the transition metal catalyst with the polyolefin resin in a specific proportion.

Example 1H

Metaxylylenediamine:sebacic acid:adipic acid were used in a mole ratio of 0.992:0.4:0.6 and subjected to melt polymerization and solid phase polymerization on the synthetic conditions described above to synthesize a polyamide resin (hereinafter, the above polyamide resin is referred to as the polyamide 1H). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1H had Tg of 73° C., a melting point of 184° C., a semi-crystallization time of 2000 seconds or longer, an end amino group concentration of 17.5 µeq/g, an end carboxyl group concentration of 91.6 µeq/g, a number average molecular weight of 23500 and MFR of 11.0 g/10 minutes at 240° C. Further, a non-stretched film was prepared from the resulting polyamide 1H alone, and an oxygen permeability coefficient thereof was determined to find that it was 0.34 cc·mm/(m²·day·atm) (23° C., 60% RH).

Cobalt stearate was added as a transition metal catalyst to the molten polyamide 1H through a side feed by means of a biaxial extruding equipment so that a cobalt concentration was 400 ppm. Further, the resulting mixture (hereinafter referred to as the cobalt stearate-containing polyamide 1H) of the polyamide and cobalt stearate was molten and kneaded at 240° C. with linear low density polyethylene (product name: "Yumerit 4040F" manufactured by Ube-Maruzen Polyethylene Co., Ltd., MFR: 4.0 g/10 minutes (measured according to JIS K7210), MFR: 7.9 g/10 minutes at 240° C., MFR: 8.7 g/10 minutes at 250° C., hereinafter referred to as LLDPE 1) as a polyolefin resin and maleic anhydride-modified polyethylene (product name: "Modec AP M545" manufactured by Mitsubishi Gas Chemical Company, Inc., MFR: 6.0 g/10 minutes (measured according to JIS K7210), MFR: 14.4 g/10 minutes at 240° C., MFR: 16.1 g/10 minutes at 250° C., hereinafter referred to as MAPE) as a maleic anhydride-modified polyethylene resin in a weight ratio of the cobalt stearate-containing polyamide 1H:LLDPE 1:MAPE=40:50:10 to obtain an oxygen-absorbing resin pellet A.

A two kind, three layer film (thickness: intermediate LLDPE 2 layer 10 µm/oxygen-absorbing resin layer 20 µm/sealant LLDPE 2 layer 10 µm) in which the oxygen-absorbing resin pellet A obtained was used for an oxygen-absorbing resin layer and in which linear low density polyethylene (product name: "ELITE 5220G" manufactured by The Dow Chemical Company, MFR: 3.5 g/10 minutes (measured according to JIS K7210), MFR: 8.4 g/10 minutes at 240° C., MFR: 9.1 g/10 minutes at 250° C., hereinafter referred to as LLDPE 2) was used for a sealant layer and an intermediate layer was subjected on an intermediate layer surface thereof to corona discharge treatment in a width of 760 mm at 60 m/minute to prepare a film roll thereof. Uneven thickness such as humps and the like was not observed on the film roll, and it had a good appearance and a HAZE of 19%. A urethane base adhesive for dry laminate (product: "AD-817/CAT-RT86L-60" manufactured by Toyo-Morton, Ltd.) was used to laminate a nylon film A (product name: "N1202" manufactured by Toyobo Co., Ltd.) and an aluminum-deposited PET film (product name: "GL-ARH-F" manufactured by Toppan Printing Co., Ltd.) on a corona-treated surface side to obtain an oxygen-absorbing multilayer film comprising an oxygen-absorbing multilayer film of an aluminum-deposited PET film (12)/adhesive (3)/nylon film A (15)/adhesive (3)/LLDPE 2 (10)/oxygen-absorbing resin (20)/LLDPE 2 (10). Numbers in parentheses mean a thickness (unit: µm) of the respective layers. Next, a three side-sealed bag of 11 cm×17 cm was prepared with a sealant layer side turned to an inner face, and the bag was charged with 80 g of orange and 80 g of a fruit syrup liquid. Then, it was tightly sealed so that a head space air amount was 5 cc and subjected to boiling treatment at 90° C. for 30 minutes to measure the sealing strength after the boiling treatment. Then, the remaining sample was stored at 40° C. and 100% RH. A concentration of oxygen in an inside of the bag in the seventh day and a color tone of the orange after stored for one month were inspected from an outside of the bag, and a flavor thereof was inspected by opening the bag. The results thereof are shown in Table 2H.

Comparative Example 2H

An oxygen-absorbing multilayer film was obtained in the same manner as in Example 1H, except that a weight ratio in melting and kneading was changed to the cobalt stearate-containing polyamide 1H:LLDPE 1:MAPE=40:55:5. Then, a three side-sealed bag was prepared to carry out the same storing test as in Example 1H. The results thereof are shown in Table 2H.

Comparative Example 3H

An oxygen-absorbing multilayer film was obtained in the same manner as in Example 1H, except that a weight ratio in melting and kneading was changed to the cobalt stearate-containing polyamide 1H:LLDPE 1:MAPE=40:45:15. Then, a three side-sealed bag was prepared to carry out the same storing test as in Example 1H. The results thereof are shown in Table 2H.

Comparative Example 4H

An oxygen-absorbing multilayer film was obtained in the same manner as in Example 1H, except that a weight ratio in melting and kneading was changed to the cobalt stearate-containing polyamide 1H:LLDPE 1:MAPE=40:35:25. Then, a three side-sealed bag was prepared to carry out the same storing test as in Example 1H. The results thereof are shown in Table 2H.

Example 5H

An oxygen-absorbing multilayer film was obtained in the same manner as in Example 1H, except that a weight ratio in melting and kneading was changed to the cobalt stearate-containing polyamide 1H:LLDPE 1:MAPE=55:35:10. Then, a three side-sealed bag was prepared to carry out the same storing test as in Example 1H. The results thereof are shown in Table 2H.

Example 6H

An oxygen-absorbing multilayer film was obtained in the same manner as in Example 1H, except that a weight ratio in melting and kneading was changed to the cobalt stearate-containing polyamide 1H:LLDPE 1:MAPE=25:70:5. Then, a three side-sealed bag was prepared to carry out the same storing test as in Example 1H. The results thereof are shown in Table 2H.

Example 7H

Metaxylylenediamine:sebacic acid:adipic acid were used in a mole ratio of 0.992:0.7:0.3 and subjected to melt polymerization and solid phase polymerization on the synthetic conditions described above to synthesize a polyamide resin (hereinafter, the above polyamide resin is referred to as the polyamide 2H). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 2H had Tg of 65° C., a melting point of 170° C., a semi-crystallization time of 2000 seconds or longer, an end amino group concentration of 19.2 µeq/g, an end carboxyl group concentration of 80.0 µeq/g, a number average molecular weight of 25200 and MFR of 10.1 g/10 minutes at 240° C. Further, a non-stretched film was prepared from the resulting polyamide 2H alone, and an oxygen permeability coefficient thereof was determined to find that it was 0.68 cc·mm/($m^2$·day·atm) (23° C., 60% RH).

Then, cobalt stearate was added thereto in the same manner as in Example 1H so that a cobalt concentration was 400 ppm, and the resulting mixture (hereinafter referred to as the cobalt stearate-containing polyamide 2H) of the polyamide 2H and cobalt stearate was molten and kneaded with LLDPE 1 and MAPE at 240° C. in a weight ratio of the cobalt stearate-containing polyamide 2H:LLDPE 1:MAPE=40:50:10 to obtain an oxygen-absorbing resin pellet. Further, an oxygen-absorbing multilayer film was obtained in the same manner as in Example 1H, and then a three side-sealed bag was prepared to carry out the same storing test as in Example 1H. The results thereof are shown in Table 2H.

Example 8H

Metaxylylenediamine:sebacic acid:adipic acid were used in a mole ratio of 0.992:0.3:0.7 and subjected to melt polymerization and solid phase polymerization on the synthetic conditions described above to synthesize a polyamide resin (hereinafter, the above polyamide resin is referred to as the polyamide 3H). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 3H had Tg of 78° C., a melting point of 194° C., a semi-crystallization time of 2000 seconds or longer, an end amino group concentration of 19.5 µeq/g, an end carboxyl group concentration of 81.2 µeq/g, a number average molecular weight of 24500 and MFR of 10.5 g/10 minutes at 240° C. Further, a non-stretched film was prepared from the resulting polyamide 3H alone, and an oxygen permeability coefficient thereof was determined to find that it was 0.21 cc·mm/($m^2$·day·atm) (23° C., 60% RH).

Then, cobalt stearate was added thereto in the same manner as in Example 1H so that a cobalt concentration was 400 ppm, and the resulting mixture (hereinafter referred to as the cobalt stearate-containing polyamide 3H) of the polyamide 3H and cobalt stearate was molten and kneaded with LLDPE 1 and MAPE at 240° C. in a weight ratio of the cobalt stearate-containing polyamide 3H:LLDPE 1:MAPE=40:50:10 to obtain an oxygen-absorbing resin pellet. Further, an oxygen-absorbing multilayer film was obtained in the same manner as in Example 1H, and then a three side-sealed bag was prepared to carry out the same storing test as in Example 1H. The results thereof are shown in Table 2H.

Example 9H

Metaxylylenediamine:adipic acid were used in a mole ratio of 0.994:1 and subjected to melt polymerization and solid phase polymerization on the synthetic conditions described above to synthesize a polyamide resin (hereinafter, the above polyamide resin is referred to as the polyamide 4H). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 4H had Tg of 84° C., a melting point of 237° C., a semi-crystallization time of 25 seconds, an end amino group concentration of 19.8 µeq/g, an end carboxyl group concentration of 67.0 µeq/g and a number average molecular weight of 23000. MFR could not be measured at 240° C. since it was close to the melting point, and MFR at 250° C. was measured to find that MFR at 250° C. was 14.4 g/10 minutes. A non-stretched film was prepared from the resulting polyamide 4H alone, and an oxygen permeability coefficient thereof was determined to find that it was 0.09 cc·mm/($m^2$·day·atm) (23° C., 60% RH).

Then, cobalt stearate was added to the polyamide 4H, and the mixture was molten and kneaded with LLDPE 1 and MAPE in the same manners as in Example 1H, except that the temperature in melting and kneading was changed to 250° C. Further, an oxygen-absorbing multilayer film was obtained in the same manner as in Example 1H, and then a three side-sealed bag was prepared to carry out the same storing test as in Example 1H. The results thereof are shown in Table 2H.

Example 10H

Metaxylylenediamine and paraxylylenediamine were mixed in 8:2, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 270° C. by means of a biaxial extruding equipment to mask an end amino group (hereinafter, the above polyamide resin is referred to as the polyamide 5H). Controlled were the dropwise adding time to 2 hours, the polymerization temperature after finishing dropwise adding metaxylylenediamine in the melt polymerization to 270° C. and the reaction time to 30 minutes. The above polyamide 5H had Tg of 85° C., a melting point of 255° C., a semi-crystallization time of 24 seconds, an end amino group concentration of 23.5 µeq/g, an end carboxyl group concentration of 63.2 µeq/g and a number average molecular weight of 18900. MFR could not be measured at 260° C. since it was close to the melting point, and MFR at 270° C. was measured to find that MFR at 270° C. was 35.7 g/10 minutes. A non-stretched film was prepared from the resulting polyamide 5H alone, and an oxygen permeability coefficient thereof was determined to find that it was 0.13 cc·mm/($m^2$·day·atm) (23° C., 60% RH).

Then, cobalt stearate was added to the polyamide 5H, and the mixture was molten and kneaded with LLDPE 1 and MAPE in the same manners as in Example 1H, except that the temperature in melting and kneading was changed to 270° C. Further, an oxygen-absorbing multilayer film was obtained in the same manner as in Example 1H, and then a three side-sealed bag was prepared to carry out the same storing test as in Example 1H. The results thereof are shown in Table 2H.

Example 11H

Metaxylylenediamine:sadipic acid:isophthalic acid were used in a mole ratio of 0.991:0.9:0.1 and subjected to melt polymerization and solid phase polymerization on the synthetic conditions described above to synthesize a polyamide resin (hereinafter, the above polyamide resin is referred to as the polyamide 6H). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 6H had Tg of 94° C., a melting point of 228° C., a semi-crystallization time of 300 seconds, an end amino group concentration of 14.8 µeq/g, an end carboxyl group concentration of 67.2 µeq/g and a number average molecular weight of 23000. MFR could not be measured at 240° C. since it was close to the melting point, and MFR at 250° C. was measured to find that MFR at 250° C. was 15.4 g/10 minutes. A non-stretched film was prepared from the resulting polyamide 6H alone, and an oxygen permeability coefficient thereof was determined to find that it was 0.08 cc·mm/(m$^2$·day·atm) (23° C., 60% RH).

Then, cobalt stearate was added to the polyamide 6H, and the mixture was molten and kneaded with LLDPE 1 and MAPE in the same manners as in Example 1H, except that the temperature in melting and kneading was changed to 250° C. Further, an oxygen-absorbing multilayer film was obtained in the same manner as in Example 1H, and then a three side-sealed bag was prepared to carry out the same storing test as in Example 1H. The results thereof are shown in Table 2H.

Comparative Example 1H

An oxygen-absorbing multilayer film was obtained in the same manner as in Example 1H, except that a weight ratio in melting and kneading was changed to the cobalt stearate-containing polyamide 1H:LLDPE 1:MAPE=10:85:5. Then, a three side-sealed bag was prepared to carry out the same storing test as in Example 1H. The results thereof are shown in Table 2H.

Comparative Example 2H

An oxygen-absorbing multilayer film was obtained in the same manner as in Example 1H, except that a weight ratio in melting and kneading was changed to the cobalt stearate-containing polyamide 1H:LLDPE 1:MAPE=70:20:10. Then, a three side-sealed bag was prepared to carry out the same storing test as in Example 1H. The results thereof are shown in Table 2H.

Comparative Example 3H

A polyamide resin (hereinafter, the above polyamide resin is referred to as the polyamide 7H) was synthesized in the same manner as in Example 9, except that metaxylylenediamine and adipic acid were used in a mole ratio of 1:1. The above polyamide 7H had Tg of 84° C., a melting point of 237° C., a semi-crystallization time of 25 seconds, an end amino group concentration of 42.4 µeq/g, an end carboxyl group concentration of 43.5 µeq/g and a number average molecular weight of 23300. MFR could not be measured at 240° C. since it was close to the melting point, and MFR at 250° C. was measured to find that MFR at 250° C. was 14.1 g/10 minutes. A non-stretched film was prepared from the resulting polyamide 7G alone, and an oxygen permeability coefficient thereof was determined to find that it was 0.09 cc·mm/(m$^2$·day·atm) (23° C., 60% RH).

Then, cobalt stearate was added to the polyamide 7H, and the mixture was molten and kneaded with LLDPE 1 and MAPE in the same manners as in Example 9H to produce a film in the same manner as in Example 1H. Then, a three side-sealed bag was prepared to carry out the same storing test as in Example 1H. The results thereof are shown in Table 2H.

Comparative Example 4H

A polyamide resin (hereinafter, the above polyamide resin is referred to as the polyamide 8H) was synthesized in the same manner as in Example 9H, except that metaxylylenediamine:adipic acid were used in a mole ratio of 0.994:1 and that the polymerization time in the solid phase polymerization was changed to 2 hours. The above polyamide 8H had Tg of 84° C., a melting point of 237° C., a semi-crystallization time of 25 seconds, an end amino group concentration of 31.4 µeq/g, an end carboxyl group concentration of 76.6 µeq/g and a number average molecular weight of 18500. MFR could not be measured at 240° C. since it was close to the melting point, and MFR at 250° C. was measured to find that MFR at 250° C. was 31.2 g/10 minutes. A non-stretched film was prepared from the resulting polyamide 8H alone, and an oxygen permeability coefficient thereof was determined to find that it was 0.09 cc·mm/(m$^2$·day·atm) (23° C., 60% RH).

Then, cobalt stearate was added to the polyamide 8H, and the mixture was molten and kneaded with LLDPE 1 and MAPE in the same manners as in Example 9H to produce a film in the same manner as in Example 1H. Then, a three side-sealed bag was prepared to carry out the same storing test as in Example 1H. The results thereof are shown in Table 2H.

The respective details of the polyamides 1H to 8H obtained above are shown in Table 1H, and the results of the respective examples and comparative examples are shown in Table 2H.

TABLE 1H

|  | End amino group concentration (µeq/g) | Diamine[1] | Dicarboxylic acid[1] | Solid phase polymerization[2] | End masking[3] | MFR (g/10 minutes) | Oxygen permeability Coefficient[4] (cc·mm/(m$^2$·day·atm)) |
|---|---|---|---|---|---|---|---|
| Polyamide 1H | 17.5 | MXDA (0.992) | Sebacic acid (0.4) Adipic acid (0.6) | ○ (4 hours) | x | 11.0 (240° C.) | 0.34 |

TABLE 1H-continued

|  | End amino group concentration (μeq/g) | Diamine[1] | Dicarboxylic acid[1] | Solid phase polymerization[2] | End masking[3] | MFR (g/10 minutes) | Oxygen permeability Coefficient[4] (cc·mm/(m$^2$·day·atm)) |
|---|---|---|---|---|---|---|---|
| Polyamide 2H | 19.2 | MXDA (0.992) | Sebacic acid (0.7) Adipic acid (0.3) | ○ (4 hours) | x | 10.1 (240° C.) | 0.68 |
| Polyamide 3H | 19.5 | MXDA (0.992) | Sebacic acid (0.3) Adipic acid (0.7) | ○ (4 hours) | x | 10.5 (240° C.) | 0.21 |
| Polyamide 4H | 19.8 | MXDA (0.994) | Adipic acid (1.0) | ○ (4 hours) | x | 14.4 (250° C.) | 0.09 |
| Polyamide 5H | 23.5 | MXDA (0.8) PXDA (0.2) | Adipic acid (1.0) | x | ○ | 35.7 (270° C.) | 0.13 |
| Polyamide 6H | 14.8 | MXDA (0.991) | Adipic acid (0.9) Isophthalic acid (0.1) | ○ (4 hours) | x | 15.4 (250° C.) | 0.08 |
| Polyamide 7H | 42.4 | MXDA (1.0) | Adipic acid (1.0) | ○ (4 hours) | x | 14.1 (250° C.) | 0.09 |
| Polyamide 8H | 31.4 | MXDA (0.994) | Adipic acid (1.0) | ○ (2 hours) | x | 31.2 (250° C.) | 0.09 |

MXDA: metaxylylenediamine,
PXDA: paraxylylenediamine
[1]Numerical value in parentheses shows a mole ratio of each component.
[2]○: the solid phase polymerization was carried out. The polymerization time is shown in parentheses. x: the solid phase polymerization was not carried out.
[3]○: the end amino group was masked. x: the end amino group was not masked.
[4]A non-stretched film was prepared from the polyamide alone, and an oxygen permeability coefficient thereof was measured at 23° C. and 60% RH.

TABLE 2H

|  | Composition Polyamide (end amino group concentration) | Melting kneading ratio[1] | Film roll appearance | Sealing strength after boiling (kg/15 mm) | Oxygen concentration | Color tone after 1 month | Flavor after 1 month |
|---|---|---|---|---|---|---|---|
| Example 1H | Polyamide 1H (17.5 μeq/g) | 40:50:10 | Good | 5.1 | 0.1% or less | Good | Good |
| Example 2H | Polyamide 1H (17.5 μeq/g) | 40:55:5 | Good | 4.8 | 0.1% or less | Good | Good |
| Example 3H | Polyamide 1H (17.5 μeq/g) | 40:45:15 | Good | 5.3 | 0.8% | Good | Good |
| Example 4H | Polyamide 1H (17.5 μeq/g) | 40:35:25 | Good | 5.4 | 1.4% | Almost good | Almost good |
| Example 5H | Polyamide 1H (17.5 μeq/g) | 55:35:10 | Slightly inferior | 4.7 | 0.7% | Good | Good |
| Example 6H | Polyamide 1H (17.5 μeq/g) | 25:70:5 | Good | 5.5 | 1.7% | Almost good | Almost good |
| Example 7H | Polyamide 2H (19.2 μeq/g) | 40:50:10 | Good | 5.2 | 0.1% or less | Good | Good |
| Example 8H | Polyamide 3H (19.5 μeq/g) | 40:50:10 | Good | 5.3 | 0.1% or less | Good | Good |
| Example 9H | Polyamide 4H (19.8 μeq/g) | 40:50:10 | Good | 5.0 | 0.9% | Good | Good |
| Example 10H | Polyamide 5H (23.5 μeq/g) | 40:50:10 | Slightly inferior | 4.7 | 1.0% | Almost good | Almost good |
| Example 11H | Polyamide 6H (14.8 μeq/g) | 40:50:10 | Good | 5.1 | 0.5% | Good | Good |
| Comparative Example 1H | Polyamide 1H (17.5 μeq/g) | 10:85:5 | Good | 5.2 | 8.0% | Discolored | Flavor reduced |
| Comparative Example 2H | Polyamide 1H (17.5 μeq/g) | 70:20:10 | Slightly inferior | 4.0 | 7.1% | Discolored | Flavor reduced |
| Comparative Example 3H | Polyamide 7H (42.4 μeq/g) | 40:50:10 | Good | 5.0 | 9.5% | Discolored | Flavor reduced |
| Comparative Example 4H | Polyamide 8H (31.4 μeq/g) | 40:50:10 | Inferior | 3.8 | 8.5% | Discolored | Flavor reduced |

[1](total weight of transition metal catalyst and polyamide resin):weight of polyolefin resin:weight of modified polyolefin resin As apparent from Examples 1H to 11H, the oxygen-absorbing multilayer films of the present invention were excellent in an oxygen-absorbing performance, a processability and a strength and can maintain a high sealing strength in processing them into bags and the like, and therefore they are suited to heating treatment applications such as boiling treatment and the like. They had an inside visibility and therefore made it possible to confirm a color tone of the content.

On the other hand, in Comparative Example 3H in Which a mole ratio of MXDA to adipic acid was increased and Comparative Example 4H in which the solid phase polymerization time was shortened as compared with Example 9H, the end amino group concentration exceeded 30 µeq/g, and the good oxygen-absorbing performance was not obtained. Further, an appearance of the film was deteriorated as well in Comparative Example 4H.

The present invention provides the oxygen-absorbing multilayer films which are excellent in an oxygen-absorbing performance at a low humidity and a high humidity and maintain a resin strength after stored and which are excellent in a processability and an interlayer strength an can be applied to various containers and uses by preparing the multilayer films having an oxygen-absorbing resin layer prepared by blending the specific polyamide resin and the transition metal catalyst with the polyolefin resin and the modified polyethylene resin in a specific proportion.

Example 12H

An oxygen-absorbing resin pellet B was obtained in the same manner as in Example 1H, except that an ethylene-propylene block copolymer (product name: "Novatec PP BC3HF" manufactured by Japan Polypropylene Corporation, MFR: 8.5 g/10 minutes at 230° C., MFR: 10.8 g/10 minutes at 240° C., hereinafter referred to as PP 1) was used in place of LLDP 1. A two kind, three layer film (thickness: intermediate PP 1 layer 20 µm/oxygen-absorbing resin layer 30 µm/sealant PP 1 layer 20 µm) in which the oxygen-absorbing resin pellet B obtained was used for an oxygen-absorbing resin layer and in which PP 1 was used for a sealant layer and an intermediate layer was subjected on an intermediate layer surface thereof to corona discharge treatment in a width of 800 mm at 30 m/minute to prepare a film roll thereof. Uneven thickness such as humps and the like was not observed on the film roll, and it had a good appearance and a HAZE of 85%. A urethane base adhesive for dry laminate (product name: "AD-817/CAT-RT86L-60" manufactured by Toyo-Morton, Ltd.) was used to laminate a nylon film A and a silica-deposited PET film (product name: "Tech Barrier T" manufactured by Mitsubishi Plastics, Inc.) on a corona discharge-treated surface side to obtain an oxygen-absorbing multilayer film comprising an oxygen-absorbing multilayer film of a silica-deposited PET film (12)/adhesive (3)/nylon film A (15)/adhesive (3)/PP 1 (20)/oxygen-absorbing resin (30)/PP 1 (20). Then, the film was processed into a self-supported bag (13 cm×19 cm×3 cm) comprising two side face films and one bottom face film with a sealant layer side turned to an inner face to find that a processability of the bag was good. The 100 bags charged with curry containing carrot, potato and meat and tightly sealed were subjected to retort treatment at 121° C. for 30 minutes to measure a sealing strength thereof after the retort treatment. Then, they were stored at 23° C. to inspect a flavor of the curry after one month. The results thereof are shown in Table 3H.

Example 13H

An oxygen-absorbing multilayer film was obtained in the same manner as in Example 12H, except that a weight ratio in melting and kneading was changed to the cobalt stearate-containing polyamide 1H:PP 1:MAPE=40:40:20. Then, a self-supported bag was prepared to carry out the same storing test as in Example 12H. The results thereof are shown in Table 3H.

TABLE 3H

| | Composition | | | | |
|---|---|---|---|---|---|
| | Polyamide (end amino group concentration) | Modified polyolefin resin | Melting kneading ratio[1] | Sealing strength after retort | Flavor after 1 month |
| Example 12H | Polyamide 1H (17.5 µeq/g) | MAPE | 40:50:10 | 4.8 kg/ 15 mm | Good |
| Example 13H | Polyamide 1H (17.5 µeq/g) | MAPE | 40:40:20 | 5.1 kg/ 15 mm | Good |

MAPE: maleic anhydride-modified polyethylene
MAPP: maleic anhydride polypropylene
[1](total weight of transition metal catalyst and polyamide resin):weight of polyolefin resin: weight of modified polyolefin resin The present invention provides the oxygen-absorbing multilayer films which maintain a resin strength and are excellent in an interlayer strength by preparing the multilayer films having an oxygen-absorbing resin layer prepared by blending the specific polyamide resin and the transition metal catalyst with the polyolefin resin and the modified polyethylene resin in a specific proportion.

Example 1J

Metaxylylenediamine:sebacic acid:adipic acid were used in a mole ratio of 0.993:0.4:0.6 and subjected to melt polymerization and solid phase polymerization on the synthetic conditions described above to synthesize a polyamide resin (hereinafter, the above polyamide resin is referred to as the polyamide 1J). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1J had Tg of 73° C., a melting point of 184° C., a semi-crystallization time of 2000 seconds or longer, an end amino group concentration of 18.8 µeq/g, an end carboxyl group concentration of 85.6 µeq/g, a number average molecular weight of 23000 and MFR of 11.4 g/10 minutes at 240° C. Further, a non-stretched film was prepared from the resulting polyamide 1J alone, and an oxygen permeability coefficient thereof was determined to find that it was 0.34 cc·mm/ (m$^2$·day·atm) (23° C., 60% RH).

Cobalt stearate was added as a transition metal catalyst to the molten polyamide 1J through a side feed by means of a biaxial extruding equipment so that a cobalt concentration was 400 ppm. Further, the resulting mixture (hereinafter referred to as the cobalt stearate-containing polyamide 1J) of the polyamide and cobalt stearate was molten and kneaded at 240° C. with linear low density polyethylene (product name: "Harmolex NC564A" manufactured by Japan Polyethylene Corporation, MFR: 3.5 g/10 minutes (measured according to JIS K7210), MFR: 7.5 g/10 minutes at 240° C., MFR: 8.7 g/10 minutes at 250° C., hereinafter referred to as LLDPE) as a polyolefin resin in a weight ratio of the cobalt stearate-containing polyamide 1J:LLDPE=35:65 to obtain a pellet comprising an oxygen-absorbing resin composition.

A two kind, three layer film (thickness: 10 µm/20 µm/10 µm) in which the oxygen-absorbing resin composition obtained was used for an oxygen-absorbing resin layer and in which LLDPE was used for a sealant layer and an intermediate layer was prepared by subjecting an intermediate layer surface thereof to corona discharge treatment in a width of 800 mm at 100 m/minute. The film thus obtained had a good appearance and a HAZE of 20%. A urethane base adhesive for dry laminate (product name: "AD-817/CAT-RT86L-60"

manufactured by Toyo-Morton, Ltd.) was used on a corona discharge-treated surface side to obtain an oxygen-absorbing multilayer film comprising an oxygen-absorbing multilayer film of an aluminum-deposited PET film (product name: "GL-ARH"-F manufactured by Toppan Printing Co., Ltd.)/adhesive (3)/nylon (product name: "N1202" manufactured by Toyobo Co., Ltd., 15)/adhesive (3)/LLDPE (10)/oxygen-absorbing resin composition (20)/LLDPE (10). The above oxygen-absorbing multilayer film was used to prepare a three side-sealed bag of 10×15 cm, and the bag was charged with 100 g of a powder seasoning "Ajinomoto" having a water activity of 0.35 and tightly sealed. Then, it was stored at 23° C. An oxygen concentration in the bag and a flavor of the powder seasoning in the seventh day and after stored for one month were inspected. The results thereof are shown in Table 2J.

Example 2J

An oxygen-absorbing multilayer film was obtained in the same manner as in Example 1J, except that a weight ratio in melting and kneading was changed to the cobalt stearate-containing polyamide 1J:LLDPE=55:45. Then, a three side-sealed bag was prepared to carry out the same storing test as in Example 1J. The results thereof are shown in Table 2J.

Example 3J

An oxygen-absorbing multilayer film was obtained in the same manner as in Example 1J, except that a weight ratio in melting and kneading was changed to the cobalt stearate-containing polyamide 1J:LLDPE=25:75. Then, a three side-sealed bag was prepared to carry out the same storing test as in Example 1G. The results thereof are shown in Table 2G.

Example 4J

Metaxylylenediamine:sebacic acid:adipic acid were used in a mole ratio of 0.992:0.3:0.7 and subjected to melt polymerization and solid phase polymerization on the synthetic conditions described above to synthesize a polyamide resin (hereinafter, the above polyamide resin is referred to as the polyamide 2J). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 2J had Tg of 78° C., a melting point of 194° C., a semi-crystallization time of 2000 seconds or longer, an end amino group concentration of 19.5 µeq/g, an end carboxyl group concentration of 81.2 µeq/g, a number average molecular weight of 24500 and MFR of 10.5 g/10 minutes at 240° C. Further, a non-stretched film was prepared from the resulting polyamide 2J alone, and an oxygen permeability coefficient thereof was determined to find that it was 0.21 cc·mm/(m$^2$·day·atm) (23° C., 60% RH).

Then, cobalt stearate was added to the polyamide 2J, and the mixture was molten and kneaded with LLDPE in the same manners as in Example 1J to obtain an oxygen-absorbing resin pellet. Further, an oxygen-absorbing multilayer film was obtained in the same manner as in Example 1J, and then a three side-sealed bag was prepared to carry out the same storing test as in Example 1J. The results thereof are shown in Table 2J.

Example 5J

Metaxylylenediamine:sebacic acid:adipic acid were used in a mole ratio of 0.992:0.7:0.3 and subjected to melt polymerization and solid phase polymerization on the synthetic conditions described above to synthesize a polyamide resin (hereinafter, the above polyamide resin is referred to as the polyamide 3J). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 3J had Tg of 65° C., a melting point of 170° C., a semi-crystallization time of 2000 seconds or longer, an end amino group concentration of 19.2 µeq/g, an end carboxyl group concentration of 80.0 µeq/g, a number average molecular weight of 25200 and MFR of 10.1 g/10 minutes at 240° C. Further, a non-stretched film was prepared from the resulting polyamide 3J alone, and an oxygen permeability coefficient thereof was determined to find that it was 0.84 cc·mm/(m$^2$·day·atm) (23° C., 60% RH).

Then, cobalt stearate was added to the polyamide 3J, and the mixture was molten and kneaded with LLDPE in the same manners as in Example 1J to obtain an oxygen-absorbing resin pellet. Further, an oxygen-absorbing multilayer film was obtained in the same manner as in Example 1J, and then a three side-sealed bag was prepared to carry out the same storing test as in Example 1J. The results thereof are shown in Table 2J.

Example 6J

Metaxylylenediamine:adipic acid:isophtalic acid were used in a mole ratio of 0.991:0.9:0.1 and subjected to melt polymerization and solid phase polymerization on the synthetic conditions described above to synthesize a polyamide resin (hereinafter, the above polyamide resin is referred to as the polyamide 4J). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 4J had Tg of 94° C., a melting point of 228° C., a semi-crystallization time of 300 seconds, an end amino group concentration of 14.8 µeq/g, an end carboxyl group concentration of 67.2 µeq/g and a number average molecular weight of 23000. MFR could not be measured at 240° C. since it was close to the melting point, and MFR at 250° C. was measured to find that MFR at 250° C. was 15.4 g/10 minutes. A non-stretched film was prepared from the resulting polyamide 4J alone, and an oxygen permeability coefficient thereof was determined to find that it was 0.08 cc·mm/(m$^2$·day·atm) (23° C., 60% RH).

Then, cobalt stearate was added to the polyamide 4J, and the mixture was molten and kneaded with LLDPE in the same manners as in Example 1J to obtain an oxygen-absorbing resin pellet, except that the temperature in melting and kneading was changed to 250° C. Further, an oxygen-absorbing multilayer film was obtained in the same manner as in Example 1J, and then a three side-sealed bag was prepared to carry out the same storing test as in Example 1J. The results thereof are shown in Table 2J.

Example 7J

Metaxylylenediamine:sebacic acid:adipic acid were used in a mole ratio of 0.998:0.4:0.6 and subjected to melt polymerization and solid phase polymerization on the synthetic conditions described above to synthesize a polyamide resin, and then an end amino group concentration thereof was measured (the end amino group concentration was 33.6 µeq/g).

Next, phthalic anhydride was added thereto as an end masking agent in an amount of 1.5 equivalent based on the above end amino group concentration. Then, the mixture was molten and kneaded at 200° C. by means of a biaxial extruding equipment, and the end amino group was masked to synthesize a polyamide resin (hereinafter, the above polyamide resin is referred to as the polyamide 5J). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 5J had Tg of 73° C., a melting point of 184° C., a semi-crystallization time of 2000 seconds or longer, an end amino group concentration of 15.8 μeq/g, an end carboxyl group concentration of 63.0 μeq/g, a number average molecular weight of 23200 and MFR of 13.0 g/10 minutes at 240° C. Further, a non-stretched film was prepared from the resulting polyamide 5J alone, and an oxygen permeability coefficient thereof was determined to find that it was 0.74 cc·mm/(m$^2$·day·atm) (23° C., 60% RH).

Then, cobalt stearate was added to the polyamide 5J, and the mixture was molten and kneaded with LLDPE in the same manners as in Example 1J to obtain an oxygen-absorbing resin pellet. Further, an oxygen-absorbing multilayer film was obtained in the same manner as in Example 1J, and then a three side-sealed bag was prepared to carry out the same storing test as in Example 1J. The results thereof are shown in Table 2J.

Example 8J

Metaxylylenediamine and paraxylylenediamine were mixed in 7:3, and the above diamines and adipic acid were used in a mole proportion of 1:1 and subjected only to melt polymerization on the synthetic conditions described above to synthesize a polyamide resin, and then an end amino group concentration thereof was measured (the end amino group concentration was 35.7 μeq/g). Next, phthalic anhydride was added thereto as an end masking agent in an amount of 1.5 equivalent based on the above end amino group concentration. Then, the mixture was molten and kneaded at 200° C. by means of a biaxial extruding equipment, and the end amino group was masked to synthesize a polyamide resin (hereinafter, the above polyamide resin is referred to as the polyamide 6J). Controlled were the dropwise adding time to 2 hours, the polymerization temperature after finishing dropwise adding metaxylylenediamine in the melt polymerization to 277° C. and the reaction time to 30 minutes. The above polyamide 6J had Tg of 87° C., a melting point of 259° C., a semi-crystallization time of 18 seconds, an end amino group concentration of 25.8 μeq/g, an end carboxyl group concentration of 75.6 μeq/g and a number average molecular weight of 18500. MFR could not be measured at 250° C. since it was close to the melting point, and MFR at 270° C. was measured to find that MFR at 270° C. was 29.8 g/10 minutes. A non-stretched film was prepared from the resulting polyamide 6J alone, and an oxygen permeability coefficient thereof was determined to find that it was 0.13 cc·mm/(m$^2$·day·atm) (23° C., 60% RH).

Then, cobalt stearate was added to the polyamide 6J, and the mixture was molten and kneaded with LLDPE in the same manner as in Example 1J to obtain an oxygen-absorbing resin pellet, except that the temperature in melting and kneading was changed to 270° C. Further, an oxygen-absorbing multilayer film was obtained in the same manner as in Example 1J, and then a three side-sealed bag was prepared to carry out the same storing test as in Example 1J. The results thereof are shown in Table 2J.

Comparative Example 1J

An oxygen-absorbing multilayer film was produced in the same manner as in Example 1J, except that a weight ratio in melting and kneading was changed to the cobalt stearate-containing polyamide 1J:LLDPE=80:20. Then, a three side-sealed bag was prepared to carry out the same storing test as in Example 1J. The results thereof are shown in Table 2J.

Comparative Example 2J

An oxygen-absorbing multilayer film was produced in the same manner as in Example 1J, except that the mixture was not molten and not kneaded with LLDPE and that the film was prepared only from the cobalt stearate-containing polyamide 1J. Then, a three side-sealed bag was prepared to carry out the same storing test as in Example 1J. The results thereof are shown in Table 2J.

Comparative Example 3J

A polyamide resin (hereinafter, the above polyamide resin is referred to as the polyamide 7J) was synthesized in the same manner as in Example 4J, except that metaxylylenediamine:sebacic acid:adipic acid were used in a mole ratio of 0.998:0.4:0.6 and not subjected to solid phase polymerization. The above polyamide 7J had Tg of 73° C., a melting point of 184° C., a semi-crystallization time of 2000 seconds or longer, an end amino group concentration of 39.1 μeq/g, an end carboxyl group concentration of 70.2 μeq/g and a number average molecular weight of 17800. MFR at 240° C. was 51.0 g/10 minutes. Further, a non-stretched film was prepared from the resulting polyamide 7J alone, and an oxygen permeability coefficient thereof was determined to find that it was 0.34 cc·mm/(m$^2$·day·atm) (23° C., 60% RH).

Then, cobalt stearate was added to the polyamide 7J, and the mixture was molten and kneaded with LLDPE in the same manners as in Example 1J to obtain an oxygen-absorbing resin pellet. Further, an oxygen-absorbing multilayer film was obtained in the same manner as in Example 1J, and then a three side-sealed bag was prepared to carry out the same storing test as in Example 1J. The results thereof are shown in Table 2J.

Comparative Example 4J

A polyamide resin (hereinafter, the above polyamide resin is referred to as the polyamide 8J) was synthesized in the same manner as in Example 4J, except that metaxylylenediamine and adipic acid were used in a mole ratio of 0.999:1 and that a polymerization time in the solid phase polymerization was changed to 2 hours. The above polyamide 8J had Tg of 78° C., a melting point of 237° C., a semi-crystallization time of 25 seconds, an end amino group concentration of 34.8 μeq/g, an end carboxyl group concentration of 58.6 μeq/g and a number average molecular weight of 21800. MFR could not be measured at 240° C. since it was close to the melting point, and MFR at 260° C. was measured to find that MFR at 260° C. was 18.9 g/10 minutes. A non-stretched film was prepared from the resulting polyamide 8J alone, and an oxygen permeability coefficient thereof was determined to find that it was 0.09 cc·mm/(m$^2$·day·atm) (23° C., 60% RH).

Then, cobalt stearate was added to the polyamide 8J, and the mixture was molten and kneaded with LLDPE in the same manners as in Example 1J to obtain an oxygen-absorbing resin pellet, except that the temperature in melting and kneading was changed to 260° C. Further, an oxygen-absorbing multilayer film was obtained in the same manner as in Example 1J, and then a three side-sealed bag was prepared to carry out the same storing test as in Example 1J. The results thereof are shown in Table 2J.

The respective details of the polyamides 1J to 8J obtained above are shown in Table 1J, and the results of the respective examples and comparative examples are shown in Table 2J.

TABLE 1J

| | End amino group concentration (μeq/g) | Diamine[1] | Dicarboxylic acid[1] | Solid phase polymerization[2] | End masking[3] | MFR (g/10 minutes) | Oxygen permeability coefficient (cc · mm/(m² · day · atm)) |
|---|---|---|---|---|---|---|---|
| Polyamide 1J | 18.8 | MXDA (0.993) | Sebacic acid (0.4) Adipic acid (0.6) | ○ (4 hours) | x | 11.4 (240° C.) | 0.34 |
| Polyamide 2J | 19.5 | MXDA (0.992) | Sebacic acid (0.3) Adipic acid (0.7) | ○ (4 hours) | x | 10.5 (240° C.) | 0.21 |
| Polyamide 3J | 19.2 | MXDA (0.992) | Sebacic acid (0.7) Adipic acid (0.3) | ○ (4 hours) | x | 10.1 (240° C.) | 0.84 |
| Polyamide 4J | 14.8 | MXDA (0.991) | Adipic acid (0.9) Isophthalic acid (0.1) | ○ (4 hours) | x | 15.4 (250° C.) | 0.08 |
| Polyamide 5J | 15.8 | MXDA (0.998) | Sebacic acid (0.4) Adipic acid (0.6) | ○ (4 hours) | ○ | 13.0 (240° C.) | 0.74 |
| Polyamide 6J | 25.8 | MXDA (0.7) PXDA (0.3) | Adipic acid (1.0) | x | ○ | 29.8 (270° C.) | 0.13 |
| Polyamide 7J | 39.1 | MXDA (0.998) | Sebacic acid (0.4) Adipic acid (0.6) | x | x | 51.0 (240° C.) | 0.34 |
| Polyamide 8J | 34.8 | MXDA (0.999) | Adipic acid (1.0) | ○ (2 hours) | x | 18.9 (260° C.) | 0.09 |

MXDA: metaxylylenediamine,
PXDA: paraxylylenediamine
[1]Numerical value in parentheses shows a mole ratio of each component.
[2]○: the solid phase polymerization was carried out. The polymerization time is shown in parentheses. x: the solid phase polymerization was not carried out.
[3]○: the end amino group was masked. x: the end amino group was not masked.
[4]A non-stretched film was prepared from the polyamide alone, and an oxygen permeability coefficient thereof was measured at 23° C. and 60% RH.

TABLE 2J

| | Composition | | | Film | | | |
|---|---|---|---|---|---|---|---|
| | Polyamide (end amino group concentration) | Melting kneading ratio[1] | Appearance of roll | Oxygen concentration 7th day | After 1 month | Flavor after 1 month | |
| Example 1J | Polyamide 1J (18.8 μeq/g) | 35:65 | Good | 0.8% | 0.1% or less | Good | |
| Example 2J | Polyamide 1J (18.8 μeq/g) | 55:45 | Good | 3.8% | 0.3% | Almost good | |
| Example 3J | Polyamide 1J (18.8 μeq/g) | 25:75 | Good | 1.2% | 0.1% or less | Good | |
| Example 4J | Polyamide 2J (19.5 μeq/g) | 35:65 | Good | 0.9% | 0.1% or less | Good | |
| Example 5J | Polyamide 3J (19.2 μeq/g) | 35:65 | Good | 0.9% | 0.1% or less | Good | |
| Example 6J | Polyamide 4J (14.8 μeq/g) | 35:65 | Good | 4.2% | 0.7% | Almost good | |
| Example 7J | Polyamide 5J (15.8 μeq/g) | 35:65 | Good | 0.2% | 0.1% or less | Good | |
| Example 8J | Polyamide 6J (25.8 μeq/g) | 35:65 | Slightly inferior | 5.8% | 1.3% | Almost good | |
| Comparative Example 1J | Polyamide 1J (18.8 μeq/g) | 80:20 | Slightly inferior | 9.0% | 4.0% | lowered | |
| Comparative Example 2J | Polyamide 1J (18.8 μeq/g) | 100:0 | Good | 9.1% | 4.3% | lowered | |
| Comparative Example 3J | Polyamide 7J (39.1 μeq/g) | 35:65 | Slightly inferior | 9.7% | 3.2% | lowered | |
| Comparative Example 4J | Polyamide 8J (34.8 μeq/g) | 35:65 | Slightly inferior | 8.3% | 4.1% | lowered | |

[1](total weight of transition metal catalyst and polyamide resin): weight of polyolefin resin

Example 9J

The oxygen-absorbing multilayer film obtained in Example 1J was used, and this film was processed into a self-supported bag (130×175×35 mm) comprising two side face films and one bottom face film with an intermediate layer side turned to an inner face to find that a processability of the bag was good. The bag was charged with radishes together with a solution containing acetic acid in a total amount of 200 g by high speed automatic charging at a rate of 40 bags/minute to find that an opening property of the bag was good and that heat sealing thereof could be carried out without having any problems. The 100 bags which were charged and tightly sealed were subjected to boiling treatment at 90° C. for 30 minutes and then stored at 23° C. to inspect a flavor of the radishes, a concentration of oxygen in the bags and an appearance of the self-supported bags after one month. The radishes could be visually confirmed from an outside of the bags, and a flavor and a color tone of the radishes were maintained well. An appearance of the bags was not abnormal, and a concentration of oxygen in the bags was 0.1% or less.

Example 10J

A two kind, three layer film (thickness: 10 µm/20 µm/40 µm) in which the oxygen-absorbing resin composition obtained in Example 1J was used for an oxygen-absorbing layer and in which LLDPE was used for a sealant layer and an intermediate layer was prepared by subjecting an intermediate layer surface thereof to corona discharge treatment in a width of 800 mm at 80 m/minute. The film thus obtained was reduced slightly in an appearance as compared with the two kind, three layer film 1, and a HAZE thereof was 30%. A urethane base adhesive for dry laminate (product name: "AD-817/CAT-RT86L-60" manufactured by Toyo-Morton, Ltd.) was used on a corona discharge-treated surface side to obtain an oxygen-absorbing multilayer film comprising an oxygen-absorbing multilayer film of an aluminum-deposited PET film (product name: "GL-ARH"-F manufactured by Toppan Printing Co., Ltd.)/adhesive (3)/nylon (product name: "N1202" manufactured by Toyobo Co., Ltd., 15)/adhesive (3)/LLDPE (40)/oxygen-absorbing resin composition (20)/LLDPE (10). Numbers in parentheses mean a thickness (unit: µm) of the respective layers. Then, the bag was charged with radishes together with a solution containing acetic acid in a total amount of 200 g in the same manner as in Example 9J to find that heat sealing thereof could be carried out without having any problems. The bag which was charged was subjected as it was to boiling treatment at 90° C. for 30 minutes and then stored at 23° C. to inspect a flavor of the radishes, a concentration of oxygen in the bag and an appearance of the self-supported bag after one month. A flavor and a color tone of the radishes were maintained well, and a concentration of oxygen in the bag was 0.1% or less, but the bag was reduced slightly in an appearance.

Example 11J

A two kind, three layer film 1 was prepared in the same manner as in Example 1J, and this was used to obtain an oxygen-absorbing multilayer paper base material of bleached craft paper (basis weight: 340 g/m$^2$)/urethane base adhesive for dry laminate (product name: "AD817/CAT-RT86L-60" manufactured by Toyo-Morton, Ltd., 3)/aluminum-deposited PET film (product name: "GL-ARH-F" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/oxygen-absorbing resin composition (20)/LLDPE (10) by extrusion lamination using low density polyethylene (product name: "Milason 18SP" manufactured by Mitsui Chemicals, Inc.). The above base material was molded into a paper container of a gable top type for 1 liter. A moldability of the container was good. The above paper container was charged with distilled barley spirit and tightly sealed, and then it was stored at 23° C. An oxygen concentration in the paper container was 0.1% or less after one month, and a flavor of the distilled barley spirit was maintained well.

Example 12J

An oxygen-absorbing resin pellet was obtained in the same manner as in Example 1J, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDP. Then, a two kind, three layer film (thickness: 15 µm/30 µm/15 µm) was prepared in the same manner as in Example 1J, except that the above oxygen-absorbing resin pellet was used for a core layer and that PP was used for a sealant layer and an intermediate layer in place of LLDPE. A HAZE of the film thus obtained was 66%. The urethane base adhesive for dry laminate (product name: "AD817/CAT-RT86L-60" manufactured by Toyo-Morton, Ltd.) was used for a corona discharge-treated surface to obtain an oxygen-absorbing multilayer film of aluminum-deposited PET (product name: "GL-ARH-F" manufactured by Toppan Printing Co., Ltd., 12)/adhesive (3)/nylon (product name: "N1202" manufactured by Toyobo Co., Ltd., 15)/adhesive (3)/PP (15)/oxygen-absorbing resin composition (30)/PP (15). The above oxygen-absorbing multilayer film was used to prepare a three side-sealed bag of 10×20 cm. A circular vapor-passing port having a diameter of 2 mm was provided on a part thereof, and a circumference of the vapor-passing port was tentatively adhered by a label seal. The bag was charged with beef stew containing carrot and meat and tightly sealed, and then it was stored at 23° C. after subjected to retort cooking and thermal sterilization at 124° C. for 30 minutes. The beef stew in an inside of the bag could be visually confirmed. After one month, the bag was heated as it was for about 4 minutes in an electric oven, and the bag was swollen after about 3 minutes to confirm that the tentatively adhered label seal was peeled off and that vapor was discharged from the vapor-passing port. After finishing cooking, a flavor of the beef stew and a color tone of the carrot were inspected to find that an appearance of the carrot was maintained well and that a flavor of the beef stew was good.

Comparative Example 5J

Iron powder having an average particle diameter of 20 µm was mixed with calcium chloride in a proportion of 100:1, and the mixture was kneaded with LLDPE in a weight ratio of 30:70 to obtain an iron powder base oxygen-absorbing resin composition AJ. A two kind, three layer film was tried to be prepared in the same manner as in Example 1J by using the iron powder base oxygen-absorbing resin composition AJ for a core layer, but irregularities of the iron powder were generated on a film surface, and the film was not obtained. Accordingly, the iron powder base oxygen-absorbing resin composition AJ was extruded and laminated as an oxygen-absorbing layer in a thickness of 20 µm on LLDPE having a thickness of 40 µm to obtain a laminated film which was subjected on an oxygen-absorbing layer surface to corona discharge treatment. The above laminated film was laminated on a bleached craft paper in the same manner as in Example 11J to try to prepare a paper container of a gable top type comprising an oxygen-absorbing multilayer paper base material of bleached craft paper (basis weight: 340 g/m$^2$)/urethane base adhesive for dry laminate (product name: "AD817/CAT-RT86L-60" manufactured by Toyo-Morton, Ltd., 3)/aluminum-deposited PET film (product name: "GL-ARH-F" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AJ (20)/LLDPE (40), but the thickness was large, and it was difficult to prepare a corner of the paper container. A preparing speed of the containers was reduced to cut off the rejected products, and the containers were obtained at last. A storing test of distilled barley spirit was carried out in the same manner as in Example 11J, but aldehyde odor was generated in opening the container, and a flavor thereof was notably reduced.

Comparative Example 6J

An iron powder base oxygen-absorbing resin composition BJ was obtained in the same manner as in Comparative Example 6J, except that PP was used in place of LLDPE. Further, a laminated film of the iron powder base oxygen-absorbing resin composition BJ (20)/PP (40) was prepared in the same manner as in Comparative Example 5J, except that PP was used in place of LLDPE, and then the oxygen-absorbing layer surface was subjected to corona discharge treatment. Then, an oxygen-absorbing multilayer film of aluminum-deposited PET (product name: "GL-ARH-F" manufactured by Toppan Printing Co., Ltd., 12)/adhesive (3)/nylon (product name: "N1202" manufactured by Toyobo Co., Ltd., 15)/adhesive (3)/iron powder base oxygen-absorbing resin composition BJ (20)/PP (40) was obtained in the same manner as in Example 12J. The oxygen-absorbing multilayer film thus obtained was used to carry out the same test as in Example 12J to result in finding that a flavor of the beef stew was maintained well but the content could not be visually confirmed and that air bubble-like unevenness was generated on the surface in heating in an electric oven.

As apparent from Examples 1J to 10J, the oxygen-absorbing resin multilayer films of the present invention were excellent in an oxygen-absorbing performance, a processability and a strength and had an inside visibility.

In contrast with this, the oxygen-absorbing performance was unsatisfactory in Comparative Examples 1J and 2J in which a content of the polyamide A in the resin composition exceeded 60% by weight. In particular, as apparent from comparison of Comparative Examples 1J and 2J with Examples 1J to 3J, the good oxygen-absorbing performances were not necessarily obtained when a content of the polyamide A in the resin composition was large.

On the other hand, in Comparative Example 4J in which the solid phase polymerization was not carried out and Comparative Example 4J in which the solid phase polymerization time was shortened, an end amino group concentration of the polyamide resin obtained exceeded 30 µeq/g, and the good oxygen-absorbing performance was not obtained in comparison with Example 1J. Further, an appearance of the film roll was deteriorated as well.

As apparent from Examples 1J to 12J, the oxygen-absorbing resin compositions of the present invention were excellent in a processability into the paper containers and provided storing containers which were favorable in storing alcoholic beverages and heating and cooking by an electric oven even if a vapor-passing port was mounted. Further, they had an inside visibility, and a color tone of the content could be confirmed.

The present invention relates to the oxygen-absorbing multilayer films which maintain a resin strength and which are excellent in an interlayer strength by providing an intermediate layer comprising a polyolefin resin between both layers of a multilayer film having an oxygen-absorbing resin layer prepared by blending the specific polyamide resin and the transition metal catalyst with a polyolefin resin in a specific proportion and a gas-barriering layer.

Production of Epoxy Resin Curing Agent a:

A reaction container was charged with 1 mole of metaxylylenediamine. The reaction container was heated up to 60° C. under nitrogen flow, and 0.93 mole of methyl acrylate was dropwise added thereto in one hour. After finishing dropwise adding, the mixture was stirred at 120° C. for one hour, and the reaction container was further heated up to 160° C. in 3 hours while removing formed methanol by distillation. The mixture was cooled down to 100° C., and a prescribed amount of methanol was added thereto so that a solid matter concentration was controlled to 70% by weight to obtain an epoxy resin curing agent a. A content of an amide group in the epoxy resin curing agent a was 21% by weight.

Example 1K

Metaxylylenediamine:sebacic acid:adipic acid were used in a mole ratio of 0.992:0.4:0.6 and subjected to melt polymerization and solid phase polymerization on the synthetic conditions described above to synthesize a polyamide resin (hereinafter, the above polyamide resin is referred to as the polyamide 1K). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1K had Tg of 73° C., a melting point of 184° C., a semi-crystallization time of 2000 seconds or longer, an end amino group concentration of 17.5 µeq/g, an end carboxyl group concentration of 91.6 µeq/g, a number average molecular weight of 23500 and MFR of 11.0 g/10 minutes at 240° C. Further, a non-stretched film was prepared from the resulting polyamide 1K alone, and an oxygen permeability coefficient thereof was determined to find that it was 0.34 cc·mm/(m$^2$·day·atm) (23° C., 60% RH).

Cobalt stearate was added as a transition metal catalyst to the molten polyamide 1K through a side feed by means of a biaxial extruding equipment so that a cobalt concentration was 400 ppm. Further, the resulting mixture (hereinafter referred to as the cobalt stearate-containing polyamide 1K) of the polyamide and cobalt stearate was molten and kneaded at 240° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) as a polyolefin resin in a weight ratio of the cobalt stearate-containing polyamide 1K:LLDPE=35:65 to obtain an oxygen-absorbing resin composition. Then, the above oxygen-absorbing resin composition was used to prepare a two kind, three layer film 1 (thickness: 10 µm/20 µm/10 µm) in which LLDPE was used for a skin layer by subjecting one surface thereof to corona discharge treatment in a width of 800 mm at 120 m/minute. An appearance of the film thus obtained was good, and HAZE thereof was 14%.

A methanol/ethyl acetate=9/1 solution (solid matter concentration: 35% by weight) containing 57 parts by weight of an epoxy resin (TETRAD-X, manufactured by Mitsubishi Gas Chemicals, Inc.) having a glycidylamine part derived from metaxylylenediamine and 182 parts by weight of an epoxy resin curing agent a was prepared, and 0.4 part by weight of an acryl base wetting agent (BYK381, manufactured by BYK Chemie A.G.) and 0.1 part by weight of a silicone base defoaming agent (BYK065, manufactured by BYK Chemie A.G.) were added thereto and stirred well to obtain a coating liquid (epoxy resin composition) in which an equivalent ratio (active hydrogen/epoxy group) of active hydrogen in the epoxy resin curing agent to an epoxy group in the epoxy resin was 1.2. A stretched nylon film (N-1201, manufactured by Toyobo Co., Ltd.) having a thickness of 15 µm was used for an outer layer, and the coating liquid was coated on a corona-treated surface of the outer layer and dried at 90° C. for 5 seconds. Then, the film 1 was laminated thereon to obtain an oxygen-absorbing multilayer film 1 comprising LLDPE/oxygen-absorbing layer/LLDPE/epoxy resin-cured matter layer/outer layer. A content of the skeletal structure represented by Formula (1) in the epoxy resin-cured matter layer was 62.0% by weight.

A three side-sealed bag of 13×18 cm was prepared from the oxygen-absorbing multilayer film 1 obtained, and it was charged with 60 g of pineapple and 120 g of a syrup liquid and tightly sealed so that a head space air amount was 20 cc. It was subjected to heating sterilization treatment at 85° C. for 90 minutes to measure a head space oxygen concentration immediately after the heating treatment. Then, a color tone of the pineapple and a sealing strength of one side of the three side-sealed bag in storing at 40° C. for 2 months were measured. The results thereof are shown in Table 2K.

Example 2K

An oxygen-absorbing multilayer film was produced in the same manner as in Example 1K, except that a weight ratio in melting and kneading was changed to the cobalt stearate-containing polyamide 1K:LLDPE=55:45, and the bag was charged with pineapple and subjected to heating treatment to measure an oxygen concentration immediately after the heating treatment and a flavor thereof and a sealing strength of the bag after one month. The results thereof are shown in Table 2K.

Example 3K

An oxygen-absorbing multilayer film was produced in the same manner as in Example 1K, except that a weight ratio in melting and kneading was changed to the cobalt stearate-containing polyamide 1K:LLDPE=25:75, and the bag was charged with pineapple and subjected to heating treatment to measure an oxygen concentration immediately after the heating treatment and a flavor thereof and a sealing strength of the bag after one month. The results thereof are shown in Table 2K.

Example 4K

Metaxylylenediamine:adipic acid were used in a mole ratio of 0.991:1 and subjected to melt polymerization and solid phase polymerization on the synthetic conditions described above to synthesize a polyamide resin (hereinafter, the above polyamide resin is referred to as the polyamide 2K). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 2K had Tg of 84° C., a melting point of 237° C., a semi-crystallization time of 25 seconds, an end amino group concentration of 19.8 µeq/g, an end carboxyl group concentration of 68.6 µeq/g and a number average molecular weight of 23000. MFR could not be measured at 240° C. since it was close to the melting point, and MFR at 250° C. was measured to find that MFR at 250° C. was 14.4 g/10 minutes. A non-stretched film was prepared from the resulting polyamide 2K alone, and an oxygen permeability coefficient thereof was determined to find that it was 0.09 cc·mm/(m$^2$·day·atm) (23° C., 60% RH).

Then, cobalt stearate was added to the polyamide 2K, and the mixture was molten and kneaded with LLDPE in the same manners as in Example 1K to produce an oxygen-absorbing multilayer film, except that the temperature in melting and kneading was changed to 250° C., and the bag was charged with pineapple and subjected to heating treatment to measure an oxygen concentration immediately after the heating treatment and a flavor thereof and a sealing strength of the bag after one month. The results thereof are shown in Table 2K.

Example 5K

Metaxylylenediamine and paraxylylenediamine were mixed in 7:3, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 285° C. by means of a biaxial extruding equipment to mask an end amino group (hereinafter, the above polyamide resin is referred to as the polyamide 3K). Controlled were the dropwise adding time to 2 hours, the polymerization temperature after finishing dropwise adding metaxylylenediamine in the melt polymerization to 277° C. and the reaction time to 30 minutes. The above polyamide 3K had Tg of 87° C., a melting point of 255° C., a semi-crystallization time of 18 seconds, an end amino group concentration of 25.8 µeq/g, an end carboxyl group concentration of 65.6 µeq/g and a number average molecular weight of 18500. MFR could not be measured at 250° C. since it was close to the melting point, and MFR at 260° C. was measured to find that MFR at 260° C. was 29.8 g/10 minutes. A non-stretched film was prepared from the resulting polyamide 3K alone, and an oxygen permeability coefficient thereof was determined to find that it was 0.13 cc·mm/(m$^2$·day·atm) (23° C., 60% RH).

Then, cobalt stearate was added to the polyamide 3K, and the mixture was molten and kneaded with LLDPE in the same manners as in Example 1K to produce an oxygen-absorbing multilayer film, except that the temperature in melting and kneading was changed to 265° C., and the bag was charged with pineapple and subjected to heating treatment to measure an oxygen concentration immediately after the heating treatment and a flavor thereof and a sealing strength of the bag after one month. The results thereof are shown in Table 2K.

Example 6K

Metaxylylenediamine, adipic acid and isophthalic acid were used in a mole ratio of 0.991:0.8:0.2 and subjected to melt polymerization and solid phase polymerization on the synthetic conditions described above to synthesize a polyamide resin (hereinafter, the above polyamide resin is referred to as the polyamide 4K). Controlled were the dropwise adding time to 2 hours, the reaction time in the melt polymerization to 1 hour, the pressure in an inside of the equipment in the solid phase polymerization to 1 torr or less, the polymerization temperature to 215° C. and the polymerization time to 4 hours. The above polyamide 4K had Tg of 92° C., a melting point of 230° C., a semi-crystallization time of 250 seconds, an end amino group concentration of 14.8 µeq/g, an end carboxyl group concentration of 67.2 µeq/g and a number average molecular weight of 23000. MFR could not be measured at 240° C. since it was close to the melting point, and MFR at 250° C. was measured to find that MFR at 250° C. was 17.4 g/10 minutes. A non-stretched film was prepared from the resulting polyamide 4K alone, and an oxygen permeability coefficient thereof was determined to find that it was 0.07 cc·mm/(m$^2$·day·atm) (23° C., 60% RH).

Then, cobalt stearate was added to the polyamide 4K, and the mixture was molten and kneaded with LLDPE in the same manners as in Example 1K to produce an oxygen-absorbing multilayer film, except that the temperature in melting and kneading was changed to 250° C., and the bag was charged with pineapple and subjected to heating treatment to measure an oxygen concentration immediately after the heating treatment and a flavor thereof and a sealing strength of the bag after one month. The results thereof are shown in Table 2K.

Example 7K

Metaxylylenediamine and sebacic acid were used in a mole ratio of 0.994:1 and subjected only to melt polymerization on the synthetic conditions described above to synthesize a polyamide resin (hereinafter, the above polyamide resin is referred to as the polyamide 5K). Controlled were the dropwise adding time to 2 hours and the reaction time in the melt polymerization to 1 hour. The above polyamide 5K had Tg of 61° C., a melting point of 190° C., a semi-crystallization time of 150 seconds, an end amino group concentration of 24.8 µeq/g, an end carboxyl group concentration of 57.2 µeq/g, a number average molecular weight of 17200 and MFR of 65.4 g/10 minutes at 240° C. A non-stretched film was prepared from the resulting polyamide 5K alone, and an oxygen permeability coefficient thereof was determined to find that it was 1.58 cc·mm/(m$^2$·day·atm) (23° C., 60% RH).

Then, cobalt stearate was added to the polyamide 5K, and the mixture was molten and kneaded with LLDPE in the same manners as in Example 1K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Example 8K

Metaxylylenediamine, adipic acid and isophthalic acid were used in a mole ratio of 0.998:0.95:0.05 and subjected to melt polymerization and solid phase polymerization on the synthetic conditions described above to synthesize a polyamide resin (hereinafter, the above polyamide resin is referred to as the polyamide 6K). Controlled were the dropwise adding time to 2 hours, the reaction time in the melt polymerization to 1 hour, the pressure in an inside of the equipment in the solid phase polymerization to 1 torr or less, the polymerization temperature to 215° C. and the polymerization time to 20 hours. The above polyamide 6K had Tg of 92° C., a melting point of 230° C., a semi-crystallization time of 250 seconds, an end amino group concentration of 28.8 µeq/g, an end carboxyl group concentration of 61.8 µeq/g, a number average molecular weight of 24200 and MFR of 10.1 g/10 minutes at 240° C. A non-stretched film was prepared from the resulting polyamide 6K alone, and an oxygen permeability coefficient thereof was determined to find that it was 0.08 cc·mm/(m$^2$·day·atm) (23° C., 60% RH).

Then, cobalt stearate was added to the polyamide 6K, and the mixture was molten and kneaded with LLDPE in the same manners as in Example 1K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Example 9K

Metaxylylenediamine:sebacic acid:adipic acid were used in a mole ratio of 0.998:0.6:0.4 and subjected to melt polymerization and solid phase polymerization on the synthetic conditions described above to synthesize a polyamide resin. Controlled were the dropwise adding time to 2 hours, the reaction time in the melt polymerization to 1 hour, the pressure in an inside of the equipment in the solid phase polymerization to 1 torr or less, the polymerization temperature to 150° C. and the polymerization time to 8 hours. Then, phthalic anhydride 0.2 wt % was added thereto, and the mixture was molten and kneaded at 250° C. by means of a biaxial extruding equipment to mask an end amino group (hereinafter, the above polyamide resin is referred to as the polyamide 7K). The above polyamide 7K had Tg of 70° C., a melting point of 157° C., a semi-crystallization time of 18 seconds, an end amino group concentration of 15.8 µeq/g, an end carboxyl group concentration of 51.6 µeq/g, a number average molecular weight of 23000 and MFR of 11.4 g/10 minutes at 240° C. A non-stretched film was prepared from the resulting polyamide 7K alone, and an oxygen permeability coefficient thereof was determined to find that it was 0.74 cc·mm/(m$^2$·day·atm) (23° C., 60% RH).

Then, cobalt stearate was added to the polyamide 7K, and the mixture was molten and kneaded with LLDPE in the same manners as in Example 1K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Example 10K

Metaxylylenediamine:sebacic acid:adipic acid were used in a mole ratio of 0.992:0.3:0.7 and subjected to melt polymerization and solid phase polymerization on the synthetic conditions described above to synthesize a polyamide resin (hereinafter, the above polyamide resin is referred to as the polyamide 8K). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 8K had Tg of 78° C., a melting point of 194° C., a semi-crystallization time of 2000 seconds or longer, an end amino group concentration of 19.5 µeq/g, an end carboxyl group concentration of 81.2 µeq/g, a number average molecular weight of 24500 and MFR of 10.5 g/10 minutes at 240° C. A non-stretched film was prepared from the resulting polyamide 8K alone, and an oxygen permeability coefficient thereof was determined to find that it was 0.21 cc·mm/(m$^2$·day·atm) (23° C., 60% RH).

Then, cobalt stearate was added to the polyamide 8K, and the mixture was molten and kneaded with LLDPE in the same manners as in Example 1K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Example 11K

Metaxylylenediamine:sebacic acid:adipic acid were used in a mole ratio of 0.992:0.7:0.3 and subjected to melt polymerization and solid phase polymerization on the synthetic conditions described above to synthesize a polyamide resin (hereinafter, the above polyamide resin is referred to as the polyamide 9K). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 9K had Tg of 65° C., a melting point of 170° C., a semi-crystallization time of 2000 seconds or longer, an end amino group concentration of 19.2 μeq/g, an end carboxyl group concentration of 80.0 μeq/g, a number average molecular weight of 25200 and MFR of 10.1 g/10 minutes at 240° C. Further, a non-stretched film was prepared from the resulting polyamide 9K alone, and an oxygen permeability coefficient thereof was determined to find that it was 0.68 cc·mm/(m²·day·atm) (23° C., 60% RH).

Then, cobalt stearate was added to the polyamide 9K, and the mixture was molten and kneaded with LLDPE in the same manners as in Example 1K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Comparative Example 1K

A film was produced in the same manner as in Example 1K to produce an oxygen-absorbing multilayer film, except that the weight ratio in melting and kneading was changed to the cobalt stearate-containing polyamide 1:LLDPE=80:20, and the bag was charged with pineapple and subjected to heating treatment to measure an oxygen concentration immediately after the heating treatment and a flavor thereof and a sealing strength of the bag after one month. The results thereof are shown in Table 2K.

Comparative Example 2K

A film was produced in the same manner as in Example 1K to produce an oxygen-absorbing multilayer film, except that the weight ratio in melting and kneading was changed to the cobalt stearate-containing polyamide 1K:LLDPE=10:90, and the bag was charged with pineapple and subjected to heating treatment to measure an oxygen concentration immediately after the heating treatment and a flavor thereof and a sealing strength of the bag after one month. The results thereof are shown in Table 2K.

Comparative Example 3K

A polyamide resin (hereinafter, the above polyamide resin is referred to as the polyamide 10K) was synthesized in the same manner as in Example 4K, except that metaxylylenediamine and adipic acid were used in a mole ratio of 0.998:1 and not subjected to solid phase polymerization. The above polyamide 10K had Tg of 78° C., a melting point of 237° C., a semi-crystallization time of 27 seconds, an end amino group concentration of 39.1 μeq/g, an end carboxyl group concentration of 70.2 μeq/g and a number average molecular weight of 17800. MFR could not be measured at 240° C. since it was close to the melting point, and MFR at 250° C. was measured to find that MFR at 250° C. was 51.0 g/10 minutes. Further, a non-stretched film was prepared from the resulting polyamide 10K alone, and an oxygen permeability coefficient thereof was determined to find that it was 0.09 cc·mm/(m²·day·atm) (23° C., 60% RH).

Then, cobalt stearate was added to the polyamide 10K, and the mixture was molten and kneaded with LLDPE in the same manners as in Example 4K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

Comparative Example 4K

A polyamide resin (hereinafter, the above polyamide resin is referred to as the polyamide 11K) was synthesized in the same manner as in Example 4K, except that metaxylylenediamine and adipic acid were used in a mole ratio of 0.999:1 and that the polymerization time in the solid phase polymerization was changed to 2 hours. The above polyamide 11K had Tg of 78° C., a melting point of 237° C., a semi-crystallization time of 25 seconds, an end amino group concentration of 34.8 μeq/g, an end carboxyl group concentration of 58.6 μeq/g and a number average molecular weight of 21800. MFR could not be measured at 240° C. since it was close to the melting point, and MFR at 250° C. was measured to find that MFR at 250° C. was 18.9 g/10 minutes. A non-stretched film was prepared from the resulting polyamide 11K alone, and an oxygen permeability coefficient thereof was determined to find that it was 0.09 cc·mm/(m²·day·atm) (23° C., 60% RH).

Then, cobalt stearate was added to the polyamide 11K, and the mixture was molten and kneaded with LLDPE in the same manners as in Example 4K to produce an oxygen-absorbing multilayer film, and the bag was charged with pineapple and subjected to heating treatment to measure an oxygen concentration immediately after the heating treatment and a flavor thereof and a sealing strength of the bag after one month. The results thereof are shown in Table 2K.

The respective details of the polyamides 1K to 11K obtained above are shown in Table 1K, and the results of the respective examples and comparative examples are shown in Table 2K.

TABLE 1K

|  | End amino group concentration (μeq/g) | Diamine[1] | Dicarboxylic acid[1] | Solid phase polymerization[2] | End masking[3] | MFR (g/10 minutes) | Oxygen permeability coefficient[4] (cc·mm/(m²·day·atm)) |
|---|---|---|---|---|---|---|---|
| Polyamide 1K | 17.5 | MXDA (0.992) | Sebacic acid (0.4) Adipic acid (0.6) | o (4 hours) | x | 11.0 (240° C.) | 0.34 |
| Polyamide 2K | 19.8 | MXDA (0.991) | Adipic acid (1.0) | o (4 hours) | x | 14.4 (250° C.) | 0.09 |
| Polyamide 3K | 25.8 | MXDA (0.7) PXDA (0.3) | Adipic acid (1.0) | x | o | 29.8 (260° C.) | 0.13 |

TABLE 1K-continued

| | End amino group concentration (μeq/g) | Diamine[1] | Dicarboxylic acid[1] | Solid phase polymerization[2] | End masking[3] | MFR (g/10 minutes) | Oxygen permeability coefficient[4] (cc·mm/(m²·day·atm)) |
|---|---|---|---|---|---|---|---|
| Polyamide 4K | 14.8 | MXDA (0.991) | Adipic acid (0.8) Isophthalic acid (0.2) | ○ (4 hours) | x | 17.4 (250° C.) | 0.07 |
| Polyamide 5K | 24.8 | MXDA (0.994) | Sebacic acid (1.0) | x | x | 65.4 (240° C.) | 1.58 |
| Polyamide 6K | 28.8 | MXDA (0.998) | Adipic acid (0.95) Isophthalic acid (0.05) | ○ (20 hours) | x | 10.1 (240° C.) | 0.08 |
| Polyamide 7K | 15.8 | MXDA (0.998) | Sebacic acid (0.6) Adipic acid (0.4) | ○ (8 hours) | ○ | 11.4 (240° C.) | 0.74 |
| Polyamide 8K | 19.5 | MXDA (0.992) | Sebacic acid (0.3) Adipic acid (0.7) | ○ (4 hours) | x | 10.5 (240° C.) | 0.21 |
| Polyamide 9K | 19.2 | MXDA (0.992) | Sebacic acid (0.7) Adipic acid (0.3) | ○ (4 hours) | x | 10.1 (240° C.) | 0.68 |
| Polyamide 10K | 39.1 | MXDA (0.998) | Adipic acid (1.0) | x | x | 51.0 (250° C.) | 0.09 |
| Polyamide 11K | 34.8 | MXDA (0.999) | Adipic acid (1.0) | ○ (2 hours) | x | 18.9 (250° C.) | 0.09 |

MXDA: metaxylylenediamine,
PXDA: paraxylylenediamine
[1] Numerical value in parentheses shows a mole ratio of each component.
[2] ○: the solid phase polymerization was carried out. The polymerization time is shown in parentheses. x: the solid phase polymerization was not carried out.
[3] ○: the end amino group was masked. x: the end amino group was not masked.
[4] A non-stretched film was prepared from the polyamide alone, and an oxygen permeability coefficient thereof was measured at 23° C. and 60% RH.

TABLE 2K

| | Composition | | | Film | | |
|---|---|---|---|---|---|---|
| | Polyamide (end amino group concentration) | Melting kneading ratio[1] | Appearance | Oxygen concentration | Color Tone[2] | Sealing strength |
| Example 1K | Polyamide 1K (17.5 μeq/g) | 35:65 | Good | 0.6% | 3 | 3.8 kg |
| Example 2K | Polyamide 1K (17.5 μeq/g) | 55:45 | Good | 2.0% | 3 | 3.1 kg |
| Example 3K | Polyamide 1K (17.5 μeq/g) | 25:75 | Good | 1.7% | 3 | 3.7 kg |
| Example 4K | Polyamide 2K (19.8 μeq/g) | 35:65 | Good | 5.5% | 2 | 3.6 kg |
| Example 5K | Polyamide 3K (25.8 μeq/g) | 35:65 | Slightly inferior | 5.1% | 2 | 3.5 kg |
| Example 6K | Polyamide 4K (14.8 μeq/g) | 35:65 | Good | 4.1% | 2 | 3.7 kg |
| Example 7K | Polyamide 5K (24.8 μeq/g) | 35:65 | Slightly inferior | 9.3% | 2 | 3.2 kg |
| Example 8K | Polyamide 6K (28.8 μeq/g) | 35:65 | Good | 3.8% | 2 | 3.6 kg |
| Example 9K | Polyamide 7K (15.8 μeq/g) | 35:65 | Good | 0.5% | 3 | 3.7 kg |
| Example 10K | Polyamide 8K (19.5 μeq/g) | 35:65 | Good | 2.4% | 3 | 3.5 kg |
| Example 11K | Polyamide 9K (19.2 μeq/g) | 35:65 | Good | 2.8% | 3 | 3.6 kg |
| Comparative Example 1K | Polyamide 1K (17.5 μeq/g) | 80:20 | Good | 12.8% | 1 | 1.5 kg |
| Comparative Example 2K | Polyamide 1K (17.5 μeq/g) | 10:90 | Good | 15.5% | 1 | 3.6 kg |
| Comparative Example 3K | Polyamide 10K (39.1 μeq/g) | 35:65 | Inferior | 14.6% | 1 | 3.6 kg |
| Comparative Example 4K | Polyamide 11K (34.8 μeq/g) | 35:65 | Good | 13.9% | 1 | 3.4 kg |

[1] (total weight of transition metal catalyst and polyamide resin): weight of polyolefin resin
[2] Color tone 3: good, 2: Slightly good, 1: color tone lowered As apparent from Examples 1K to 11K, the oxygen-absorbing resin multilayer films of the present invention were multilayer films which showed a good oxygen-absorbing performance and maintained well a flavor of foods and which maintained a sealing strength of the films after absorbing oxygen.

In contrast with this, a sealing strength of the films was notably deteriorated in Comparative Example 1K in which a content of the polyamide A in the resin composition exceeded 60% by weight. The oxygen-absorbing performance was unsatisfactory in Comparative Example 2K in which a content of the polyamide A was less than 15% by weight. In particular, as apparent from comparison of Comparative Example 1K with Examples 1K to 3K, the good oxygen-absorbing performances were not necessarily obtained when a content of the polyamide A in the resin composition was large.

On the other hand, in Comparative Example 3K in which a mole ratio of metaxylylenediamine to adipic acid was increased and in which the solid phase polymerization was not carried out and Comparative Example 4K in which a mole ratio of metaxylylenediamine to adipic acid was increased and in which the solid phase polymerization time was shortened, an end amino group concentration of the polyamide resins obtained exceeded 30 μeq/g, and the good oxygen-absorbing performances were not obtained in comparison with Example 4K. Further, an appearance of the film was deteriorated as well in Comparative Example 3K.

Example 12K

Sila-ace S330 (3-aminopropyltriethoxysilane) 4.75 parts by weight which was a silane coupling agent manufactured by Chisso Corporation was added to the coating liquid (epoxy resin composition) prepared in Example 1K and stirred well to prepare a coating liquid (epoxy resin composition), and the coating liquid was anchor-coated in 2 μm on a silica-deposited polyester film having 12 μm thickness (product name: "Tech Barrier L" manufactured by Mitsubishi Plastics, Inc.) and dried at 85° C. for 1 second. Then, the two kind, three layer film 1 obtained in Example 1K was used and laminated thereon by extrusion lamination using low density polyethylene (product name: "Milason 18SP" manufactured by Mitsui Chemicals, Inc.) to obtain an oxygen-absorbing multilayer film of a silica-deposited polyester film/epoxy resin-cured matter/low density polyethylene (20)/LLDPE (10)/oxygen-absorbing resin composition (20)/LLDPE (10). The above oxygen-absorbing multilayer film was charged with pickles of radish and subjected to heating treatment at 80° C., and then it was stored at 23° C. to inspect a flavor thereof after 3 months. A flavor of the radish was confirmed to be maintained well.

Example 13K

An oxygen-absorbing resin composition was obtained in the same manner as in Example 1K, except that an ethylene-propylene block copolymer (product name: "Novatec FG3DC" manufactured by Japan Polypropylene Corporation, MFR: 9.5 g/10 minutes at 230° C., MFR: 10.6 g/10 minutes at 240° C., hereinafter referred to as PP) was used in place of LLDP. Then, a two kind, three layer film 2 (thickness: 15 μm/30 μm/15 μm) was prepared in the same manner as in Example 1K, except that the above oxygen-absorbing resin composition was used for a core layer and that PP was used for a skin layer in place of LLDPE. A HAZE of the film thus obtained was 24%.

Next, a methanol/ethyl acetate=9/1 solution (solid matter concentration: 35% by weight) containing 22 parts by weight of an epoxy resin (TETRAD-X, manufactured by Mitsubishi Gas Chemicals, Inc.) having a glycidylamine part derived from metaxylylenediamine and 236 parts by weight of an epoxy resin curing agent a was prepared, and 0.4 part by weight of an acryl base wetting agent (BYK381, manufactured by BYK Chemie A.G.) and 0.1 part by weight of a silicone base defoaming agent (BYK065, manufactured by BYK Chemie A.G.) were added thereto. The mixture was stirred well to obtain a coating liquid (epoxy resin composition) in which an equivalent ratio (active hydrogen/epoxy group) of active hydrogen in the epoxy resin curing agent to an epoxy group in the epoxy resin was 4.0. A content of the skeletal structure represented by Formula (1) in the epoxy resin-cured matter was 63.5% by weight.

The epoxy resin composition was coated in 8 μm on a corona-treated surface of the non-stretched polypropylene sheet 800 μm which was subjected to corona discharge treatment and dried at 90° C. for 10 seconds, and then the two kind, three layer film 2 was laminated thereon to obtain an oxygen-absorbing multilayer film. The multilayer film thus obtained was thermoformed into a cup (drawing ratio: 2.7) of 70 cc, and the cup was charged with ground tea pudding and tightly sealed by heat-sealing using as a cover material, a film of aluminum-deposited PET (product name: "GL-AEH" manufactured by Toppan Printing Co., Ltd., 12)/adhesive (3)/nylon (product name: "N1202" manufactured by Toyobo Co., Ltd., 15)/adhesive (3)/PP (40). The tightly sealed cup was subjected to heating treatment at 115° C. for 40 minutes and stored at 23° C. for 3 months, and then a color tone of the ground tea pudding was observed. A color tone of the ground tea pudding was maintained well.

In the present invention, the specific polyamide resin and the transition metal catalyst were blended with the polyolefin resin in a specific proportion, and the specific epoxy resin-cured matter was used for lamination on an outer layer, whereby provided were the oxygen-absorbing multilayer films which were excellent in an oxygen-absorbing performance and maintained a resin strength after stored and which were excellent in a processability and could be applied to various containers and uses.

Example 1L

Metaxylylenediamine:sebacic acid:adipic acid were used in a mole ratio of 0.993:0.45:0.55 and subjected to melt polymerization and solid phase polymerization on the synthetic conditions described above to synthesize a polyamide resin (hereinafter, the above polyamide resin is referred to as the polyamide 1L). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1L had Tg of 73° C., a melting point of 184° C., a semi-crystallization time of 2000 seconds or longer, an end amino group concentration of 16.8 μeq/g, an end carboxyl group concentration of 92.0 μeq/g, a number average molecular weight of 23700 and MFR of 11.0 g/10 minutes at 240° C. Further, a non-stretched film was prepared from the resulting polyamide 1L alone, and an oxygen permeability coefficient thereof was determined to find that it was 0.36 cc·mm/($m^2$·day·atm) (23° C., 60% RH).

Cobalt stearate was added as a transition metal catalyst to the molten polyamide 1L through a side feed by means of a biaxial extruding equipment so that a cobalt concentration was 400 ppm. Further, the resulting mixture (hereinafter referred to as the cobalt stearate-containing polyamide 1L) of the polyamide and cobalt stearate was molten and kneaded at 240° C. with linear low density polyethylene (product name: "Kernel KF380" manufactured by Japan Polyethylene Corporation, MFR: 4.0 g/10 minutes (measured according to JIS K7210), MFR: 8.7 g/10 minutes at 240° C., MFR: 10.0 g/10 minutes at 250° C., hereinafter referred to as LLDPE) in a weight ratio of the cobalt stearate-containing polyamide 1L:LLDPE=35:65 to obtain an oxygen-absorbing resin composition.

A two kind, three layer film 1 (thickness: 10 μm/20 μm/10 μm) in which the oxygen-absorbing resin composition obtained was used for a core layer and in which LLDPE was used for a skin layer was prepared by subjecting one surface thereof to corona discharge treatment in a width of 800 mm at 120 m/minute. An appearance of the film thus obtained was good. Layers were laminated on a corona-treated surface side of the above film 1 by extrusion lamination using low density polyethylene (product name: "Milason 18SP" manufactured by Mitsui Chemicals, Inc.) to obtain an oxygen-absorbing multilayer paper substrate-laminated material of bleached craft paper (basis weight: 330 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (20)/LLDPE (10)/oxygen-absorbing resin composition (20)/LLDPE (10). Numbers in parentheses mean a thickness (unit: μm) of the respective layers. An oxygen-absorbing paper container 1 of a gable top type having a bottom part of 70 cm square and a capacity of 1000 mL was obtained from the above laminated material. The paper container could be produced without causing any problems on a processability thereof.

The above oxygen-absorbing paper container 1 was charged with 1000 mL of wine so that an air amount of a head space was 20 cc, and it was stored at 35° C. to inspect a concentration of oxygen in the head space in the 3rd day and a flavor of the wine after one month. Further, a thermally fused strength in an upper part of the gable top type paper container after one month was measured.

Example 2L

An oxygen-absorbing paper container was produced in the same manner as in Example 1L, except that the weight ratio in melting and kneading was changed to the cobalt stearate-containing polyamide 1L:LLDPE=55:45. Then, a flavor of wine, a head space oxygen concentration and a thermally fused strength in an upper part of the paper container were inspected. The results thereof are shown in Table 2L.

Example 3L

An oxygen-absorbing paper container was produced in the same manner as in Example 1L, except that the weight ratio in melting and kneading was changed to the cobalt stearate-containing polyamide 1L:LLDPE 1=25:75. Then, a flavor of wine, a head space oxygen concentration and a thermally fused strength in an upper part of the paper container were inspected. The results thereof are shown in Table 2L.

Example 4L

Metaxylylenediamine and adipic acid were used in a mole ratio of 0.994:1 and subjected to melt polymerization and solid phase polymerization on the synthetic conditions described above to synthesize a polyamide resin (hereinafter, the above polyamide resin is referred to as the polyamide 2L). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 2L had Tg of 84° C., a melting point of 237° C., a semi-crystallization time of 25 seconds, an end amino group concentration of 19.6 μeq/g, an end carboxyl group concentration of 68.6 μeq/g and a number average molecular weight of 23000. MFR could not be measured at 240° C. since it was close to the melting point, and MFR at 250° C. was measured to find that MFR at 250° C. was 14.4 g/10 minutes. A non-stretched film was prepared from the resulting polyamide 2L alone, and an oxygen permeability coefficient thereof was determined to find that it was 0.09 cc·mm/(m$^2$·day·atm) (23° C., 60% RH).

Then, cobalt stearate was added to the polyamide 2L, and the mixture was molten and kneaded with LLDPE in the same manners as in Example 1L, except that the temperature in melting and kneading was changed to 250° C.

Then, an oxygen-absorbing paper container was produced in the same manner as in Example 1L, and a flavor of wine, a head space oxygen concentration and a thermally fused strength in an upper part of the paper container were inspected. The results thereof are shown in Table 2L.

Example 5L

Metaxylylenediamine and paraxylylenediamine were mixed in 7:3, and the above diamines and adipic acid were used in a mole proportion of 0.999:1 and subjected only to melt polymerization on the synthetic conditions described above to synthesize a polyamide resin. Then, phthalic anhydride 0.2 wt % was added thereto, and the mixture was molten and kneaded at 285° C. by means of a biaxial extruding equipment to mask an end amino group (hereinafter, the above polyamide resin is referred to as the polyamide 3L). Controlled were the dropwise adding time to 2 hours, the polymerization temperature after finishing dropwise adding metaxylylenediamine in the melt polymerization to 277° C. and the reaction time to 30 minutes. The above polyamide 3L had Tg of 87° C., a melting point of 255° C., a semi-crystallization time of 18 seconds, an end amino group concentration of 25.8 μeq/g, an end carboxyl group concentration of 65.6 μeq/g and a number average molecular weight of 18500. MFR could not be measured at 250° C. since it was close to the melting point, and MFR at 260° C. was measured to find that MFR at 260° C. was 29.8 g/10 minutes. A non-stretched film was prepared from the resulting polyamide 3L alone, and an oxygen permeability coefficient thereof was determined to find that it was 0.13 cc·mm/(m$^2$·day·atm) (23° C., 60% RH).

Then, cobalt stearate was added to the polyamide 3L, and the mixture was molten and kneaded with LLDPE in the same manners as in Example 1L to produce an oxygen-absorbing paper container, except that the temperature in melting and kneading was changed to 265° C. Then, a flavor of wine, a head space oxygen concentration and a thermally fused strength in an upper part of the paper container were inspected. The results thereof are shown in Table 2L.

Example 6L

Metaxylylenediamine, adipic acid and isophthalic acid were used in a mole ratio of 0.992:0.8:0.2 and subjected to melt polymerization and solid phase polymerization on the synthetic conditions described above to synthesize a polyamide resin (hereinafter, the above polyamide resin is referred to as the polyamide 4L). Controlled were the dropwise adding time to 2 hours, the reaction time in the melt polymerization to 1 hour, the pressure in an inside of the equipment in the solid phase polymerization to 1 torr or less, the polymerization temperature to 215° C. and the polymerization time to 4 hours. The above polyamide 4L had Tg of 92° C., a melting point of 230° C., a semi-crystallization time of 250 seconds, an end amino group concentration of 14.9 µeq/g, an end carboxyl group concentration of 67.5 µeq/g and a number average molecular weight of 23500. MFR could not be measured at 240° C. since it was close to the melting point, and MFR at 250° C. was measured to find that MFR at 250° C. was 17.4 g/10 minutes. A non-stretched film was prepared from the resulting polyamide 4L alone, and an oxygen permeability coefficient thereof was determined to find that it was 0.07 cc·mm/(m$^2$·day·atm) (23° C., 60% RH).

Then, cobalt stearate was added to the polyamide 4L, and the mixture was molten and kneaded with LLDPE in the same manners as in Example 1L to produce an oxygen-absorbing paper container, except that the temperature in melting and kneading was changed to 250° C. Then, a flavor of wine, a head space oxygen concentration and a thermally fused strength in an upper part of the paper container were inspected. The results thereof are shown in Table 2L.

Example 7L

Metaxylylenediamine and sebacic acid were used in a mole ratio of 0.994:1 and subjected only to melt polymerization on the synthetic conditions described above to synthesize a polyamide resin (hereinafter, the above polyamide resin is referred to as the polyamide 5L). Controlled were the dropwise adding time to 2 hours and the reaction time in the melt polymerization to 1 hour. The above polyamide 5L had Tg of 61° C., a melting point of 190° C., a semi-crystallization time of 150 seconds, an end amino group concentration of 24.8 µeq/g, an end carboxyl group concentration of 57.2 µeq/g, a number average molecular weight of 17200 and MFR of 65.4 g/10 minutes at 240° C. A non-stretched film was prepared from the resulting polyamide 5L alone, and an oxygen permeability coefficient thereof was determined to find that it was 1.58 cc·mm/(m$^2$·day·atm) (23° C., 60% RH).

Then, cobalt stearate was added to the polyamide 5L, and the mixture was molten and kneaded with LLDPE in the same manners as in Example 1L to produce an oxygen-absorbing paper container. Then, a flavor of wine, a head space oxygen concentration and a thermally fused strength in an upper part of the paper container were inspected. The results thereof are shown in Table 2L.

Comparative Example 1L

An oxygen-absorbing paper container was produced in the same manner as in Example 1L, except that a weight ratio in melting and kneading was changed to the cobalt stearate-containing polyamide 1L:LLDPE=80:20. Then, a flavor of wine, a head space oxygen concentration and a thermally fused strength in an upper part of the paper container were inspected. The results thereof are shown in Table 2L.

Comparative Example 2L

An oxygen-absorbing paper container was produced in the same manner as in Example 1L, except that the mixture was not molten and not kneaded with LLDPE and that the film was prepared only from the cobalt stearate-containing polyamide 1L. Then, a flavor of wine, a head space oxygen concentration and a thermally fused strength in an upper part of the paper container were inspected. The results thereof are shown in Table 2L.

Comparative Example 3L

An oxygen-absorbing paper container was produced in the same manner as in Example 1L, except that a weight ratio in melting and kneading was changed to the cobalt stearate-containing polyamide 1L:LLDPE=10:90. Then, a flavor of wine, a head space oxygen concentration and a thermally fused strength in an upper part of the paper container were inspected. The results thereof are shown in Table 2L.

Comparative Example 4L

A polyamide resin (hereinafter, the above polyamide resin is referred to as the polyamide 6L) was synthesized in the same manner as in Example 4L, except that metaxylylenediamine and adipic acid were used in a mole ratio of 0.998:1 and not subjected to solid phase polymerization. The above polyamide 6L had Tg of 78° C., a melting point of 237° C., a semi-crystallization time of 27 seconds, an end amino group concentration of 39.1 µeq/g, an end carboxyl group concentration of 70.2 µeq/g and a number average molecular weight of 17800. MFR could not be measured at 240° C. since it was close to the melting point, and MFR at 250° C. was measured to find that MFR at 250° C. was 51.0 g/10 minutes. Further, a non-stretched film was prepared from the resulting polyamide 6L alone, and an oxygen permeability coefficient thereof was determined to find that it was 0.09 cc·mm/(m$^2$·day·atm) (23° C., 60% RH).

Then, cobalt stearate was added to the polyamide 6L, and the mixture was molten and kneaded with LLDPE in the same manners as in Example 4L to produce an oxygen-absorbing paper container. Then, a flavor of wine, a head space oxygen concentration and a thermally fused strength in an upper part of the paper container were inspected. The results thereof are shown in Table 2L.

Comparative Example 5L

A polyamide resin (hereinafter, the above polyamide resin is referred to as the polyamide 7L) was synthesized in the same manner as in Example 4L, except that metaxylylenediamine and adipic acid were used in a mole ratio of 0.999:1 and that a polymerization time in the solid phase polymerization was changed to 2 hours. The above polyamide 7L had Tg of 78° C., a melting point of 237° C., a semi-crystallization time of 25 seconds, an end amino group concentration of 34.8 µeq/g, an end carboxyl group concentration of 58.6 µeq/g and a number average molecular weight of 21800. MFR could not be measured at 240° C. since it was close to the melting point, and MFR at 250° C. was measured to find that MFR at 250° C. was 18.9 g/10 minutes. A non-stretched film was prepared from the resulting polyamide 7L alone, and an oxygen permeability coefficient thereof was determined to find that it was 0.09 cc·mm/(m$^2$·day·atm) (23° C., 60% RH).

Then, cobalt stearate was added to the polyamide 7L, and the mixture was molten and kneaded with LLDPE in the same manners as in Example 4L to produce an oxygen-absorbing paper container. Then, a flavor of wine, a head space oxygen concentration and a thermally fused strength in an upper part of the paper container were inspected. The results thereof are shown in Table 2L.

The respective details of the polyamides 1L to 7L obtained above are shown in Table 1L, and the results of the respective examples and comparative examples are shown in Table 2L.

performance and a storing effect at any of a high humidity and a low humidity and which maintained a container strength after absorbing oxygen.

In contrast with this, the container strength was notably deteriorated in Comparative Examples 1L and 2L in which a content of the polyamide A in the resin composition exceeded

TABLE 1L

|  | End amino group concentration (μeq/g) | Diamine[1] | Dicarboxylic acid[1] | Solid phase polymerization[2] | End masking[3] | MFR (g/10 minutes) | Oxygen permeability coefficient[4] (cc · mm/(m² · day · atm)) |
|---|---|---|---|---|---|---|---|
| Polyamide 1L | 16.8 | MXDA (0.993) | Sebacic acid (0.45) Adipic acid (0.55) | ○ (4 hours) | x | 11.0 (240° C.) | 0.36 |
| Polyamide 2L | 19.6 | MXDA (0.994) | Adipic acid (1.0) | ○ (4 hours) | x | 14.4 (250° C.) | 0.09 |
| Polyamide 3L | 25.8 | MXDA + PXDA[5] (0.999) | Adipic acid (1.0) | x | ○ | 29.8 (260° C.) | 0.13 |
| Polyamide 4L | 14.9 | MXDA (0.992) | Adipic acid (0.8) Isophthalic acid (0.2) | ○ (4 hours) | x | 17.4 (250° C.) | 0.07 |
| Polyamide 5L | 24.8 | MXDA (0.994) | Sebacic acid (1.0) | x | x | 65.4 (240° C.) | 1.58 |
| Polyamide 6L | 39.1 | MXDA (0.998) | Adipic acid (1.0) | x | x | 51.0 (250° C.) | 0.09 |
| Polyamide 7L | 34.8 | MXDA (0.999) | Adipic acid (1.0) | ○ (2 hours) | x | 18.8 (250° C.) | 0.09 |

MXDA: metaxylylenediamine,
PXDA: paraxylylenediamine
[1]Numerical value in parentheses shows a mole ratio of each component.
[2]○: the solid phase polymerization was carried out. The polymerization time is shown in parentheses. x: the solid phase polymerization was not carried out.
[3]○: the end amino group was masked. x: the end amino group was not masked.
[4]A non-stretched film was prepared from the polyamide alone, and an oxygen permeability coefficient thereof was measured at 23° C. and 60% RH.
[5]Mixed ratio of MXDA and PXDA MXDA:PXDA = 7:3

TABLE 2L

|  | Composition | | | | |
|---|---|---|---|---|---|
|  | Polyamide (end amino group concentration) | Melting kneading ratio[1] | Flavor | Oxygen concentration | Thermally fused strength |
| Example 1L | Polyamide 1L (16.8 μeq/g) | 35:65 | 3 | 0.1% less | 4.8 kg |
| Example 2L | Polyamide 1K (16.8 μeq/g) | 55:45 | 3 | 0.2% | 2.8 kg |
| Example 3L | Polyamide 1L (16.8 μeq/g) | 25:75 | 3 | 0.15% | 4.2 kg |
| Example 4L | Polyamide 2L (19.6 μeq/g) | 35:65 | 2 | 3.6% | 4.8 kg |
| Example 5L | Polyamide 3L (25.8 μeq/g) | 35:65 | 2 | 6.8% | 4.6 kg |
| Example 6L | Polyamide 4L (14.9 μeq/g) | 35:65 | 2 | 2.4% | 4.5 kg |
| Example 7L | Polyamide 5L (24.8 μeq/g) | 35:65 | 2 | 5.8% | 4.5 kg |
| Comparative Example 1L | Polyamide 1L (16.8 μeq/g) | 80:20 | 1 | 14.3% | 1.2 kg |
| Comparative Example 2L | Polyamide 1L (16.8 μeq/g) | 100:0 | 1 | 15.5% | 0.5 kg |
| Comparative Example 3L | Polyamide 1L (16.8 μeq/g) | 10:90 | 1 | 13.3% | 4.5 kg |
| Comparative Example 4L | Polyamide 6L (39.1 μeq/g) | 35:65 | 1 | 10.5% | 4.6 kg |
| Comparative Example 5L | Polyamide 7L (34.8 μeq/g) | 35:65 | 1 | 8.8% | 4.6 kg |

[1](total weight of transition metal catalyst and polyamide resin):weight of polyolefin resin
[2]Flavor evaluation 3: flavor good, 2: flavor Slightly good, 1: flavor lowered As apparent from Examples 1L to 7L, the oxygen-absorbing resin compositions of the present invention were resin compositions which showed an excellent oxygen-absorbing 60% by weight. Further, the oxygen-absorbing performances were unsatisfactory in Comparative Example 2L in which the polyolefin resin was not added and Comparative Example 3L in which a content of the polyamide A in the resin composition was less than 20% by weight. In particular, as apparent from comparison of Comparative Examples 1L to 3L with Examples 1L to 3L, the good oxygen-absorbing performances were not necessarily obtained when a content of the polyamide A in the resin composition was large.

On the other hand, in Comparative Example 4L in which a mole ratio of metaxylylenediamine to adipic acid was increased as compared with Example 4L and in which the solid phase polymerization was not carried out and Comparative Example 5L in which a mole ratio of metaxylylenediamine to adipic acid was increased and in which the solid phase polymerization time was shortened, an end amino group concentration of the polyamide resins obtained exceeded 30 μeq/g, and the good oxygen-absorbing performances were not obtained.

Comparative Example 6L

Iron powder having an average particle diameter of 20 μm was mixed with calcium chloride in a proportion of 100:1, and the mixture was kneaded with LLDPE in a weight ratio of 30:70 to obtain an iron powder base oxygen-absorbing resin composition AL. A two kind, three layer film was tried to be prepared in the same manner as in Example 1L by using the iron powder base oxygen-absorbing resin composition AL for a core layer, but irregularities of the iron powder were generated on a film surface, and the film was not obtained. Accordingly, the iron powder base oxygen-absorbing resin composition AL was extruded and laminated as an oxygen-absorbing layer in a thickness of 20 μm on LLDPE having a thickness of 40 μm to obtain a laminated film which was subjected on an oxygen-absorbing layer surface to corona discharge treatment. The above laminated film was laminated on a bleached craft paper in the same manner as in Example 1L to try to prepare a paper container of a gable top type comprising an oxygen-absorbing multilayer paper base material of bleached craft paper (basis weight: 300 g/m$^2$)/urethane base adhesive for dry laminate (product name: "TM251/CAT-RT88" manufactured by Toyo-Morton, Ltd., 3)/aluminum-deposited PET film (product name: "GL-AEH" manufactured by Toppan Printing Co., Ltd., 12)/urethane base anchor coating agent (product name: "EL-557A/B" manufactured by Toyo-Morton, Ltd., 0.5)/low density polyethylene (product name: "Milason 18SP" manufactured by Mitsui Chemicals, Inc., 20)/iron powder base oxygen-absorbing resin composition AL (20)/LLDPE (40), but the thickness was large, and it was difficult to prepare a corner of the paper container. A preparing speed of the container was reduced to cut off the rejected products, and the containers were obtained at last. A storing test of wine was carried out in the same manner as in Example 1L, but aldehyde odor was generated in opening the container, and a flavor thereof was notably reduced.

In the present invention, the specific polyamide resin and the transition metal catalyst were blended with the polyolefin resin in a specific proportion, whereby provided were the oxygen-absorbing paper containers which were excellent in an oxygen-absorbing performance and maintained a container strength after stored and which were excellent in a processability.

Example 1M

Metaxylylenediamine:sebacic acid:adipic acid were used in a mole ratio of 0.991:0.7:0.3 and subjected to melt polymerization and solid phase polymerization on the synthetic conditions described above to synthesize a polyamide resin (hereinafter, the above polyamide resin is referred to as the polyamide 1M). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 1M had Tg of 72° C., a melting point of 184° C., a semi-crystallization time of 2000 seconds or longer, an end amino group concentration of 17.2 μeq/g, an end carboxyl group concentration of 86.3 μeq/g, a number average molecular weight of 25000 and MFR of 10.4 g/10 minutes at 240° C. Further, a non-stretched film was prepared from the resulting polyamide 1M alone, and an oxygen permeability coefficient thereof was determined to find that it was 0.55 cc·mm/ (m$^2$·day·atm) (23° C., 60% RH).

Cobalt stearate was added as a transition metal catalyst to the molten polyamide 1M through a side feed by means of a biaxial extruding equipment so that a cobalt concentration was 200 ppm. Further, the resulting mixture (hereinafter referred to as the cobalt stearate-containing polyamide 1M) of the polyamide and cobalt stearate was molten and kneaded at 240° C. with an ethylene-propylene random copolymer (product name: "PC630S" manufactured by SunAllomer Ltd., MFR: 7.5 g/10 minutes at 230° C. (measured according to JIS K7210), hereinafter referred to as PP 1) as a polyolefin resin in a weight ratio of the cobalt stearate-containing polyamide 1M:PP 1=40:60 to obtain a pellet comprising an oxygen-absorbing resin composition A.

A two lind, two layer film 1 (thickness: oxygen-absorbing layer 25 μm/sealant layer 25 μm) in which the oxygen-absorbing resin composition A obtained was used for an oxygen-absorbing layer and in which PP 1 was used for a sealant layer was subjected on an oxygen-absorbing layer surface thereof to corona discharge treatment in a width of 800 mm at 100 m/minute to prepare a film roll thereof. Uneven thickness such as humps and the like was not observed on the film roll, and the film obtained had a good appearance and a HAZE of 10%. A urethane base adhesive for dry laminate (product name: "AD-817/CAT-RT86L-60" manufactured by Toyo-Morton, Ltd.) was used to laminate a nylon film (product name: "N1102" manufactured by Toyobo Co., Ltd.) and aluminum-deposited PET (product name: "GL-AEH" manufactured by Toyobo Co., Ltd.) on a corona-treated surface side to obtain an oxygen-absorbing multilayer film comprising an oxygen-absorbing multilayer film of a nylon film (15)/adhesive (3)/aluminum-deposited PET (12)/adhesive (3)/oxygen-absorbing resin (25)/PP 1 (25).

Then, a three kind, five layer multilayer sheet-molding apparatus comprising first to third extruding equipments, a feed block, a T die, a cooling roll and a sheet receiving equipment was used to extrude components from the respective extruding equipments to obtain a gas-barriering multilayer sheet, wherein extruded were an ethylene-propylene random copolymer (product name: "Novatec PP EG7F" manufactured by Japan Polypropylene Corporation, MFR: 1.3 g/10 minutes (measured according to JIS K7210), MFR: 8.2 g/10 minutes at 240° C., MFR: 9.8 g/10 minutes at 250° C., hereinafter referred to as PP 2) from the first extruding equipment, MXD6 (product name: "MX Nylon S7007" manufactured by Mitsubishi Gas Chemical Company, Inc.) from the second extruding equipment and maleic anhydride-modified polypropylene (product name: "Admer QF500" manufactured by Mitsui Chemicals, Inc., 15) from the third extruding equipment. The constitution of the gas-barriering multilayer sheet was PP 2 (80)/maleic anhydride-modified polypropylene (product name: same as above, 15)/Nylon MXD6 (product name: same as above, 40)/maleic anhydride-modified polypropylene (product name: same as above, 15)/ PP 2 (350) from the inner layer. The multilayer sheet prepared by co-extrusion was a multilayer sheet which was free from thickness unevenness and the like and had a good appearance.

Next, the gas-barriering multilayer sheet thus obtained was subjected to thermoforming processing into a tray-like container (inner volume: 350 cc, surface area: 200 cm$^2$) (hereinafter referred to as a gas-barriering molded container 1) with the inner layer turned to an inside by means of a vacuum molding machine. The gas-barriering molded container 1 obtained was free from thickness unevenness and had a good appearance. The above container was charged with 110 g of washed rice and 90 g of sterilized water, and an inside of the container was substituted with nitrogen to set an oxygen concentration to 10%. Then, the oxygen-absorbing multilayer film was used as a cover material with a nylon film side turned to an outer surface to tightly seal the container described above by heat sealing. The above container was put in a pressure heating kettle and heated for cooking at 105° C. for 40 minutes, and after cooled down, it was stored on the conditions of 23° C. and 50% RH. After cooled, the oxygen concentration was measured, and the kettle was opened after 3 months since starting storing to confirm a flavor of the cooked rice and a strength of the gas-barriering container. The results thereof are shown in Table 2M.

Example 2M

An oxygen-absorbing multilayer film was obtained in the same manner as in Example 1M, except that a weight ratio in melting and kneading was changed to the cobalt stearate-containing polyamide 1M:PP 1=55:45. Then, the film was used as a cover material for the gas-barriering molded container 1 to carry out the same storing test as in Example 1M. The results thereof are shown in Table 2M.

Example 3M

An oxygen-absorbing multilayer film was obtained in the same manner as in Example 1M, except that a weight ratio in melting and kneading was changed to the cobalt stearate-containing polyamide 1M:PP 1=20:80. Then, the film was used as a cover material for the gas-barriering molded container 1 to carry out the same storing test as in Example 1M. The results thereof are shown in Table 2M.

Example 4M

Metaxylylenediamine:sebacic acid:adipic acid were used in a mole ratio of 0.993:0.3:0.7 and subjected to melt polymerization and solid phase polymerization on the synthetic conditions described above to synthesize a polyamide resin (hereinafter, the above polyamide resin is referred to as the polyamide 2M). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 2M had Tg of 79° C., a melting point of 190° C., a semi-crystallization time of 2000 seconds or longer, an end amino group concentration of 18.3 µeq/g, an end carboxyl group concentration of 80.3 µeq/g, a number average molecular weight of 23500 and MFR of 11.1 g/10 minutes at 240° C. Further, a non-stretched film was prepared from the resulting polyamide 2M alone, and an oxygen permeability coefficient thereof was determined to find that it was 0.41 cc·mm/(m$^2$·day·atm) (23° C., 60% RH).

Then, cobalt stearate was added thereto in the same manner as in Example 1M so that a cobalt concentration was 200 ppm, and the resulting mixture (hereinafter referred to as the cobalt stearate-containing polyamide 2M) of the polyamide 2M and cobalt stearate was molten and kneaded with PP 1 at 240° C. in a weight ratio of the cobalt stearate-containing polyamide 2M:PP 1=40:60 to obtain an oxygen-absorbing resin pellet. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

Example 5M

Metaxylylenediamine:sebacic acid:adipic acid were used in a mole ratio of 0.992:0.6:0.4 and subjected to melt polymerization and solid phase polymerization on the synthetic conditions described above to synthesize a polyamide resin (hereinafter, the above polyamide resin is referred to as the polyamide 3M). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 3M had Tg of 77° C., a melting point of 189° C., a semi-crystallization time of 2000 seconds or longer, an end amino group concentration of 15.6 µeq/g, an end carboxyl group concentration of 81.2 µeq/g, a number average molecular weight of 24500 and MFR of 10.1 g/10 minutes at 240° C. Further, a non-stretched film was prepared from the resulting polyamide 3M alone, and an oxygen permeability coefficient thereof was determined to find that it was 0.24 cc·mm/(m$^2$·day·atm) (23° C., 60% RH).

Then, cobalt stearate was added thereto in the same manner as in Example 1M so that a cobalt concentration was 200 ppm, and the resulting mixture (hereinafter referred to as the cobalt stearate-containing polyamide 3M) of the polyamide 3M and cobalt stearate was molten and kneaded with PP 1 at 240° C. in a weight ratio of the cobalt stearate-containing polyamide 3M:PP 1=40:60 to obtain an oxygen-absorbing resin pellet. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

Example 6M

Metaxylylenediamine and paraxylylenediamine were mixed in 7:3, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 270° C. by means of a biaxial extruding equipment to mask an end amino group (hereinafter, the above polyamide resin is referred to as the polyamide 4M). Controlled were the dropwise adding time to 2 hours, the polymerization temperature after finishing dropwise adding metaxylylenediamine in the melt polymerization to 270° C. and the reaction time to 30 minutes. The above polyamide 4M had Tg of 85° C., a melting point of 255° C., a semi-crystallization time of 22 seconds, an end amino group concentration of 24.7 µeq/g, an end carboxyl group concentration of 60.2 µeq/g and a number average molecular weight of 18400. MFR could not be measured at 260° C. since it was close to the melting point, and MFR at 270° C. was measured to find that MFR at 270° C. was 33.4 g/10 minutes. A non-stretched film was prepared from the resulting polyamide 4M alone, and an oxygen permeability coefficient thereof was determined to find that it was 0.08 cc·mm/(m$^2$·day·atm) (23° C., 60% RH).

Then, cobalt stearate was added to the polyamide 4M, and the mixture was molten and kneaded with PP 1 in the same manner as in Example 1M, except that the temperature in melting and kneading was changed to 270° C. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

Example 7M

Metaxylylenediamine:sebacic acid:adipic acid were used in a mole ratio of 0.994:0.4:0.6 and subjected to melt polymerization and solid phase polymerization on the synthetic conditions described above to synthesize a polyamide resin (hereinafter, the above polyamide resin is referred to as the polyamide 5M). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 4 hours. The polyamide 5M had Tg of 73° C., a melting point of 185° C., a semi-crystallization time of 2000 seconds or longer, an end amino group concentration of 17.6 µeq/g, an end carboxyl group concentration of 77.3 µeq/g, a number average molecular weight of 22900 and MFR of 13.6 g/10 minutes at 240° C. A non-stretched film was prepared from the resulting polyamide 5M alone, and an oxygen permeability coefficient thereof was determined to find that it was 0.69 cc·mm/(m$^2$·day·atm) (23° C., 60% RH).

Then, cobalt stearate was added to the polyamide 5M, and the mixture was molten and kneaded with PP 1 in the same manners as in Example 1M. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

Example 8M

Metaxylylenediamine and adipic acid were used in a mole ratio of 0.991:1 and subjected to melt polymerization and solid phase polymerization on the synthetic conditions described above to synthesize a polyamide resin (hereinafter, the above polyamide resin is referred to as the polyamide 6M). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 4 hours. The above polyamide 6M had Tg of 84° C., a melting point of 239° C., a semi-crystallization time of 25 seconds, an end amino group concentration of 19.1 µeq/g, an end carboxyl group concentration of 87.0 µeq/g and a number average molecular weight of 23000. MFR could not be measured at 240° C. since it was close to the melting point, and MFR at 250° C. was measured to find that MFR at 250° C. was 13.8 g/10 minutes. A non-stretched film was prepared from the resulting polyamide 4M alone, and an oxygen permeability coefficient thereof was determined to find that it was 0.09 cc·mm/(m²·day·atm) (23° C., 60% RH).

Then, cobalt stearate was added to the polyamide 6M, and the mixture was molten and kneaded with PP 1 in the same manners as in Example 1M, except that the temperature in melting and kneading was changed to 250° C. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

Comparative Example 1M

A film was produced in the same manner as in Example 1M, except that a weight ratio in melting and kneading was changed to the cobalt stearate-containing polyamide 1M:PP 1=85:15. Then, the film was used as a cover material for the gas-barriering molded container 1 to carry out the same storing test as in Example 1M. The results thereof are shown in Table 2M.

Comparative Example 2M

A film was produced in the same manner as in Example 1M, except that the mixture was not molten and not kneaded with PP 1 and that the oxygen-absorbing layer was prepared only from the cobalt stearate-containing polyamide 1M. Then, the film was used as a cover material for the gas-barriering molded container 1 to carry out the same storing test as in Example 1M. The results thereof are shown in Table 2M.

Comparative Example 3M

A polyamide resin (hereinafter, the above polyamide resin is referred to as the polyamide 7M) was synthesized in the same manner as in Example 4M, except that metaxylylenediamine:sebacic acid:adipic acid were used in a mole ratio of 1.0:0.3:0.7 and not subjected to solid phase polymerization. The above polyamide 7M had Tg of 76° C., a melting point of 185° C., a semi-crystallization time of 2000 seconds or longer, an end amino group concentration of 35.1 µeq/g, an end carboxyl group concentration of 60.2 µeq/g and a number average molecular weight of 17000. MFR at 240° C. was 60.0 g/10 minutes. Further, a non-stretched film was prepared from the resulting polyamide 7M alone, and an oxygen permeability coefficient thereof was determined to find that it was 0.44 cc·mm/(m²·day·atm) (23° C., 60% RH).

Then, cobalt stearate was added to the polyamide 7M, and the mixture was molten and kneaded with PP 1 in the same manners as in Example 1M to produce a film in the same manner as in Example 1M, and then the film was used as a cover material for the gas-barriering molded container 1 to carry out the same storing test as in Example 1M. The results thereof are shown in Table 2M.

Comparative Example 4M

A polyamide resin (hereinafter, the above polyamide resin is referred to as the polyamide resin 8M) was synthesized in the same manner as in Example 8M, except that metaxylylenediamine:adipic acid were used in a mole ratio of 0.997:1 and that the polymerization time in the solid phase polymerization was changed to 2 hours. The above polyamide resin 8M had Tg of 73° C., a melting point of 232° C., a semi-crystallization time of 25 seconds, an end amino group concentration of 38.3 µeq/g, an end carboxyl group concentration of 58.6 µeq/g and a number average molecular weight of 21800. MFR could not be measured at 240° C. since it was close to the melting point, and MFR at 250° C. was measured to find that MFR at 250° C. was 19.5 g/10 minutes. A non-stretched film was prepared from the resulting polyamide 8M alone, and an oxygen permeability coefficient thereof was determined to find that it was 0.09 cc·mm/(m²·day·atm) (23° C., 60% RH).

Then, cobalt stearate was added to the polyamide 8M, and the mixture was molten and kneaded with PP 1 in the same manners as in Example 1M to obtain an oxygen-absorbing resin pellet, except that the temperature in melting and kneading was changed to 250° C. Further, an oxygen-absorbing multilayer film was obtained in the same manner as in Example 1M, and then the film was used as a cover material for the gas-barriering molded container 1 to carry out the same storing test as in Example 1M. The results thereof are shown in Table 2M.

The respective details of the polyamides 1M to 8M obtained above are shown in Table 1M, and the results of the respective examples and comparative examples are shown in Table 2M.

TABLE 1M

|  | End amino group concentration (µeq/g) | Diamine[1] | Dicarboxylic acid[1] | Solid phase polymerization[2] | End masLing[3] | MFR (g/10 minutes) | Oxygen permeability Coefficient[4] (cc·mm/(m²·day·atm)) |
|---|---|---|---|---|---|---|---|
| Polyamide 1M | 17.2 | MXDA (0.991) | Sebacic acid (0.7) Adipic acid (0.3) | ○ (4 hours) | x | 10.4 (240° C.) | 0.55 |

TABLE 1M-continued

| | End amino group concentration (μeq/g) | Diamine[1] | Dicarboxylic acid[1] | Solid phase polymerization[2] | End masLing[3] | MFR (g/10 minutes) | Oxygen permeability Coefficient[4] (cc · mm/(m² · day · atm)) |
|---|---|---|---|---|---|---|---|
| Polyamide 2M | 18.3 | MXDA (0.993) | Sebacic acid (0.3) Adipic acid (0.7) | o (4 hours) | x | 11.1 (240° C.) | 0.41 |
| Polyamide 3M | 15.6 | MXDA (0.992) | Sebacic acid (0.6) Adipic acid (0.4) | o (4 hours) | x | 10.1 (240° C.) | 0.24 |
| Polyamide 4M | 24.7 | MXDA (0.7) PXDA (0.3) | Adipic acid (1.0) | x | o | 33.4 (270° C.) | 0.08 |
| Polyamide 5M | 17.6 | MXDA (0.994) | Sebacic acid (0.4) Adipic acid (0.6) | o (4 hours) | x | 13.6 (240° C.) | 0.69 |
| Polyamide 6M | 19.1 | MXDA (0.991) | Adipic acid (1.0) | o (4 hours) | x | 13.8 (250° C.) | 0.09 |
| Polyamide 7M | 35.1 | MXDA (1.0) | Sebacic acid (0.3) Adipic acid (0.7) | x | x | 60.0 (240° C.) | 0.44 |
| Polyamide 8M | 38.3 | MXDA (0.997) | Adipic acid (1.0) | o (2 hours) | x | 19.5 (250° C.) | 0.09 |

MXDA: metaxylylenediamine,
PXDA: paraxylylenediamine
[1]Numerical value in parentheses shows a mole ratio of each component.
[2]o: the solid phase polymerization was carried out. The polymerization time is shown in parentheses. x: the solid phase polymerization was not carried out.
[3]o: the end amino group was masked. x: the end amino group was not masked.
[4]A non-stretched film was prepared from the polyamide alone, and an oxygen permeability coefficient thereof was measured at 23° C. and 60% RH.

TABLE 2M

| | Composition | | | Concentration | Flavor of |
|---|---|---|---|---|---|
| | Polyamide (end amino group concentration) | Melting kneading ratio[1] | Appearance of film roll | of oxygen after heating for cooking and cooling | cooked rice after stored for 3 months |
| Example 1M | Polyamide 1M (17.2 μeq/g) | 40:60 | Good | 0.7% | Good |
| Example 2M | Polyamide 1M (17.2 μeq/g) | 55:45 | Slightly inferior | 1.5% | Almost good |
| Example 3M | Polyamide 1M (17.2 μeq/g) | 20:80 | Good | 1.7% | Almost good |
| Example 4M | Polyamide 2M (18.3 q/g) | 40:60 | Good | 1.7% | Almost good |
| Example 5M | Polyamide 3M (15.6 μeq/g) | 40:60 | Good | 0.9% | Good |
| Example 6M | Polyamide 4M (24.7 μeq/g) | 40:60 | Slightly inferior | 2.3% | Slightly inferior |
| Example 7M | Polyamide 5M (17.6 μeq/g) | 40:60 | Good | 0.6% | Good |
| Example 8M | Polyamide 6M (19.1 μeq/g) | 40:60 | Good | 1.5% | Almost good |
| Comparative Example 1M | Polyamide 1M (17.2 μeq/g) | 85:15 | Slightly inferior | 7.1% | Lowered |
| Comparative Example 2M | Polyamide 1M (17.2 μeq/g) | 100:0 | Good | 7.7% | Lowered |
| Comparative Example 3M | Polyamide 7M (35.1 μeq/g) | 40:60 | Slightly inferior | 6.1% | Lowered |
| Comparative Example 4M | Polyamide 8M (38.3 μeq/g) | 40:60 | Slightly inferior | 6.5% | Lowered |

[1](total weight of transition metal catalyst and polyamide resin):weight of polyolefin resin Example 9M A pellet comprising an oxygen-absorbing resin composition B was obtained in the same manner as in Example 1M, except that an ethylene-propylene random copolymer (product name: "Novatec PP FW4BT" manufactured by Japan Polypropylene Corporation, MFR: 6.5 g/10 minutes at 230° C. (measured according to JIS K7210), hereinafter referred to as PP 3) was used in place of PP 1. A two kind, two layer film 2 was prepared in the same manner as in Example 1M by using the resulting oxygen-absorbing resin composition B for an oxygen-absorbing layer and using PP 3 for a sealant layer. The film obtained has a good appearance and a HAZE of 13%. Subsequently, an ethylene-vinyl alcohol copolymer film (product name: "Eval EF-XL" manufactured by Kuraray Co., Ltd.) 15 μm and a nylon film (product name: "N1102" manufactured by Toyobo Co., Ltd) 15 μm were laminated thereon by using an adhesive for lamination to obtain an oxygen-absorbing multilayer film of a nylon film (15)/adhesive for lamination (3)/ethylene vinyl alcohol copolymer film (15)/adhesive for lamination (3)/oxygen-absorbing resin (30)/PP 3 (30). An appearance of the film was good.

Then, a three kind, five layer multilayer sheet-molding apparatus comprising first to third extruding equipments, a feed block, a T die, a cooling roll and a sheet receiving equipment was used to extrude components from the respective extruding equipments to obtain a gas-barriering multilayer sheet, wherein extruded were an ethylene-propylene random copolymer (product name: "Novatec PP EG6D" manufactured by Japan Polypropylene Corporation, MFR: 1.9 g/10 minutes (measured according to JIS K7210), hereinafter referred to as PP 4) from the first extruding equipment, an ethylene-vinyl alcohol copolymer film (product name: "Eval L171B" manufactured by Kuraray Co., Ltd., 40) from the second extruding equipment and maleic anhydride-modified polypropylene (product name: "Modec AP P604" manufactured by Mitsubishi Chemical Corporation) from the third extruding equipment. The constitution of the gas-barriering multilayer sheet was PP 4 (400)/maleic anhydride-modified polypropylene (product name: same as above, 15)/ethylene-vinyl alcohol copolymer (product name: same as above, 40)/maleic anhydride-modified polypropylene (product name: same as above, 15)/PP 4 (400) from the inner layer. The multilayer sheet prepared by co-extrusion was a multilayer sheet which was free from thickness unevenness and the like and had a good appearance.

Next, the gas-barriering multilayer sheet thus obtained was molded into a cup of 80 cc at a drawing ratio of 2.5 (hereinafter referred to as the gas-barriering molded container 2), and the gas-barriering molded container 2 was fully charged with an apple jelly and tightly sealed by heat sealing using the prepared oxygen-absorbing multilayer film as a cover material with a nylon film layer side turned to an outer face. A color tone of the content could be visually confirmed through the cover material. The tightly sealed container was subjected to heating treatment at 85° C. for 30 minutes and then stored at 23° C. for one month. After one month, the container was opened to find that an opening property thereof was good without being turned into a double cap and that a flavor and a color tone of the content were maintained well.

Comparative Example 5M

Iron powder 150 kg having an average particle diameter of 30 μm was put in a vacuum dryer equipped with a heating jacket, and a calcium chloride 50 weight % aqueous solution 70 kg was sprayed thereon while mixing them at 150° C. under reduced pressure of 10 mm Hg to dry the mixture. Then, the mixture was sieved to remove coarse particles, and an iron base oxygen-absorbing agent 1 having an average particle diameter of 30 μm was obtained. Next, the iron base oxygen-absorbing agent and calcium oxide were supplied trough a side feed by means of a biaxial extruding equipment equipped with a bent while extruding PP 3, and the mixture was kneaded so that a weight ratio of PP 3:iron base oxygen-absorbing agent 1:calcium oxide was 58:40:2 to obtain a pellet comprising an oxygen-absorbing resin composition C.

An oxygen-absorbing multilayer film and a gas-barriering molded container 2 were produced in the same manners as in Example 9M, except that the resin used for the oxygen-absorbing layer was changed to the oxygen-absorbing resin composition C, and then the oxygen-absorbing film was used as a cover material to carry out the same storing test as in Example 9M. As result thereof, a flavor and a color tone of the content were maintained well, but in opening the oxygen-absorbing film of the cover material, it could not be opened well. A part of the oxygen-absorbing layer of the oxygen-absorbing film used for the cover material was broken, and the iron powder remained and was adhered onto a flange of the gas-barriering molded container 2, so that an appearance thereof was damaged.

The present invention related to the oxygen-absorbing sealing container prepared by using as a cover material for the oxygen-absorbing film, the oxygen-absorbing multilayer film which was excellent in an oxygen-absorbing performance at a low humidity and a high humidity and maintained a resin strength after stored and which was excellent in a processability by blending the specific polyamide resin and the transition metal catalyst with the polyolefin resin in a specific proportion.

Method for Storing a Content of an Infusion Container

Example 1N

Metaxylylenediamine:sebacic acid:adipic acid were used in a mole ratio of 0.994:0.4:0.6 and subjected to melt polymerization and solid phase polymerization on the synthetic conditions described above to synthesize a polyamide resin (hereinafter, the above polyamide resin is referred to as the polyamide 1N). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 6 hours. The polyamide 1N had Tg of 73° C., a melting point of 184° C., a semi-crystallization time of 2000 seconds or longer, an end amino group concentration of 14.8 μeq/g, an end carboxyl group concentration of 63.4 μeq/g, a number average molecular weight of 25600 and MFR of 10.3 g/10 minutes at 240° C. Further, a non-stretched film was prepared from the resulting polyamide 1N alone, and an oxygen permeability coefficient thereof was determined to find that it was 0.34 cc·mm/(m$^2$·day·atm) (23° C., 60% RH).

Cobalt stearate was added as a transition metal catalyst to the molten polyamide through a side feed by means of a biaxial extruding equipment so that a cobalt concentration was 400 ppm. Further, the resulting mixture (hereinafter referred to as the cobalt stearate-containing polyamide 1N) of the polyamide and cobalt stearate was molten and kneaded at 240° C. with an ethylene-propylene block copolymer (product name: "Novatec PP BC3HF" manufactured by Japan Polypropylene Corporation, MFR: 8.5 g/10 minutes at 230° C., MFR: 10.8 g/10 minutes at 240° C., MFR: 12.1 g/10 minutes at 250° C., hereinafter referred to as PP) in a weight ratio of the cobalt stearate-containing polyamide 1N:PP=35:65 to obtain a pellet comprising an oxygen-absorbing resin composition A.

A two kind, three layer film (thickness: intermediate layer 20 μm/oxygen-absorbing resin layer 20 μm/oxygen-permeating layer 20 μm) in which the oxygen-absorbing resin composition obtained was used for an oxygen-absorbing resin layer and in which PP was used for an oxygen-permeating layer and an intermediate layer was subjected on an intermediate layer surface thereof to corona discharge treatment in a width of 700 mm at 30 m/minute to prepare a film roll thereof. Uneven thickness such as humps and the like was not observed on the film roll, and the film obtained had a good appearance and a HAZE of 85%. A urethane base adhesive for dry laminate (product name: "AD-817/CAT-RT86L-60" manufactured by Toyo-Morton, Ltd.) was used to laminate a PET film (product name: "E5100" manufactured by Toyobo Co., Ltd.) and an aluminum-deposited PET film (product name: "GL-AU" manufactured by Toppan Printing Co., Ltd.) on a corona-treated surface side hereof to obtain an oxygen-absorbing multilayer film of a PET film (12)/adhesive (3)/aluminum-deposited PET film (12)/adhesive (3)/PP (20)/oxygen-absorbing resin (20)/PP (20). Numbers in parentheses mean a thickness (unit: μm) of the respective layers. Next, a three side-sealed bag of 15 cm×30 cm was prepared with an oxygen-permeating layer side turned to an inner face. The bag was charged under nitrogen substitution with a polypropylene-made bottle in which tightly sealed was 200 ml of an amino acid preparation model liquid prepared by dissolving L-leucine, L-isoleucine, lysine acetate, L-methionine, L-phenylalanine, L-threonine, L-tryptophan, L-valine, L-arginine, L-histidine, L-alanine and glucose in water. A nitrogen substitution rate in the bag was 90%. Then, the bag was stored at 40° C. and 90% RH, and an oxygen concentration in the bag after 1 month and 3 months and a color change in the polypropylene-made bottle were inspected from an outside of the bag. Further, the sealing strength after stored for 3 months was measured. The results thereof are shown in Table 2N.

Example 2N

An oxygen-absorbing multilayer film was obtained in the same manner as in Example 1N, except that a weight ratio in melting and kneading was changed to the cobalt stearate-containing polyamide 1N:PP=55:45. Then, a three side-sealed bag was prepared to carry out the same storing test as in Example 1N. The results thereof are shown in Table 2N.

Example 3N

An oxygen-absorbing multilayer film was obtained in the same manner as in Example 1N, except that a weight ratio in melting and kneading was changed to the cobalt stearate-containing polyamide 1N:PP=20:80. Then, a three side-sealed bag was prepared to carry out the same storing test as in Example 1N. The results thereof are shown in Table 2N.

Example 4N

Metaxylylenediamine:sebacic acid:adipic acid were used in a mole ratio of 0.994:0.7:0.3 and subjected to melt polymerization and solid phase polymerization on the synthetic conditions described above to synthesize a polyamide resin (hereinafter, the above polyamide resin is referred to as the polyamide 2N). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 6 hours. The polyamide 2N had Tg of 65° C., a melting point of 170° C., a semi-crystallization time of 2000 seconds or longer, an end amino group concentration of 15.7 µeq/g, an end carboxyl group concentration of 61.5 µeq/g, a number average molecular weight of 25900 and MFR of 10.1 g/10 minutes at 240° C. Further, a non-stretched film was prepared from the resulting polyamide 2N alone, and an oxygen permeability coefficient thereof was determined to find that it was 0.68 cc·mm/(m²·day·atm) (23° C., 60% RH).

Then, cobalt stearate was added thereto in the same manner as in Example 1N so that a cobalt concentration was 400 ppm, and the resulting mixture (hereinafter referred to as the cobalt stearate-containing polyamide 2N) of the polyamide 2N and cobalt stearate was molten and kneaded with PP at 240° C. in a weight ratio of the cobalt stearate-containing polyamide 2N:PP=35:65 to obtain an oxygen-absorbing resin pellet. Further, an oxygen-absorbing multilayer film was obtained in the same manner as in Example 1N, and then a three side-sealed bag was prepared to carry out the same storing test as in Example 1N. The results thereof are shown in Table 2N.

Example 5N

Metaxylylenediamine:sebacic acid:adipic acid were used in a mole ratio of 0.994:0.3:0.7 and subjected to melt polymerization and solid phase polymerization on the synthetic conditions described above to synthesize a polyamide resin (hereinafter, the above polyamide resin is referred to as the polyamide 3N). Controlled were the dropwise adding time to 2 hours, the reaction time in the melt polymerization to 1 hour, the pressure in an inside of the equipment in the solid phase polymerization to 1 torr or less, the polymerization temperature to 160° C. and the polymerization time to 6 hours. The polyamide 3N had Tg of 78° C., a melting point of 194° C., a semi-crystallization time of 2000 seconds or longer, an end amino group concentration of 16.1 µeq/g, an end carboxyl group concentration of 64.7 µeq/g, a number average molecular weight of 24800 and MFR of 11.1 g/10 minutes at 240° C. Further, a non-stretched film was prepared from the resulting polyamide 3N alone, and an oxygen permeability coefficient thereof was determined to find that it was 0.21 cc·mm/(m²·day·atm) (23° C., 60% RH).

Then, cobalt stearate was added thereto in the same manner as in Example 1N so that a cobalt concentration was 400 ppm, and the resulting mixture (hereinafter referred to as the cobalt stearate-containing polyamide 3N) of the polyamide 3N and cobalt stearate was molten and kneaded with PP at 240° C. in a weight ratio of the cobalt stearate-containing polyamide 3N:PP=35:65 to obtain an oxygen-absorbing resin pellet. Further, an oxygen-absorbing multilayer film was obtained in the same manner as in Example 1N, and then a three side-sealed bag was prepared to carry out the same storing test as in Example 1N. The results thereof are shown in Table 2N.

Example 6N

Metaxylylenediamine:adipic acid were used in a mole ratio of 0.994:1 and subjected to melt polymerization and solid phase polymerization on the synthetic conditions described above to synthesize a polyamide resin (hereinafter, the above polyamide resin is referred to as the polyamide 4N). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 6 hours. The above polyamide 4N had Tg of 84° C., a melting point of 237° C., a semi-crystallization time of 25 seconds, an end amino group concentration of 13.9 µeq/g, an end carboxyl group concentration of 65.5 µeq/g and a number average molecular weight of 25200. MFR could not be measured at 240° C. since it was close to the melting point, and MFR at 250° C. was measured to find that MFR at 250° C. was 12.2 g/10 minutes. A non-stretched film was prepared from the resulting polyamide 4N alone, and an oxygen permeability coefficient thereof was determined to find that it was 0.09 cc·mm/(m²·day·atm) (23° C., 60% RH).

Then, cobalt stearate was added to the polyamide 4N, and the mixture was molten and kneaded with PP in the same manners as in Example 1N, except that the temperature in melting and kneading was changed to 250° C. Further, an oxygen-absorbing multilayer film was obtained in the same manner as in Example 1N, and then a three side-sealed bag was prepared to carry out the same storing test as in Example 1N. The results thereof are shown in Table 2N.

Example 7N

Metaxylylenediamine and paraxylylenediamine were mixed in 8:2, and the above diamines and adipic acid were used in a mole proportion of 1:1 and subjected only to melt polymerization on the synthetic conditions described above to synthesize a polyamide resin. Then, phthalic anhydride 0.2 wt % was added thereto, and the mixture was molten and kneaded at 270° C. by means of a biaxial extruding equipment to mask an end amino group (hereinafter, the above polyamide resin is referred to as the polyamide 5N). Controlled were the dropwise adding time to 2 hours, the polymerization temperature after finishing dropwise adding metaxylylenediamine in the melt polymerization to 270° C. and the reaction time to 30 minutes. The above polyamide 5N had Tg of 85° C., a melting point of 255° C., a semi-crystallization time of 24 seconds, an end amino group concentration of 24.4 μeq/g, an end carboxyl group concentration of 60.2 μeq/g and a number average molecular weight of 19000. MFR could not be measured at 260° C. since it was close to the melting point, and MFR at 270° C. was measured to find that MFR at 270° C. was 33.1 g/10 minutes. A non-stretched film was prepared from the resulting polyamide 5N alone, and an oxygen permeability coefficient thereof was determined to find that it was 0.13 cc·mm/(m$^2$·day·atm) (23° C., 60% RH).

Then, cobalt stearate was added to the polyamide 5N, and the mixture was molten and kneaded with PP in the same manners as in Example 1N, except that the temperature in melting and kneading was changed to 270° C. Further, an oxygen-absorbing multilayer film was obtained in the same manner as in Example 1N, and then a three side-sealed bag was prepared to carry out the same storing test as in Example 1N. The results thereof are shown in Table 2N.

Example 8N

Metaxylylenediamine:adipic acid:isophthalic acid were used in a mole ratio of 0.991:0.9:0.1 and subjected to melt polymerization and solid phase polymerization on the synthetic conditions described above to synthesize a polyamide resin (hereinafter, the above polyamide resin is referred to as the polyamide 6N). Controlled were the dropwise adding time to 2 hours, the reaction time in the melt polymerization to 1 hour, the pressure in an inside of the equipment in the solid phase polymerization to 1 torr or less, the polymerization temperature to 205° C. and the polymerization time to 6 hours. The above polyamide 6N had Tg of 94° C., a melting point of 228° C., a semi-crystallization time of 300 seconds, an end amino group concentration of 17.5 μeq/g, an end carboxyl group concentration of 63.7 μeq/g and a number average molecular weight of 24600. MFR could not be measured at 240° C. since it was close to the melting point, and MFR at 250° C. was measured to find that MFR at 250° C. was 13.6 g/10 minutes. A non-stretched film was prepared from the resulting polyamide 6N alone, and an oxygen permeability coefficient thereof was determined to find that it was 0.08 cc·mm/(m$^2$·day·atm) (23° C., 60% RH).

Then, cobalt stearate was added to the polyamide 6N, and the mixture was molten and kneaded with PP in the same manners as in Example 1N, except that the temperature in melting and kneading was changed to 250° C. Further, an oxygen-absorbing multilayer film was obtained in the same manner as in Example 1N, and then a three side-sealed bag was prepared to carry out the same storing test as in Example 1N. The results thereof are shown in Table 2N.

Comparative Example 1N

A film was produced in the same manner as in Example 1N, except that a weight ratio in melting and kneading was changed to the cobalt stearate-containing polyamide 1N:PP=85:15. Then, a three side-sealed bag was prepared to carry out the same storing test as in Example 1N. The results thereof are shown in Table 2N.

Comparative Example 2N

A polyamide resin (hereinafter, the above polyamide resin is referred to as the polyamide resin 7N) was synthesized in the same manner as in Example 6N, except that metaxylylenediamine:adipic acid were used in a mole ratio of 1:1. The above polyamide resin 7N had Tg of 84° C., a melting point of 237° C., a semi-crystallization time of 25 seconds, an end amino group concentration of 40.5 μeq/g, an end carboxyl group concentration of 42.2 μeq/g and a number average molecular weight of 24200. MFR could not be measured at 240° C. since it was close to the melting point, and MFR at 250° C. was measured to find that MFR at 250° C. was 13.1 g/10 minutes. A non-stretched film was prepared from the resulting polyamide 7N alone, and an oxygen permeability coefficient thereof was determined to find that it was 0.09 cc·mm/(m$^2$·day·atm) (23° C., 60% RH).

Then, cobalt stearate was added to the polyamide 7N, and the mixture was molten and kneaded with PP in the same manners as in Example 6N to produce a film in the same manner as in Example 1N. Then, a three side-sealed bag was prepared to carry out the same storing test as in Example 1N. The results thereof are shown in Table 2N.

Comparative Example 3N

A polyamide resin (hereinafter, the above polyamide resin is referred to as the polyamide resin 8N) was synthesized in the same manner as in Example 6N, except that metaxylylenediamine:adipic acid were used in a mole ratio of 0.994:1 and that the polymerization time in the solid phase polymerization was changed to 1 hour. The above polyamide resin 8N had Tg of 84° C., a melting point of 237° C., a semi-crystallization time of 25 seconds, an end amino group concentration of 32.9 μeq/g, an end carboxyl group concentration of 83.1 μeq/g and a number average molecular weight of 17200. MFR could not be measured at 240° C. since it was close to the melting point, and MFR at 250° C. was measured to find that MFR at 250° C. was 40.2 g/10 minutes. A non-stretched film was prepared from the resulting polyamide 8N alone, and an oxygen permeability coefficient thereof was determined to find that it was 0.09 cc·mm/(m$^2$·day·atm) (23° C., 60% RH).

Then, cobalt stearate was added to the polyamide 8N, and the mixture was molten and kneaded with PP in the same manners as in Example 6N to produce a film in the same manner as in Example 1N. Then, a three side-sealed bag was prepared to carry out the same storing test as in Example 1N. The results thereof are shown in Table 2N.

The respective details of the polyamides 1N to 8N obtained above are shown in Table 1N, and the results of the respective examples and comparative examples are shown in Table 2N.

TABLE 1N

| | End amino group concentration (μeq/g) | Diamine[1] | Dicarboxylic acid[1] | Solid phase polymerization[2] | End masLing[3] | MFR (g/10 minutes) | Oxygen permeability Coefficient[4] (cc·mm/m$^2$·day·atm)) |
|---|---|---|---|---|---|---|---|
| Polyamide 1N | 14.8 | MXDA (0.994) | Sebacic acid (0.4) Adipic acid (0.6) | Present (6 hours) | None | 10.3 (240° C.) | 0.34 |
| Polyamide 2N | 15.7 | MXDA (0.994) | Sebacic acid (0.7) Adipic acid (0.3) | Present (6 hours) | None | 10.1 (240° C.) | 0.68 |

TABLE 1N-continued

| | End amino group concentration (μeq/g) | Diamine[1] | Dicarboxylic acid[1] | Solid phase polymerization[2] | End masLing[3] | MFR (g/10 minutes) | Oxygen permeability Coefficient[4] (cc · mm/m² · day · atm)) |
|---|---|---|---|---|---|---|---|
| Polyamide 3N | 16.1 | MXDA (0.994) | Sebacic acid (0.3) Adipic acid (0.7) | Present (6 hours) | None | 11.1 (240° C.) | 0.21 |
| Polyamide 4N | 13.9 | MXDA (0.994) | Adipic acid (1.0) | Present (6 hours) | None | 12.2 (250° C.) | 0.09 |
| Polyamide 5N | 24.4 | MXDA (0.8) PXDA (0.2) | Adipic acid (1.0) | None | Present | 33.1 (270° C.) | 0.13 |
| Polyamide 6N | 17.5 | MXDA (0.991) | Adipic acid (0.9) Isophthalic acid (0.1) | Present (6 hours) | None | 13.6 (250° C.) | 0.08 |
| Polyamide 7N | 40.5 | MXDA (1.0) | Adipic acid (1.0) | Present (6 hours) | None | 13.1 (250° C.) | 0.09 |
| Polyamide 8N | 32.9 | MXDA (0.994) | Adipic acid (1.0) | Present (1 hour) | None | 40.2 (250° C.) | 0.09 |

MXDA: metaxylylenediamine,
PXDA: paraxylylenediamine
[1] Numerical value in parentheses shows a mole ratio of each component.
[2] Present: the solid phase polymerization was carried out. The polymerization time is shown in parentheses. None: the solid phase polymerization was not carried out.
[3] Present: the end amino group was masked. None: the end amino group was not masked.
[4] A non-stretched film was prepared from the polyamide alone, and an oxygen permeability coefficient thereof was measured at 23° C. and 60% RH.

TABLE 2N

| | Composition | | | Stored for 1 month | | Stored for 3 months | | Sealing strength after stored for 3 months |
|---|---|---|---|---|---|---|---|---|
| | Polyamide (end amino group concentration) | Melting kneading ratio[1] | | Oxygen concentration | Appearance | Oxygen concentration | Appearance | |
| Example 1N | Polyamide 1N (14.8 μeq/g) | 35:65 | | 3.3% | No change | 0.1% or less | No change | 4.6 kg/15 mm |
| Example 2N | Polyamide 1N (14.8 μeq/g) | 55:45 | | 4.1% | No change | 0.6% | No change | 3.3 kg/15 mm |
| Example 3N | Polyamide 1N (14.8 μeq/g) | 20:80 | | 3.8% | No change | 0.4% | No change | 5.2 kg/15 mm |
| Example 4N | Polyamide 2N (15.7 μeq/g) | 35:65 | | 3.9% | No change | 0.4% | No change | 4.4 kg/15 mm |
| Example 5N | Polyamide 3N (16.1 μeq/g) | 35:65 | | 4.2% | No change | 0.8% | No change | 4.3 kg/15 mm |
| Example 6N | Polyamide 4N (13.9 μeq/g) | 35:65 | | 4.5% | No change | 1.0% | Faint brown | 4.5 kg/15 mm |
| Example 7N | Polyamide 5N (24.4 μeq/g) | 35:65 | | 5.1% | No change | 1.5% | Faint brown | 4.5 kg/15 mm |
| Example 8N | Polyamide 6N (17.5 μeq/g) | 35:65 | | 3.8% | No change | 0.3% | Faint brown | 4.4 kg/15 mm |
| Comparative Example 1N | Polyamide 1N (14.8 μeq/g) | 85:15 | | 7.3% | Faint brown | 3.1% | Faint brown | 1.0 kg/15 mm |
| Comparative Example 2N | Polyamide 7N (40.5 μeq/g) | 35:65 | | 8.1% | Faint brown | 6.5% | Brown | 4.6 kg/15 mm |
| Comparative Example 3N | Polyamide 8N (32.9 μeq/g) | 35:65 | | 7.9% | Faint brown | 5.9% | Brown | 4.7 kg/15 mm |

[1] (total weight of transition metal catalyst and polyamide resin):weight of polyolefin resin As apparent from Examples 1N to 8N, the oxygen-absorbing resin compositions of the present invention were excellent in an oxygen-absorbing performance and reduced in an oxygen concentration in the bag, and they maintained a color tone of the contents and were suited to storage of a content in the infusion container.

In contrast with this, in Comparative Example 1N in which a content of the polyamide A in the oxygen-absorbing resin layer exceeded 60% by weight, the oxygen-absorbing performance was unsatisfactory, and the content was discolored.

On the other hand, in Comparative Example 2N in which a mole ratio of metaxylylenediamine to adipic acid was increased as compared with Example 6N and Comparative Example 3N in which the solid phase polymerization time was shortened, the end amino group concentrations exceeded 30 μeq/g, and the oxygen-absorbing performances were unsatisfactory. Further, the contents were discolored.

Comparative Example 4N

Iron powder having an average particle diameter of 30 μm was mixed with calcium chloride in a proportion of 100:1, and the mixture was kneaded with PP in a weight ratio of 30:70 to obtain an iron base oxygen-absorbing resin composition AN. A two kind, three layer film was tried to be prepared in the same manner as in Example 1N by using the iron base oxygen-absorbing resin composition AN for a core layer, but irregularities of the iron powder were generated on a film surface, and the good film was not obtained. Accordingly, the iron base oxygen-absorbing resin composition AN was extruded and laminated as an oxygen-absorbing layer in a thickness of 30 μm on PP having a thickness of 40 μm to obtain a laminated film in which an oxygen-absorbing layer was subjected to corona discharge treatment. The above laminated film was laminated with a PET film and an aluminum-deposited PET film in the same manner as in Example 1N to obtain an oxygen-absorbing multilayer film of a PET film (12)/adhesive (3)/aluminum-deposited PET film (12)/adhesive (3)/iron base oxygen-absorbing resin composition AN (30)/PP (40). Numerals in parentheses mean a thickness (unit: μm) of the respective layers. Then, a three side-sealed bag was prepared in the same manner as in Example 1N, and a storing test thereof was carried out without allowing water to be present in the film to find that an oxygen concentration in the bag was not sufficiently lowered. Further, it was difficult to confirm the content from an outside of the bag, and therefore the bag was opened, and the content was confirmed to find that it was discolored.

Example 9N

A four kind, six layer multilayer blow molding apparatus comprising first to fourth extruding equipments, a die head and a metal die was used to extrude components from the respective extruding equipments, wherein extruded were PP from the first extruding equipment, the oxygen-absorbing resin composition A described above from the second extruding equipment, an ethylene-vinyl alcohol copolymer (product name: "Eval F101B" manufactured by Kuraray Co., Ltd.) from the third extruding equipment and a polypropylene base adhesive resin (product name: Modec AP P604V manufactured by Mitsubishi Chemical Corporation) from the fourth extruding equipment, whereby prepared was an oxygen-absorbing multilayer bottle which comprised PP/oxygen-absorbing resin composition A layer/adhesive layer/ethylene-vinyl alcohol copolymer/adhesive layer/PP (weight ratio (%) of the respective layers: 15/15/3/6/3/58)) from an inside and which had a content volume of 300 mL and a thickness of 300 μm in a thinnest wall part of a barrel part. The oxygen-absorbing multilayer bottle was a multilayer bottle which was free from thickness unevenness and the like and had a good appearance.

Next, the multilayer bottle thus obtained was charged under nitrogen substitution with 300 mL of the amino acid preparation model liquid used in Example 1N. A nitrogen substitution rate in the bottle was 95%. Then, the bottle was stored at 40° C. and 90% RH, and an appearance of the content after 6 months was confirmed to find that it was not changed.

The present invention relates to a method for preserving a content of a fluid infusion container in which a content of a fluid infusion container is preserved in an oxygen-absorbing container prepared by using wholly or partially an oxygen-absorbing multilayer film prepared by laminating at least three layers of an oxygen-permeating layer comprising a thermoplastic resin, an oxygen-absorbing resin layer containing at least a polyolefin resin, a transition metal catalyst and a polyamide resin and a gas-barriering layer comprising a gas-barriering film in order from an inside. A content of the fluid infusion container can be preserved for a long time without being deteriorated. Further, the above oxygen-absorbing multilayer film has a transparency.

What is claimed is:
1. An oxygen-absorbing resin composition containing a polyolefin resin, a transition metal catalyst, and a polyamide resin obtained by polycondensation of aromatic diamine and dicarboxylic acid, wherein an end amino group concentration of the above polyamide resin is 30 μeq/g or less, and a total content of the transition metal catalyst and the polyamide resin is 15 to 60% by weight based on a whole amount of the oxygen-absorbing resin composition, wherein the dicarboxylic acid contains adipic acid and sebacic acid in a proportion of 3/7 to 7/3 in terms of a mole ratio (adipic acid/sebacic acid), and the aromatic diamine contains metaxylylenediamine in a proportion of 0.985 to 0.998 mole based on 1 mole of the dicarboxylic acid.

2. The oxygen-absorbing resin composition according to claim 1, wherein the dicarboxylic acid contains adipic acid and sebacic acid in a proportion of 4/6 to 6/4 in terms of a mole ratio (adipic acid/sebacic acid).

3. The oxygen-absorbing resin composition according to claim 1, wherein the aromatic diamine contains metaxylylenediamine in a proportion of 0.990 to 0.995 mole based on 1 mole of the dicarboxylic acid.

4. The oxygen-absorbing resin composition according to claim 1, wherein the dicarboxylic acid contains adipic acid and sebacic acid in a proportion of 4/6 to 6/4 in terms of a mole ratio (adipic acid/sebacic acid) and the aromatic diamine contains metaxylylenediamine in a proportion of 0.990 to 0.995 mole based on 1 mole of the dicarboxylic acid.

5. An oxygen-absorbing multilayer film comprising at least three layers of a sealant layer comprising a thermoplastic resin, an oxygen-absorbing resin layer containing a polyolefin resin, a transition metal catalyst and a polyamide resin and a gas-barriering layer comprising a gas-barriering film, wherein the above polyamide resin is a polyamide resin which is obtained by polycondensation of aromatic diamine and dicarboxylic acid and in which an end amino group concentration is 30 μeq/g or less, and a total content of the transition metal catalyst and the polyamide resin in the oxygen-absorbing resin layer is 15 to 60% by weight, wherein the dicarboxylic acid contains adipic acid and sebacic acid in a proportion of 3/7 to 7/3 in terms of a mole ratio (adipic acid/sebacic acid), and the aromatic diamine contains metaxylylenediamine in a proportion of 0.985 to 0.998 mole based on 1 mole of the dicarboxylic acid.

6. An oxygen-absorbing multilayer container prepared by thermoforming the oxygen-absorbing multilayer film according to claim 5.

7. An oxygen-absorbing multilayer container prepared by subjecting a laminated material prepared by laminating at least a paper substrate, a gas-barriering layer, the oxygen-absorbing resin layer according to claim 5 and a thermoplastic resin inner layer in this order to container manufacturing.

8. A production process for the oxygen-absorbing resin composition according to claim 1 in which a content of the transition metal is 200 to 5000 ppm based on the polyolefin resin, wherein a master batch containing the polyolefin resin and the transition metal catalyst is molten and kneaded with the polyamide resin, and in which an oxygen-absorbing resin composition according to claim 1 is produced by the process.

9. A method for preserving a content of a fluid infusion container in which a content of a fluid infusion container is preserved in an oxygen-absorbing container prepared by using wholly or partially an oxygen-absorbing multilayer film prepared by laminating at least three layers of an oxygen-permeating layer comprising a thermoplastic resin, an oxygen-absorbing resin layer containing at least a polyolefin resin, a transition metal catalyst and a polyamide resin and a gas-barriering layer comprising a gas-barriering film in order from an inside, wherein the above polyamide resin is a polyamide resin which is obtained by polycondensation of at least aromatic diamine and dicarboxylic acid and in which an end amino group concentration is 30 μeq/g or less, and a total content of the transition metal catalyst and the polyamide resin in the oxygen-absorbing resin layer is 15 to 60% by weight, wherein the dicarboxylic acid contains adipic acid and sebacic acid in a proportion of 3/7 to 7/3 in terms of a mole ratio (adipic acid/sebacic acid), and the aromatic diamine contains metaxylylenediamine in a proportion of 0.985 to 0.998 mole based on 1 mole of the dicarboxylic acid.

* * * * *